(12) United States Patent
Lagsdin

(10) Patent No.: US 7,040,659 B2
(45) Date of Patent: May 9, 2006

(54) STABILIZER PAD FOR VEHICLES

(76) Inventor: Andry Lagsdin, 54 King Hill Rd., Hanover, MA (US) 02339

( * ) Notice: Subject to any disclaimer, the term of this patent is extended or adjusted under 35 U.S.C. 154(b) by 0 days.

(21) Appl. No.: 10/632,242

(22) Filed: Aug. 4, 2003

(65) Prior Publication Data

US 2004/0056465 A1  Mar. 25, 2004

Related U.S. Application Data

(63) Continuation-in-part of application No. 10/387,898, filed on Mar. 13, 2003, which is a continuation-in-part of application No. 09/996,013, filed on Nov. 28, 2001, now Pat. No. 6,726,246, which is a continuation-in-part of application No. 09/920,148, filed on Aug. 1, 2001, now Pat. No. 6,422,603, which is a continuation-in-part of application No. 09/807,712, filed as application No. PCT/US99/25381 on Oct. 28, 1999, now Pat. No. 6,634,672, and a continuation-in-part of application No. 09/183,473, filed on Oct. 30, 1998, now Pat. No. 6,270,119.

(51) Int. Cl.
*B60S 9/02* (2006.01)

(52) U.S. Cl. .................. 280/763.1; 248/633; 248/678; 248/188.8

(58) Field of Classification Search .............. 280/763.1, 280/762, 764.1, 766.1, 475; 248/633, 678, 248/677, 188.8, 346.01
See application file for complete search history.

(56) References Cited

U.S. PATENT DOCUMENTS

| | | |
|---|---|---|
| 2,277,939 A | 3/1942 | Thalhammer |
| 3,219,362 A | 11/1965 | Epstein |
| 3,244,301 A | 4/1966 | Vaughan |
| 3,495,727 A | 2/1970 | Long |
| 3,642,242 A | 2/1972 | Danekas |
| 3,721,458 A | 3/1973 | Mitchell |
| 3,754,777 A | 8/1973 | Riggs et al. |
| 3,758,154 A | 9/1973 | Kitaguchi |
| 3,831,774 A | 8/1974 | Moore |
| 3,881,692 A | 5/1975 | Clarke |
| 3,897,079 A | 7/1975 | MacKenzie et al. |
| 3,913,942 A | 10/1975 | MacKenzie et al. |
| 3,924,876 A | 12/1975 | Vaillant et al. |
| 3,930,668 A | 1/1976 | Schuerman et al. |
| 3,945,666 A | 3/1976 | Fritsch |
| 3,976,306 A | 8/1976 | Nault |
| 3,990,714 A | 11/1976 | Hornagold |
| 3,998,470 A | 12/1976 | Houston |
| 4,023,828 A | 5/1977 | MacKenzie et al. |
| 4,039,206 A | 8/1977 | Nault |
| 4,066,234 A | 1/1978 | Nycum |
| 4,073,454 A | 2/1978 | Sauber |

(Continued)

FOREIGN PATENT DOCUMENTS

CA            492912            5/1953

(Continued)

*Primary Examiner*—Anne Marie Boehler
(74) *Attorney, Agent, or Firm*—David M. Driscoll, Esq.

(57) ABSTRACT

A stabilizer for a heavy equipment machine includes a pair of resilient pad assemblies each having opposed surfaces either of which can be positioned as a ground engaging surface, and a support pin that extends in opposed directions from a stabilizer arm of the machine. Each of the resilient pad assemblies has a respective passage for receiving the support pin for enabling rotational support of the resilient pad assemblies from the support pin. The support of the resilient pad assemblies enables the positioning of either of the opposed surfaces as the ground engaging surface.

23 Claims, 41 Drawing Sheets

U.S. PATENT DOCUMENTS

| | | |
|---|---|---|
| 4,201,137 A | 5/1980 | Lagsdin |
| 4,204,714 A | 5/1980 | Jocobson et al. |
| 4,266,809 A | 5/1981 | Wuerflein |
| 4,397,479 A | 8/1983 | Schmidt |
| 4,421,290 A | 12/1983 | Frank |
| 4,473,239 A | 9/1984 | Smart |
| 4,515,520 A | 5/1985 | Parquet et al. |
| 4,531,883 A | 7/1985 | Arnold |
| 4,546,996 A | 10/1985 | Hanson |
| 4,619,369 A | 10/1986 | Mertens |
| 4,761,021 A | 8/1988 | Lagsdin |
| 4,860,539 A | 8/1989 | Parrett et al. |
| 4,889,362 A | 12/1989 | Lagsdin |
| 5,011,184 A | 4/1991 | Loudon |
| 5,015,008 A | 5/1991 | Schupback |
| 5,050,904 A | 9/1991 | Lagsdin |
| 5,051,057 A | 9/1991 | Kremer |
| 5,054,812 A | 10/1991 | Lagsdin |
| 5,310,217 A | 5/1994 | Paskey et al. |
| 5,338,255 A | 8/1994 | Akehurst |
| 5,466,004 A | 11/1995 | Lagsdin |
| 5,488,788 A | 2/1996 | Durbin |
| 5,547,220 A | 8/1996 | Lagsdin |
| 5,564,871 A | 10/1996 | Lagsdin |
| 5,667,245 A | 9/1997 | Lagsdin |
| 5,730,455 A | 3/1998 | Varnum, Sr. et al. |
| 5,957,496 A | 9/1999 | Lagsdin |
| 5,992,883 A | 11/1999 | Lagsdin |
| 6,109,650 A | 8/2000 | Lagsdin |
| 6,270,119 B1 | 8/2001 | Lagsdin |
| 6,422,603 B1 | 7/2002 | Lagsdin |
| 2002/0036403 A1 | 3/2002 | Lagsdin |

FOREIGN PATENT DOCUMENTS

| | | |
|---|---|---|
| CA | 1029715 | 4/1978 |
| CA | 1036148 | 8/1978 |

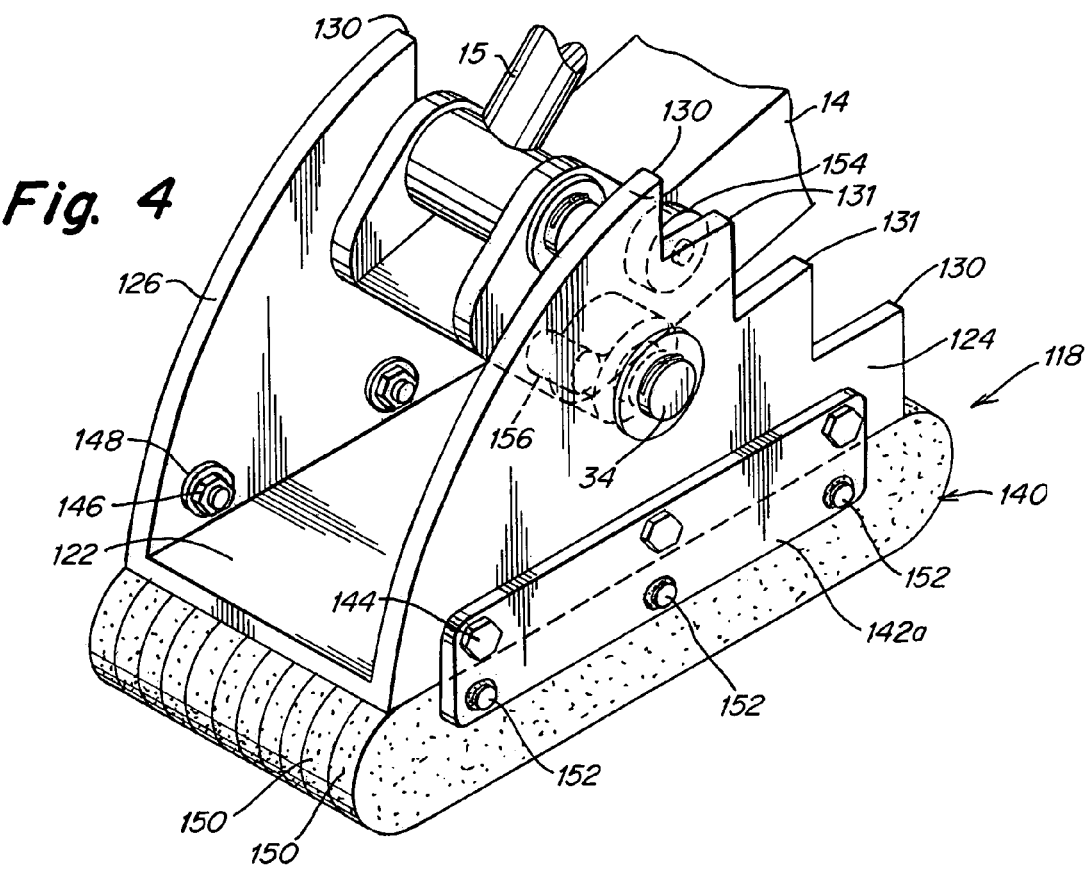
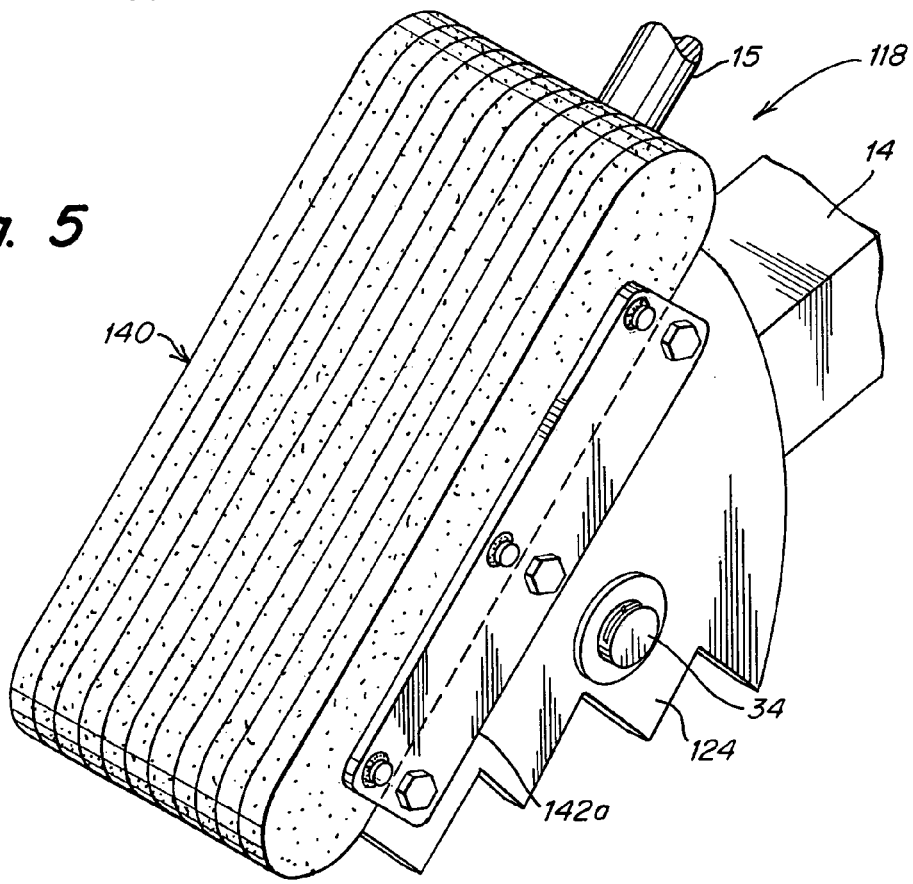

STABILIZER PAD FOR VEHICLES

RELATED APPLICATIONS

This application claims priority to and is a continuation-in-part of U.S. application Ser. No. 10/387,898 filed Mar. 13, 2003 pending; which, in turn is a continuation-in-part of U.S. application Ser. No. 09/996,013 filed Nov. 28, 2001 now U.S. Pat. No. 6,726,246; which, in turn is a continuation-in-part of U.S. application Ser. No. 09/920,148 filed Aug. 1, 2001, now U.S. Pat. No. 6,422,603, which, in turn is a continuation-in-part of U.S. application Ser. No. 09/807,712 filed Apr. 17, 2001, now U.S. Pat. No. 6,634,672, which, in turn is a continuation-in-part of U.S. application Ser. No. 09/183,473 filed Oct. 30, 1998, now U.S. Pat. No. 6,270,119. This application also claims the benefit under 35 U.S.C. §120 or 35 U.S.C. §365(c) of PCT International application PCT/US99/25381, designating the United States of America, and filed Oct. 28, 1999. PCT application PCT/US99/25381, of which U.S. application Ser. No. 09/807,712 is a national stage filing under 35 U.S.C. §371, was published under PCT Article 21(2) in English. PCT/US99/25381 claims priority to and is a continuation-in-part of U.S. application Ser. No. 09/183,473, filed Oct. 30, 1998, now U.S. Pat. No. 6,270,119.

All of the foregoing applications along with U.S. Pat. No. 6,270,119, and U.S. Pat. No. 6,422,603 are now hereby incorporated by reference herein in their entirety.

FIELD OF THE INVENTION

The present invention relates generally to stabilizer pads for vehicles, and more particularly to pivotally mounted stabilizer pads.

BACKGROUND OF THE INVENTION

FIG. 1 is a fragmentary view of a typical loader/backhoe 10 having a shovel mechanism 12, stabilizer arms 14 and 16, and associated stabilizer pads 18 and 20, respectfully. Hydraulic pistons 15 are used to operate each of the stabilizer arms 14 and 16 independently. In FIG. 1, the stabilizer arms are in an operational, extended position with the stabilizer pads 18 and 20 in engagement with the ground surface to prevent movement of the backhoe during operation of the shovel mechanism 12. When the backhoe 10 is to be moved, the pistons associated with each cylinder are withdrawn so that the stabilizer arms 14 and 16 pivot and raise the stabilizer pads above ground level.

The stabilizer pad 18 of FIG. 1 is shown in greater detail in FIGS. 2 and 3. Stabilizer pad 20 is substantially identical to stabilizer pad 18. The stabilizer pad 18 and similar stabilizer pads are further described in U.S. Pat. Nos. 4,889,362, 5,054,812, 5,466,004, 5,547,220 and 5,667,245, each of which is issued to the inventor of the present application and incorporated herein by reference in their entirety. The stabilizer pad 18 includes a flat plate 22 having flanges 24 and 26, both extending from one surface of plate 22. The stabilizer pad 18 is also provided with supporting webs or ribs 25, one associated with each flange. The ribs 25 provide additional support for the flanges 24 and 26. The plate 22 is notched at 30 between flanges 24 and 26 as illustrated in FIG. 1. The plate is notched to accommodate the arm 14 and to enable reversible rotation of the stabilizer pad.

The stabilizer arm 14 includes a journal end for accommodating pin 34. Pin 34 also fits within holes of flanges 24 and 26. The pin is used to secure the stabilizer pad to the arm using, for example, a cotter pin as illustrated in FIG. 3.

On the side of the flat plate 22 opposite that containing the flanges 24 and 26 are disposed three laminated rubber pads 40. Each of the rubber pads 40 includes laminated rubber sections supported between angle irons 44 and 48. The angle irons 44 and 48 have a base leg and an upright leg. Each of the upright legs has holes therein for receiving elongated securing pins 50 for containing the laminated rubber sections between the angle irons. The laminated pads 40 are secured to the plate 22 using bolts 53 and nuts 55.

The stabilizer pads 18 and 20 are rotatable about pin 34 when the stabilizer arms are in the raised position to place either the rubber pads 40 downward for engagement with the ground or to place the flanges 24 and 26 downward for engagement with the ground.

In a typical operation, the rubber pad side of the stabilizer pad 18 is positioned to engage the ground, as shown in FIG. 1, when the ground surface is a relatively flat hard surface such as concrete or pavement. The flange side of the stabilizer pad 18, as shown in FIG. 2, is positioned to engage the ground when the ground surface is an unfinished ground surface, such as gravel or dirt. The flanges are designed to dig into the unfinished ground surface to anchor and stabilize the backhoe.

Although the prior arm, reversible stabilizer pads described above provide reliable operation, it is desirable to provide a simplified stabilizer pad with improved operational performance over the stabilizer pad described above.

SUMMARY OF THE INVENTION

In accordance with the present invention there is provided a stabilizer for a heavy equipment machine that comprises a pair of resilient pad assemblies each having opposed surfaces either of which can be positioned as a ground engaging surface; and a support pin that extends in opposed directions from a stabilizer arm of the machine. Each of the resilient pad assemblies has a respective passage for receiving the support pin for enabling rotational support of the resilient pad assemblies from the support pin. The support of the resilient pad assemblies enable the positioning of either of the opposed surfaces as the ground engaging surface.

The pad assemblies are each constructed of a plurality of separate pad layers. Each pad assembly may comprise a plurality of resilient pad layers and at least one interconnecting member for retaining the layers in a secured pack. The interconnecting member may comprise a pair of side plates and at least two interconnection securing members that are adapted to extend through the pad layers for holding the pad layers together. A sleeve may be in the pad passage for engaging with the support pin.

In accordance with another aspect of the present invention there is provided a stabilizer pad assembly for use with a stabilizer arm, the stabilizer pad assembly comprising; a pair of laterally spaced apart plate members, the pair of plate members being pivotally attached to a stabilizer arm by a pin extending laterally between facing surfaces of respective plate members; and at least one resilient pad formed with at least one passage extending transversely therethrough between opposite sides of the resilient pad, and having opposite work surfaces. The plate members have, adjacent one edge thereof, at least one receiving hole; and there is also provided a retainer removeably engageable with the plate member receiving hole and the pad passage, removable to permit said resilient pad to be moved between the opposite working surfaces and to be re-engagable so as to permit selective positioning of either of the opposite working surfaces for use as a surface for ground engagement.

In accordance with still another aspect of the present invention there is provided a latch device for use with a stabilizer pad attached to a stabilizer arm of a vehicle and for preventing self-flipping of the stabilizer pad relative to the stabilizer arm. The latch device comprises, a latch constructed and arranged to have a pivot that enables limited rotation between engaged and disengaged positions thereof, and a support for the latch from either the stabilizer arm or the stabilizer pad. The stabilizer pad has one and other positions relating to opposed work surfaces. The latch is interengaged with one of the pad and arm to inhibits rotation of the stabilizer pad when the stabilizer pad is in the one position so as to inhibit self-flipping thereof. The latch is manually operable to disengage the latch when moving the stabilizer pad to its other position.

BRIEF DESCRIPTION OF THE DRAWINGS

For a better understanding of the present invention, reference is made to the drawings which are incorporated herein by reference and in which:

FIG. 4 is a perspective view of a first embodiment of a stabilizer pad of the present invention in a position for engaging a smooth surface;

FIG. 5 is a perspective view of the embodiment of FIG. 4 with the stabilizer pad in a position for engaging a gravel or dirt ground surface;

DETAILED DESCRIPTION

Figure 1:
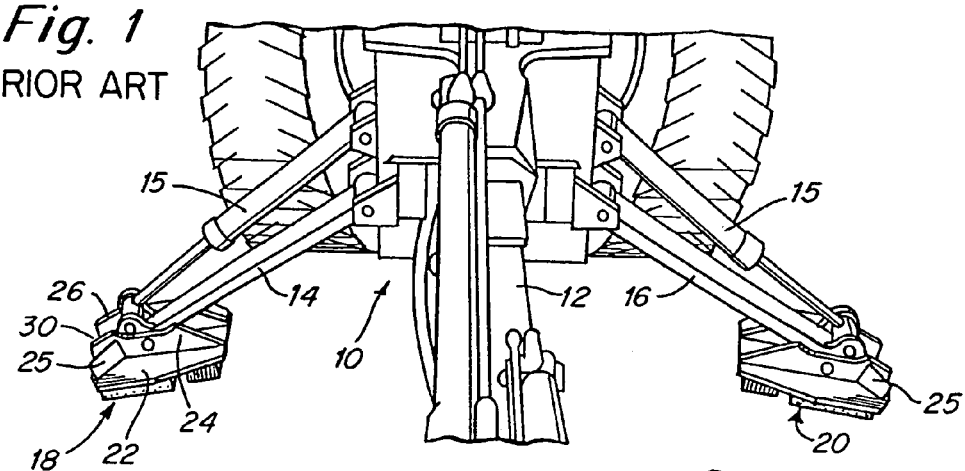
FIG. 1 is a fragmentary view of a typical loader/backhoe having a stabilizer arm with stabilizer pads of the prior art secured thereto.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

One embodiment of a stabilizer pad 118 in accordance with the present invention will now be described with reference to FIGS. 4–10. As understood by those skilled in the art, stabilizer pads in accordance with embodiments of the present invention may be used with a backhoe as shown in FIG. 1, and may also be used with other vehicles or platforms having stabilizing members for stabilizing the vehicle or platform.

The stabilizer pad 118 has a substantially U-shaped frame formed in one embodiment from a continuous steel sheet. The continuous steel sheet is bent to form the U-shape consisting of a base plate 122 and flanges 124 and 126. Each of the flanges 124 and 126 has outer grouser points 130 and inner grouser points 131.

Figure 10:
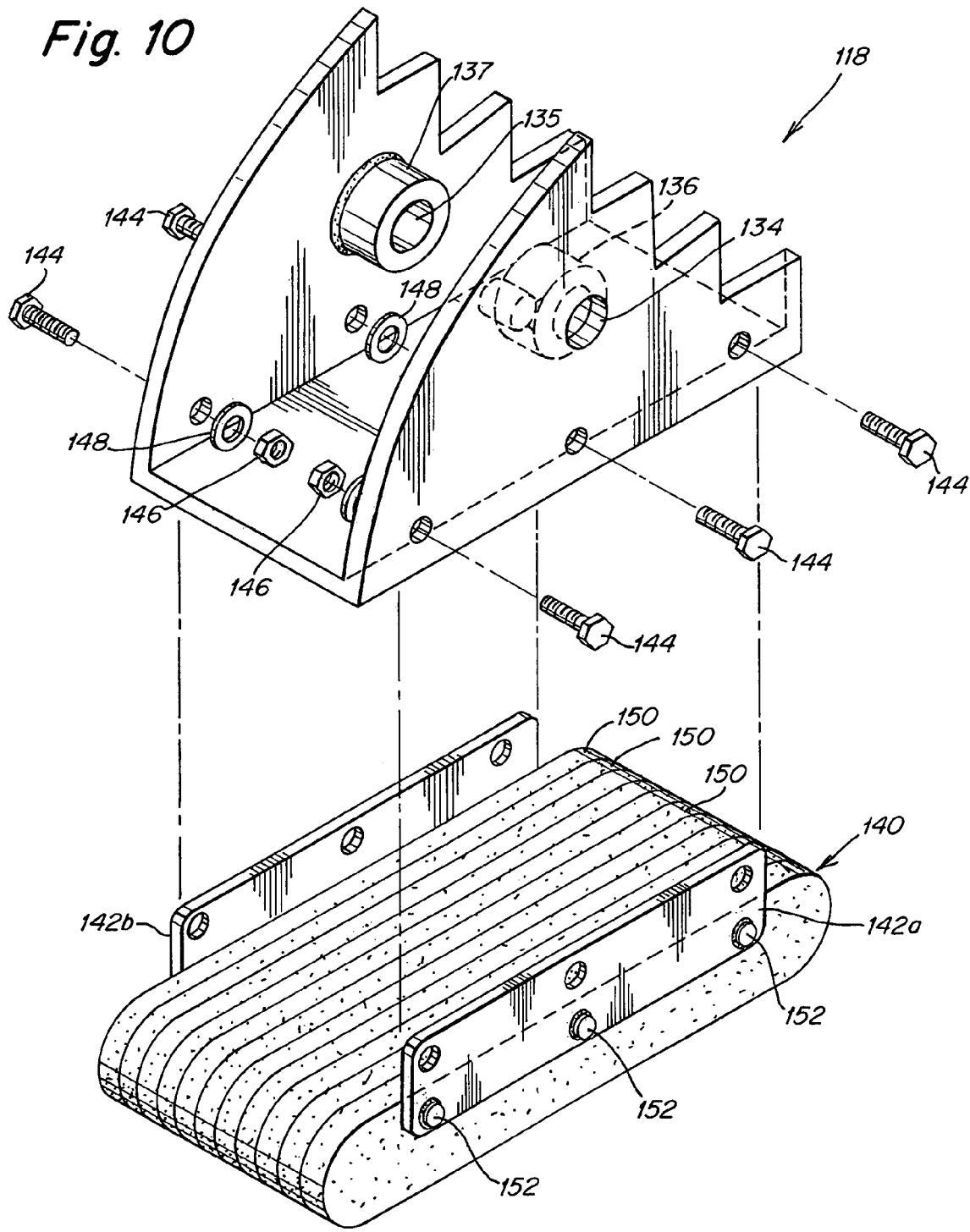
FIG. 10 is an exploded perspective view of the stabilizer pad of FIG. 4 in the position for engaging a smooth surface.

Mounted to the underside of the base plate 122 is a resilient pad 140. The resilient pad 140 is secured to the frame using brackets 142a and 142b which respectfully couple to flanges 124 and 126. The brackets are mounted to the flanges using bolts 144, nuts 146 and washers 148, as best shown in FIG. 10.

The resilient pad 140 is formed using a plurality of rubber strips 150 that are compressed using brackets 142a and 142b and steel rods 152. In the embodiment shown, the steel rods 152 are welded to each of the brackets 142a and 142b, however, in other embodiments, the steel rods can be replaced by bolts and nuts. In one embodiment of the present invention, the rubber strips are made from sidewall segments of truck tire carcasses or from rubber conveyor belts, both of which have been found to provide desirable flexibility and surface friction for use in stabilizer pads.

Each of the flanges 124 and 126 has a hole, respectfully 134 and 135 in alignment with bushings 136 and 137. The holes and bushings are designed to accommodate the pin 34 of the stabilizer arm 14 to couple the stabilizer arm to the stabilizer pad as in the prior art.

The stabilizer pad 118 includes an optional cam 156 mounted to bushing 136. In addition, the stabilizer arm 14 includes a polyethylene wheel 154 mounted to the side of the stabilizer arm as shown in FIG. 4, using a bolt and a nut. In one embodiment, the cam is made from a steel rod and is welded to the bushing, however, in other embodiments, the cam may be made from other relatively hard materials and fastened to the arm using other techniques. The polyethylene wheel and cam prevent inadvertent flipping of the stabilizer pad as described further below and as described in U.S. patent application Ser. No. 08/909,524, which is incorporated herein by reference. Other mechanisms for preventing self-flipping, such as those described in U.S. Pat. Nos.

5,054,812 and 5,667,245, may also be used with stabilizer pads of the present invention.

Figure 6:
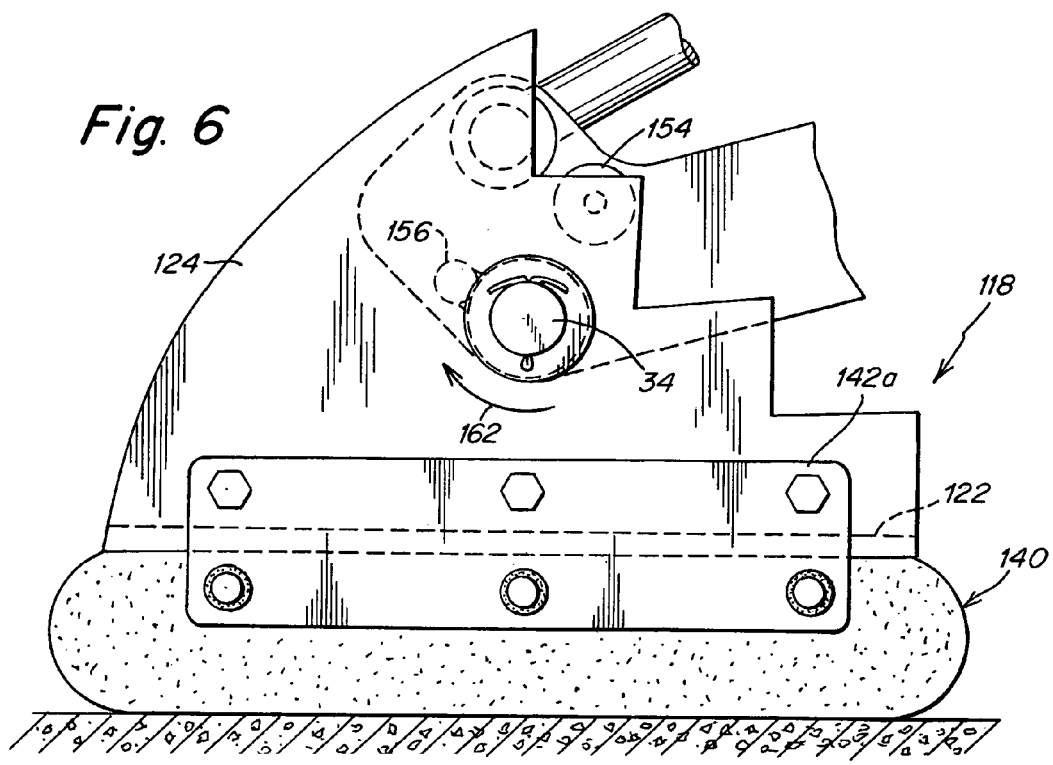
FIG. 6 is a side view of the stabilizer pad of FIG. 4 with the stabilizer pad in the position for engaging a smooth surface.

Stabilizer pad 118 is rotatable about pin 34 when the stabilizer arm is in its upright position to place either the resilient pad 140 or the grouser points 130 downward to engage the ground when the stabilizer arms are lowered to stabilize the vehicle. When the vehicle is operated on a smooth, finished ground surface, it is desirable to place the resilient pad 140 of the stabilizer pad 118 in contact with the ground surface. When the vehicle is operated on a rough or unfinished ground surface, it is desirable to position the stabilizer pad such that the outer grouser points 130, and in some instances the inner grouser points 131, contact the ground surface. FIGS. 4 and 6 show the stabilizer pad with the resilient pad 140 in position to engage the ground surface, while FIGS. 5 and 7 show the stabilizer pad with the outer grouser points 130 in position to engage the ground surface.

Figure 7:
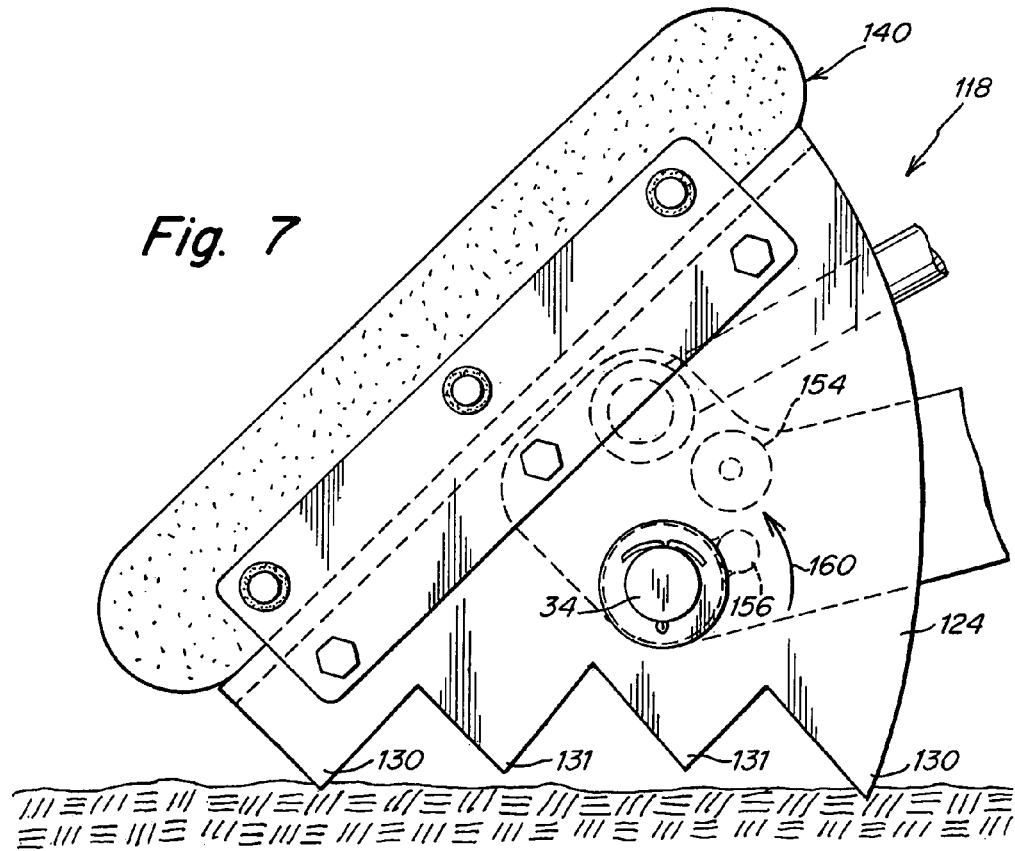
FIG. 7 is a side view of the stabilizer pad of FIG. 4 with the stabilizer pad in the position for engaging a gravel or dirt ground surface.
Figure 8:
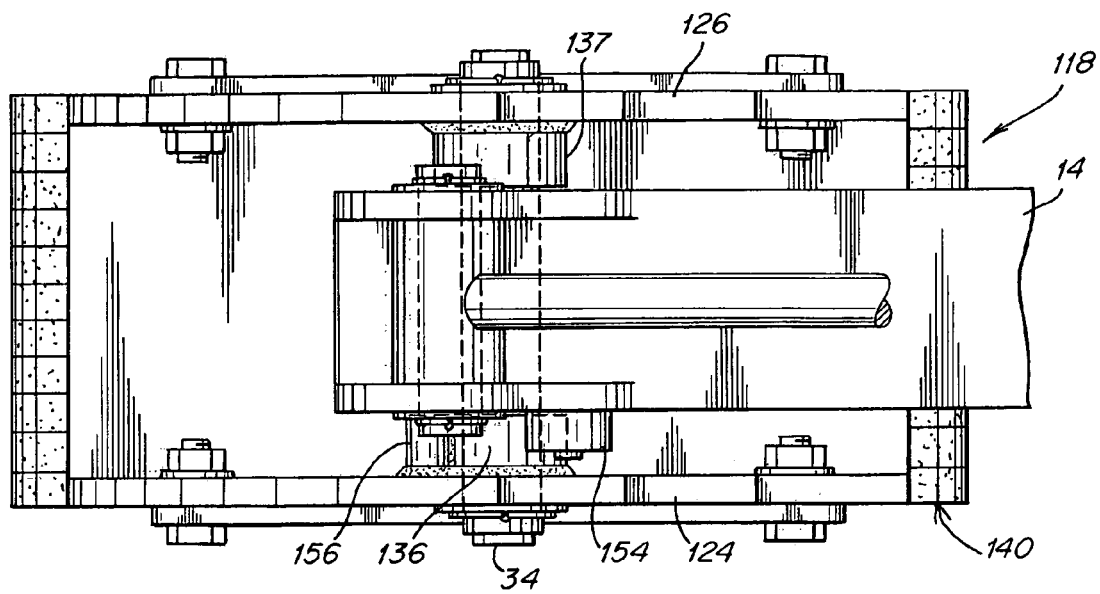
FIG. 8 is a top view of the stabilizer pad of FIG. 4 with the stabilizer pad in the position for engaging a smooth surface.
Figure 9:
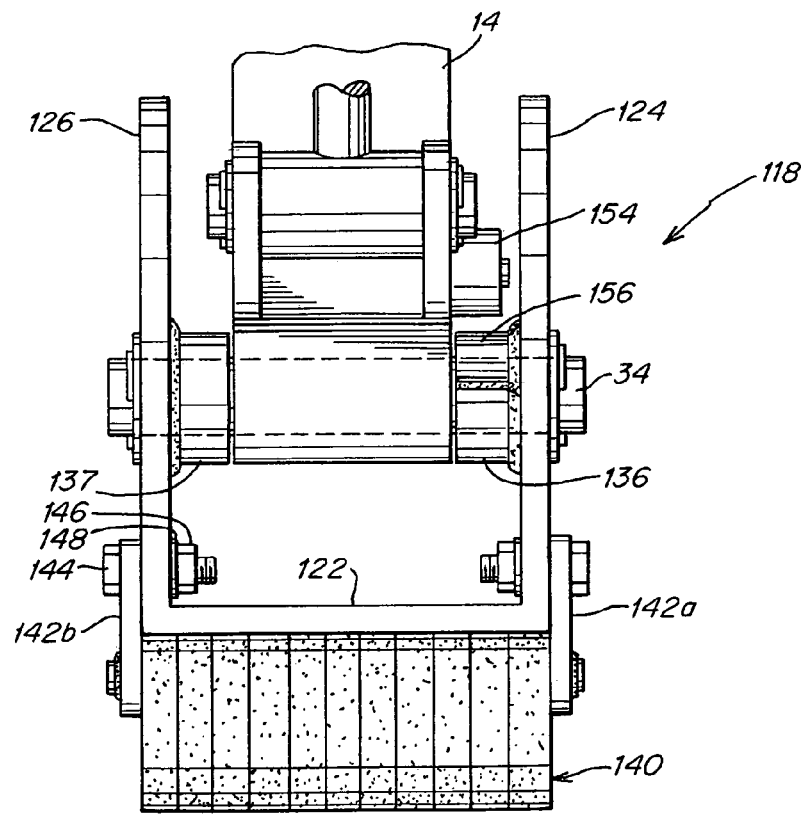
FIG. 9 is a front view of the stabilizer pad of FIG. 4 with the stabilizer pad in the position for engaging a smooth surface.

As shown in FIG. 7, the outer grouser points 130 are slightly longer than the inner grouser points 131 allowing the outer grouser points to contact the ground surface to provide maximum stability. On particularly rough or uneven surfaces, the inner grouser points may also contact the ground surface. In other embodiments of the present invention, the stabilizer pad 118 may not include the inner grouser points.

As briefly discussed above, the polyethylene wheel 154 and cam 156 are used to prevent the stabilizer pad 118 from inadvertently flipping when the stabilizer arm is raised. The weight of the resilient pad 140 may cause the stabilizer pad to flip from the position shown in FIG. 7 to that shown in FIG. 6 by rotating in the direction of arrow 160 when the stabilizer arm is raised. When the stabilizer pad rotates in the direction shown by arrow 160, the cam 156 contacts the wheel 154 and prevents further rotation of the stabilizer pad. When it is desired to flip the stabilizer pad from the position shown in FIG. 7 to that shown in FIG. 6, additional rotational force can be applied to the stabilizer pad by an operator of the vehicle to cause the polyethylene wheel 154 to deform slightly and allow the cam to pass by the polyethylene wheel.

To rotate the stabilizer pad from the position shown in FIG. 6 to that shown in FIG. 7, the stabilizer pad is rotated approximately 135° about the pin 34 in the direction shown by arrow 162 (see FIG. 6). Similarly, to move from the position shown in FIG. 7 to that shown in FIG. 6, the stabilizer pad 118 is rotated approximately 135° about pin 34 in the direction shown by arrow 160.

Figure 11:
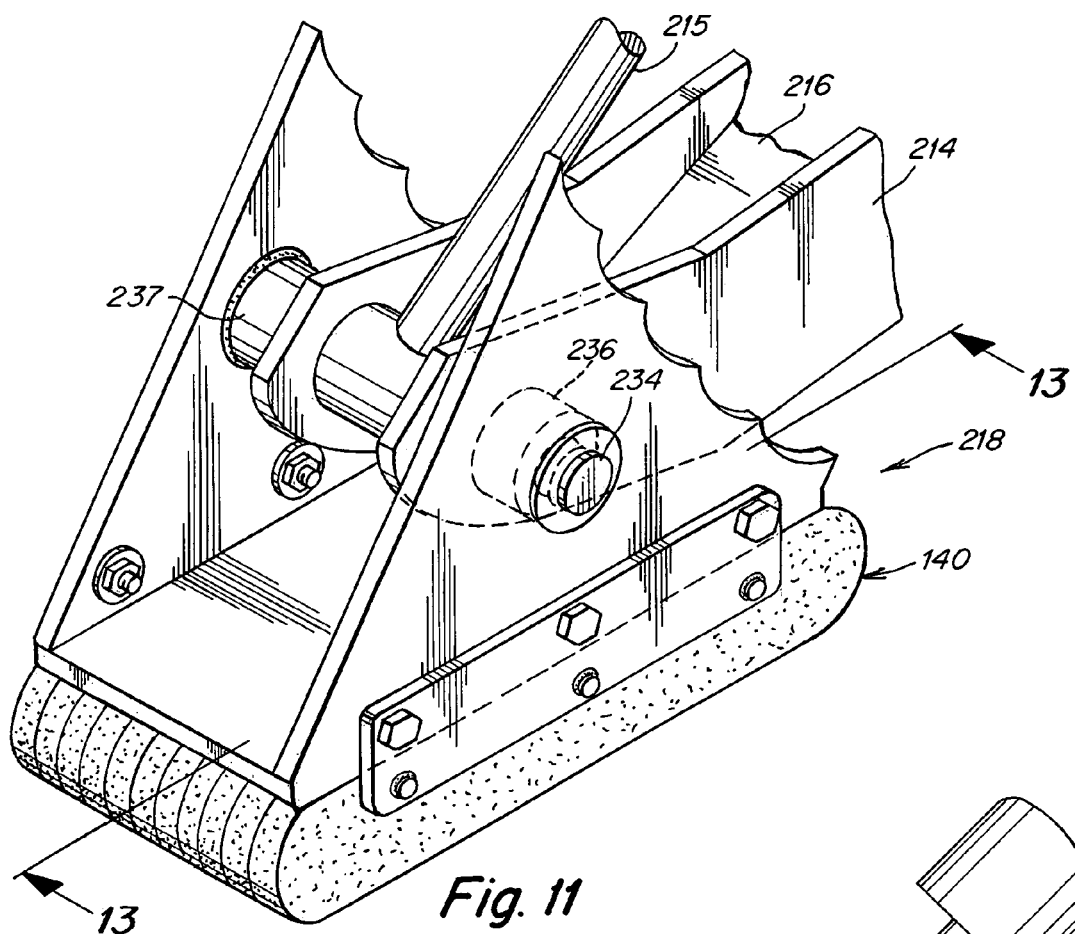
FIG. 11 is a perspective view of a second embodiment of a stabilizer pad with the stabilizer pad in the position for engaging a smooth surface.
Figure 12:
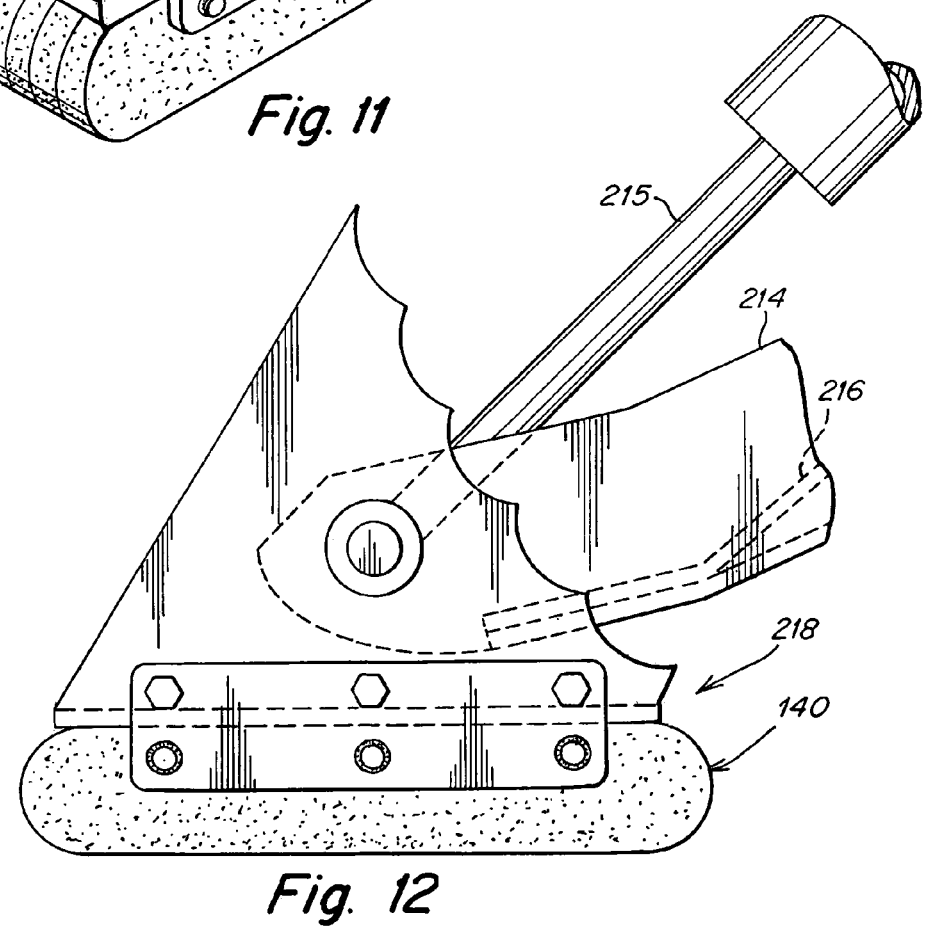
FIG. 12 is a side view of the stabilizer pad of FIG. 11.
Figure 13:
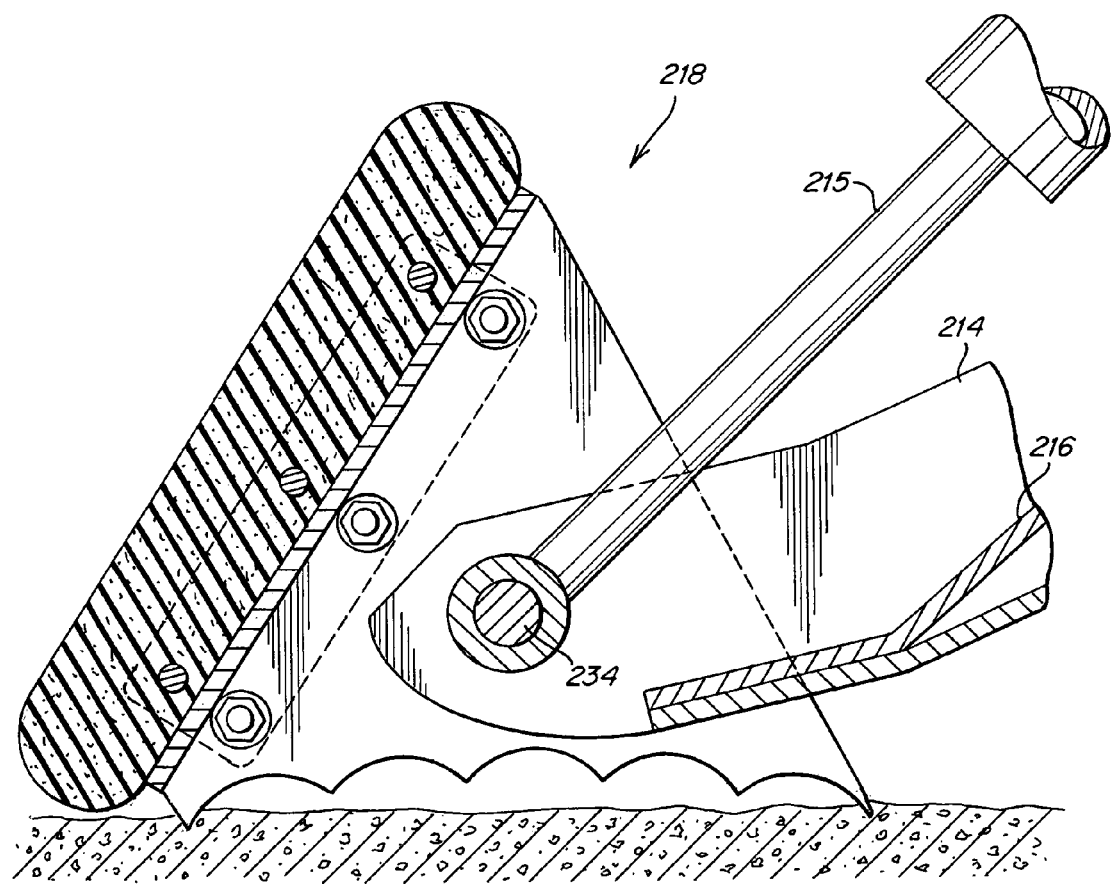
FIG. 13 is a cross-sectional side view taken along line 13—13 of FIG. 11 with the stabilizer pad in the position for engaging a dirt or gravel surface.

A second embodiment of a stabilizer pad 218 in accordance with the present invention will now be described with reference to FIGS. 11–13, which show the stabilizer pad 218 mounted to a stabilizer arm 214. Stabilizer arm 214 differs from stabilizer arm 14 in that it includes only one pin 234 for coupling to both a hydraulic piston 215 and to the stabilizer pad 218. In addition, the stabilizer arm 214 includes a steel plate 216 contained within the stabilizer arm to provide rigidity to the stabilizer arm. Stabilizer pad 218 is similar to stabilizer pad 118, and similar components are labeled using the same reference numbers. Stabilizer pad 218 differs from stabilizer pad 18 in that the bushings 236 and 237 used to mount the stabilizer pad 218 to the stabilizer arm 214 are sized to accommodate the pin 234.

A third embodiment of a stabilizer pad 318 for use on the stabilizer arm 14 will now be described with reference to FIGS. 14–16. The third embodiment includes flange pieces 324 and 326 and a resilient pad 340. The flanges 324 and 326 are coupled together through the pin 34 of the stabilizer arm and are coupled to the resilient pad 340. The flange pieces have bushings 336 and 337 for receiving the pin 34. Each of the flange pieces has a pair of outer grouser points 330 and three inner grouser points 331. Each of the flange pieces also includes a pair of right angle re-enforcing sections 332 and 334, which provide structural re-enforcement for the pad and as described below provide additional stabilization when the stabilizer pad is used on a rough or unfinished surface. The right angle sections 332 also function as mounting brackets for mounting the reversible resilient pad 340, and each of the right angle sections 332 includes mounting holes 345 for this purpose.

The resilient pad 340, similar to the pad 140 of the first embodiment, is formed from a plurality of rubber strips 350. The rubber strips 350 are compressed between brackets 342a and 342b using steel rods 352. Each of the rubber strips 350 and the brackets 342a and 342b has a slot 362 to receive a mounting plate 322. The mounting plate 322 has mounting holes 360 that align with mounting holes 345 on the flanges to mount the mounting plate to the flanges using bolts 349, washers 346 and nuts 348. In one version of the third embodiment, the flanges 324 and 326 and the mounting plate 322 are made from steel.

Figure 14:
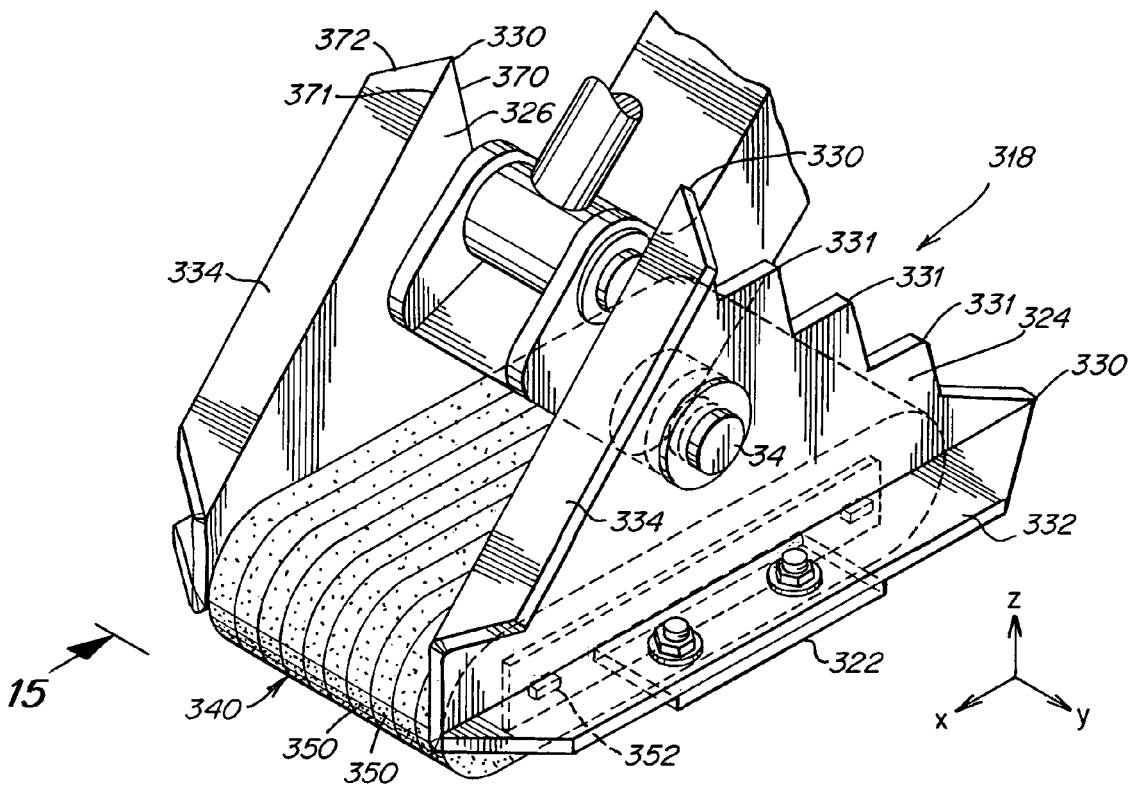
FIG. 14 is a perspective view of a third embodiment of a stabilizer pad with the stabilizer pad in the position for engaging a smooth surface.
Figure 15:
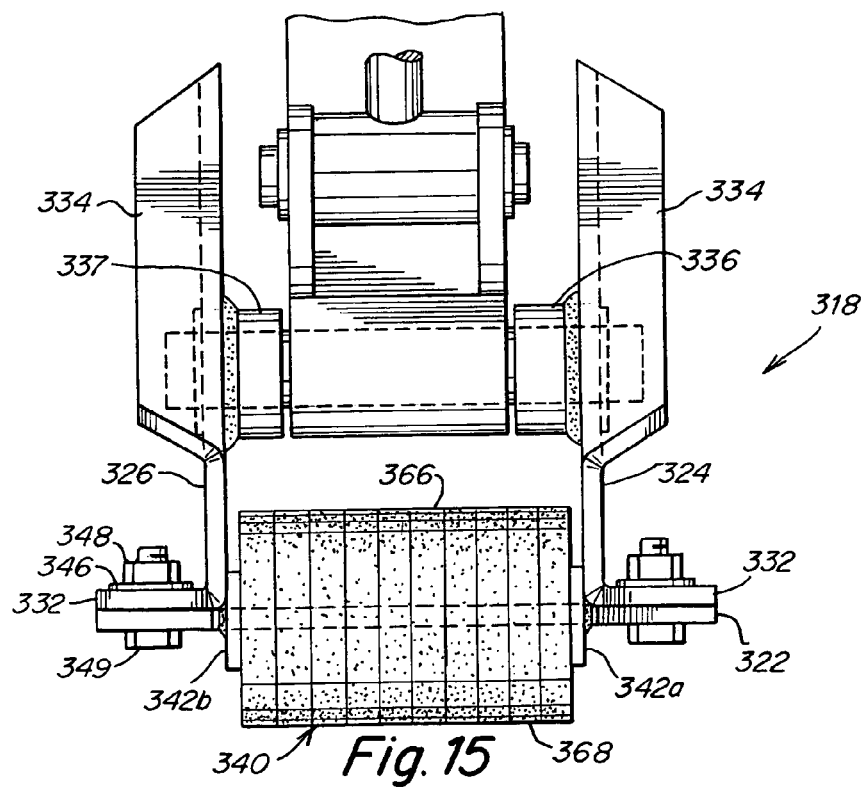
FIG. 15 is a front view of the stabilizer pad of FIG. 14 as taken along line 15—15 of FIG. 14.
Figure 16:
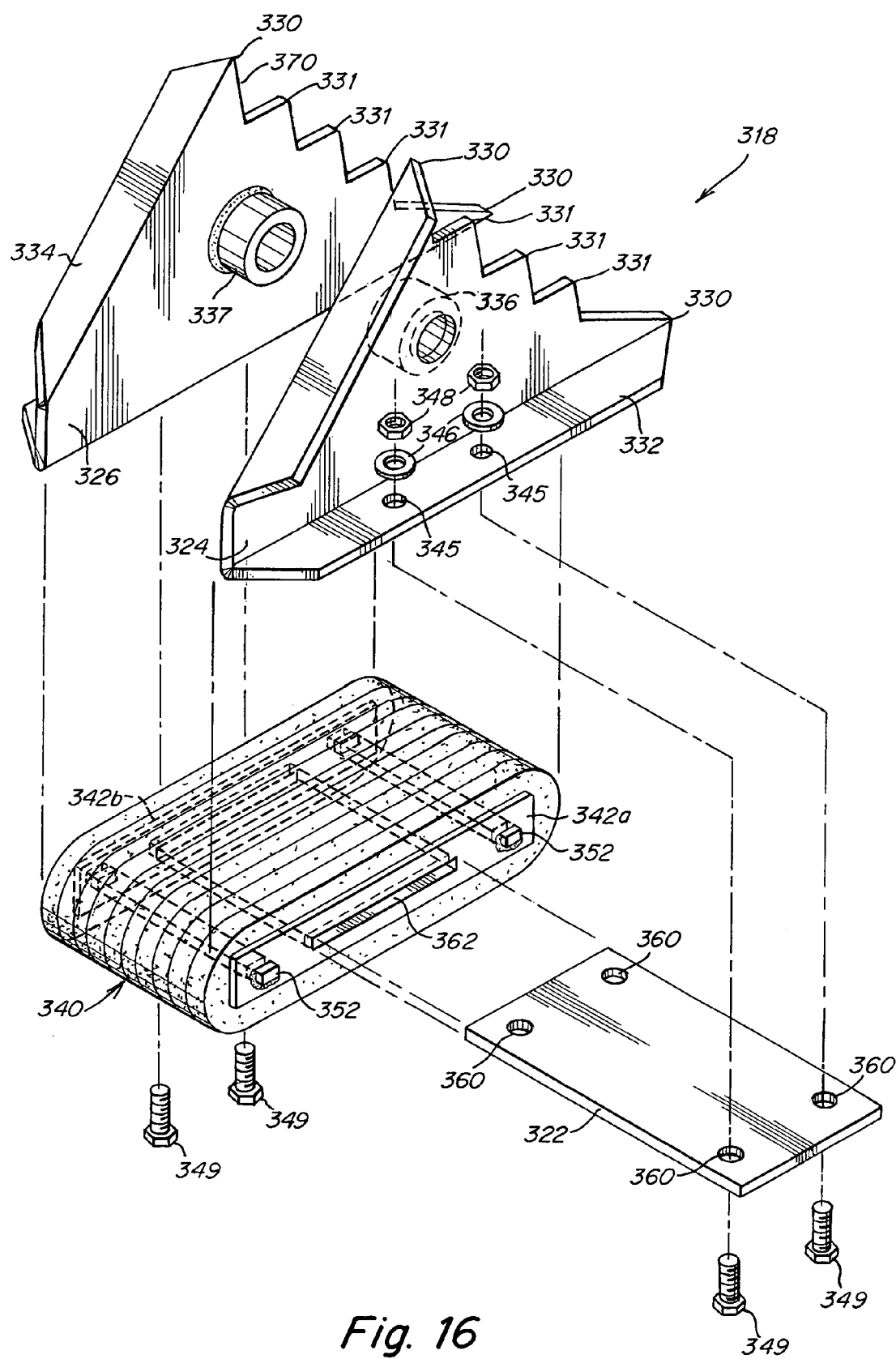
FIG. 16 is an exploded perspective view of the stabilizer pad of FIG. 14.

One significant advantage of the embodiment of the invention shown in FIGS. 14–16 is that the resilient pad 340 is reversible to extend the life of the pad. The resilient pad 340 can be mounted such that either surface 368 contacts the ground (as shown in FIG. 15), or such that surface 366 of the pad contacts the ground. With the resilient pad 340 removed from the flanges, the resilient pad can be rotated 180 degrees to change from surface 368 of the pad facing down to surface 366 of the pad facing down. The rubber strips used with stabilizer pads can wear over time, and the ability to change surfaces of the resilient pad 340 significantly extends the usable life of the resilient pad.

Stabilizer pad 318 is rotatable about pin 34 in a manner similar to stabilizer pad 118 described above to allow either the resilient pad 340 or the grouser points to contact the ground. As with stabilizer pad 118, the outer grouser points 330 are longer than the inner grouser points 331.

In FIGS. 14 and 15, stabilizer pad 318 is shown mounted to the stabilizer arm 14 using pin 34. In other embodiments, the stabilizer pad 318 may be mounted to stabilizer arm 214 using a common pin, such as pin 234 in FIG. 11, with the hydraulic piston 215.

Figure 3:
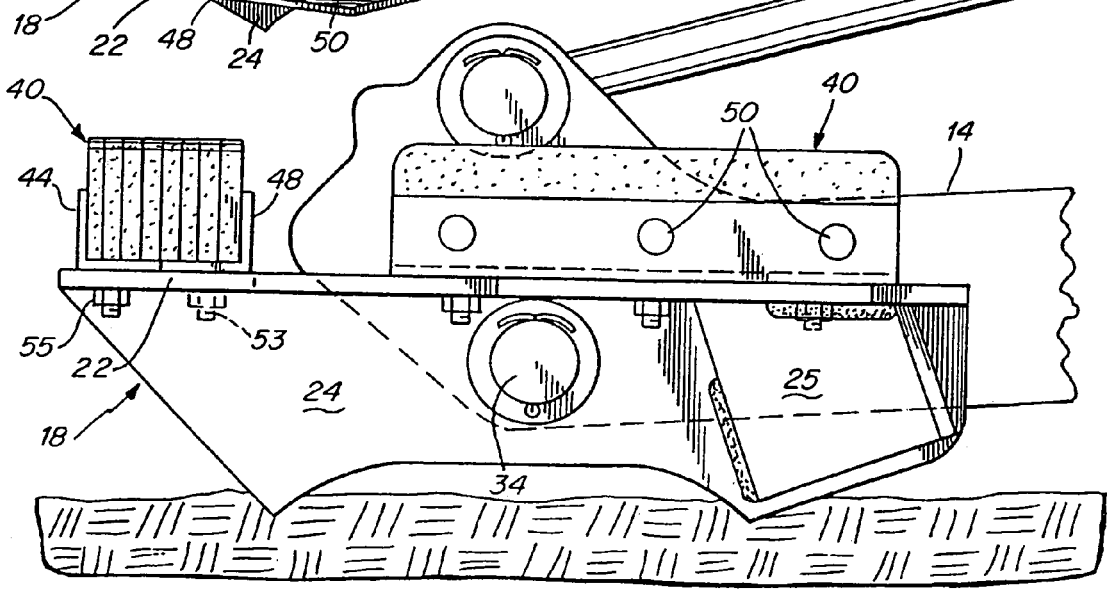
FIG. 3 is a side elevational view of the stabilizer pad and arm construction in the position of FIG. 2.

The right angle sections 332 and 334 provide additional stability for the stabilizer pad 318 when the grouser points 330 contact the ground. Typical grouser points, such as those provided on flanges 24 and 26 of prior art stabilizer pad 18 (FIG. 3), have angled surfaces extending in opposite directions along one axis from the tip of the grouser point. Grouser points 330 have angled surfaces 370 and 371 extending from the tip of the grouser points in opposite directions along an x axis (see FIG. 14 for axis orientation), and in addition have angled surfaces 372 extending in a direction along a y-axis orthogonal to the x-axis. The right angle sections provide additional stability by resisting movement of the stabilizer pad in the y-axis direction. As understood by one skilled in the art, in other embodiments, the right angle sections 332 and 334 may form an angle other than ninety degrees with the flanges.

A fourth embodiment of a stabilizer pad 418 in accordance with the present invention will now be described with reference to FIGS. 17 and 18. Stabilizer pad 418 is similar to stabilizer pad 318 and like parts are labeled using the same reference numbers. Stabilizer pad 418 differs from stabilizer pad 318 in that the resilient pad 440 of stabilizer pad 418 has two separate slots 462a and 462b rather than one slot 362 as in resilient pad 340 of stabilizer pad 418. In addition, the mounting plate 322 of stabilizer pad 318 is replaced by two separate mounting plates 422a and 422b in stabilizer pad 418. In the fourth embodiment, two mounting plates are used to mount the resilient pad to the flanges, in other embodiments, more than two mounting plates may be used. In the third and fourth embodiments, the mounting plate or mounting plates act as the base plate for the stabilizer pads.

Figure 19:
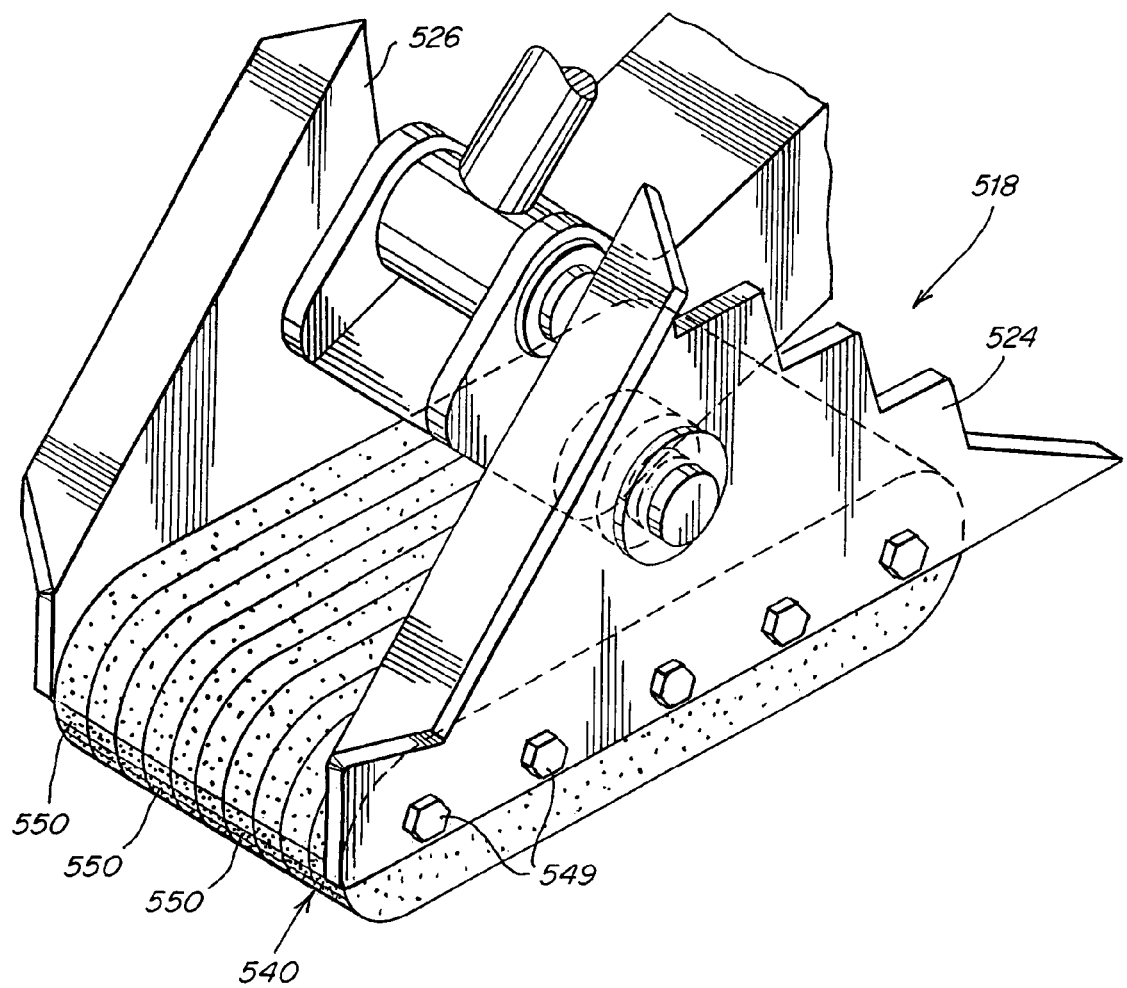
FIG. 19 is a perspective view of a fifth embodiment of a stabilizer pad with the stabilizer pad in the position for engaging a smooth surface.

A fifth embodiment of a stabilizer pad 518 in accordance with the present invention will now be described with reference to FIGS. 19 and 20. Stabilizer pad 518 is similar to stabilizer pad 318 and like parts are labeled using the same reference numbers. The primary difference between stabilizer pad 518 and stabilizer pad 318 is that a mounting plate is not used to mount the resilient pad to the flanges. Rather, bolts are used to compress the rubber strips of the resilient pad between the flanges of the stabilizer pad 518 as described below. In this embodiment, the resilient pad acts as the base plate of the stabilizer pad. Also the bolts function as a plate support of the pad.

Stabilizer pad 518 includes flanges 524 and 526 and resilient pad 540. Flanges 524 and 526 are similar to flanges 324 and 326 of stabilizer pad 318, except that flanges 524 and 526 do not include right angle brackets 332, and flanges 524 and 526 include mounting holes 545 for mounting the resilient pad to the flanges using bolts 549, washers 546 and nuts 548.

Resilient pad 540 includes rubber strips 550, each of which has holes 562 for receiving the bolts 549. Resilient pad 540 differs from resilient pad 340 in that pad 540 does not include metal brackets for compressing the rubber strips 550. In stabilizer pad 518, the rubber strips 550 are compressed together between the flanges 524 and 526 using the bolts 549 and the nuts 548. In the embodiment shown in FIGS. 19 and 20, the holes 562 for the bolts 549 in the resilient pad 540 are centered between a first planar surface 566 and a second planar surface 568 of the pad 540. This allows the resilient pad to be reversible so that either the first planar surface or the second planar surface is positioned to contact the ground.

A sixth embodiment of a stabilizer pad 618 will now be further described with reference to FIGS. 21 and 22. Stabilizer pad 618 is similar to stabilizer pad 118 described above in that both have a substantially U-shaped frame made from a continuous steel sheet. Stabilizer pad 618 differs from stabilizer pad 118 in that the degree of rotation from one working side of the stabilizer pad to the other working side is 180 degrees for stabilizer pad 618 verses 135 degrees for stabilizer pad 118.

The U-shaped frame of stabilizer pad 618 includes a base plate 622, flanges 624 and 626 and a resilient pad 640. Each of the flanges has grouser points 630. The resilient pad is mounted to mounting holes 639 of the base plate 622 using bolts 649, washers 646 and nuts 648. The resilient pad 640, like resilient pad 140, is formed using a plurality of rubber strips 650 that are compressed using brackets 642a and 642b and steel rods 652. In the embodiment shown, the steel rods 652 are welded to each of the brackets 642a and 642b. Each of the brackets 642a and 642b have right angle sections 643 having holes 644 for mounting the resilient pad 640 to the base plate 622.

A seventh embodiment of a stabilizer pad 718 in accordance with the present invention will now be described with reference to FIG. 23. Stabilizer pad 718 is substantially identical to stabilizer pad 618 except that the U-shaped frame of stabilizer pad 618 is replaced by two flange sections 724 and 726. Each of the flange sections has grouser points 730 and a right angle bracket 722 having mounting holes 739 for mounting the resilient pad to the flange sections.

In stabilizer pads 618 and 718, all of the grouser points 630 and 730 are shown as being of approximately the same height. In other versions, the outermost grouser points on each of the flanges may be longer than the inner grouser points to provide four-point contact of the stabilizer pads at substantially the outermost points on the stabilizer pads to maximize stability.

Figure 17:
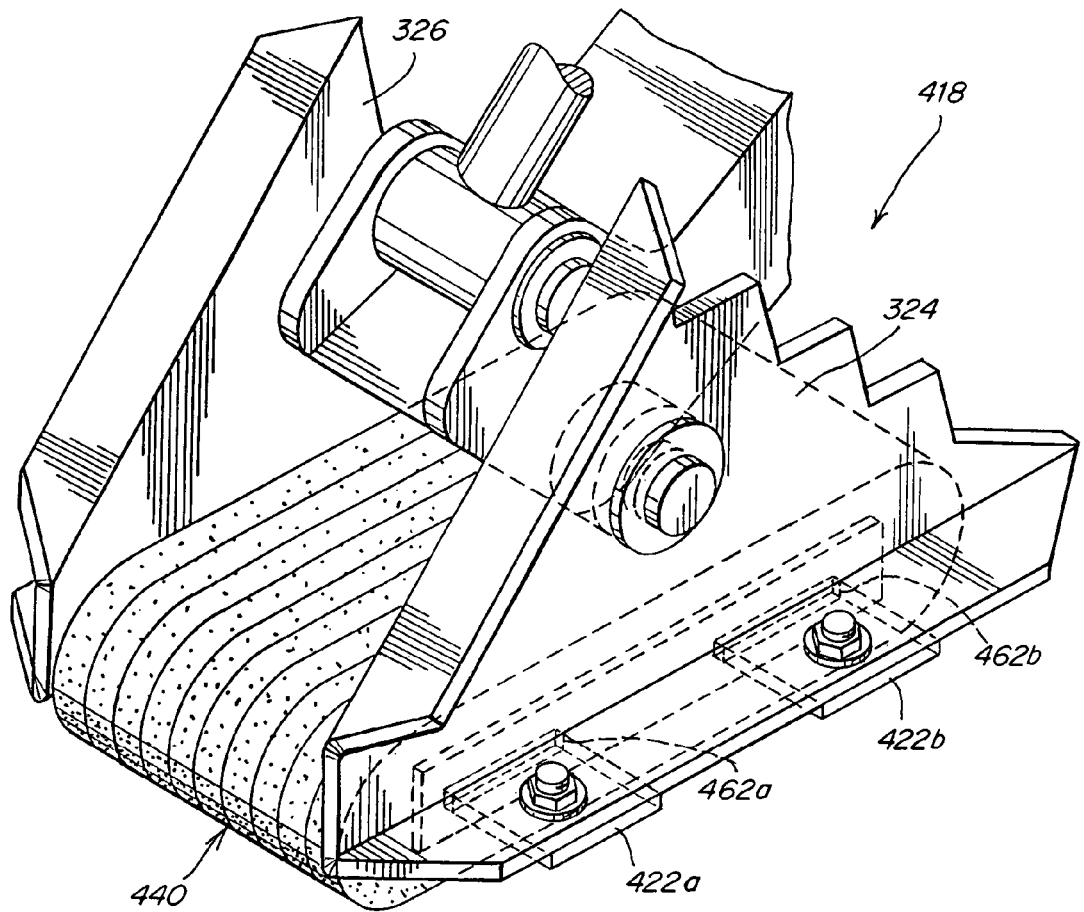
FIG. 17 is a perspective view of a fourth embodiment of a stabilizer pad with the stabilizer pad in the position for engaging a smooth surface.
Figure 18:
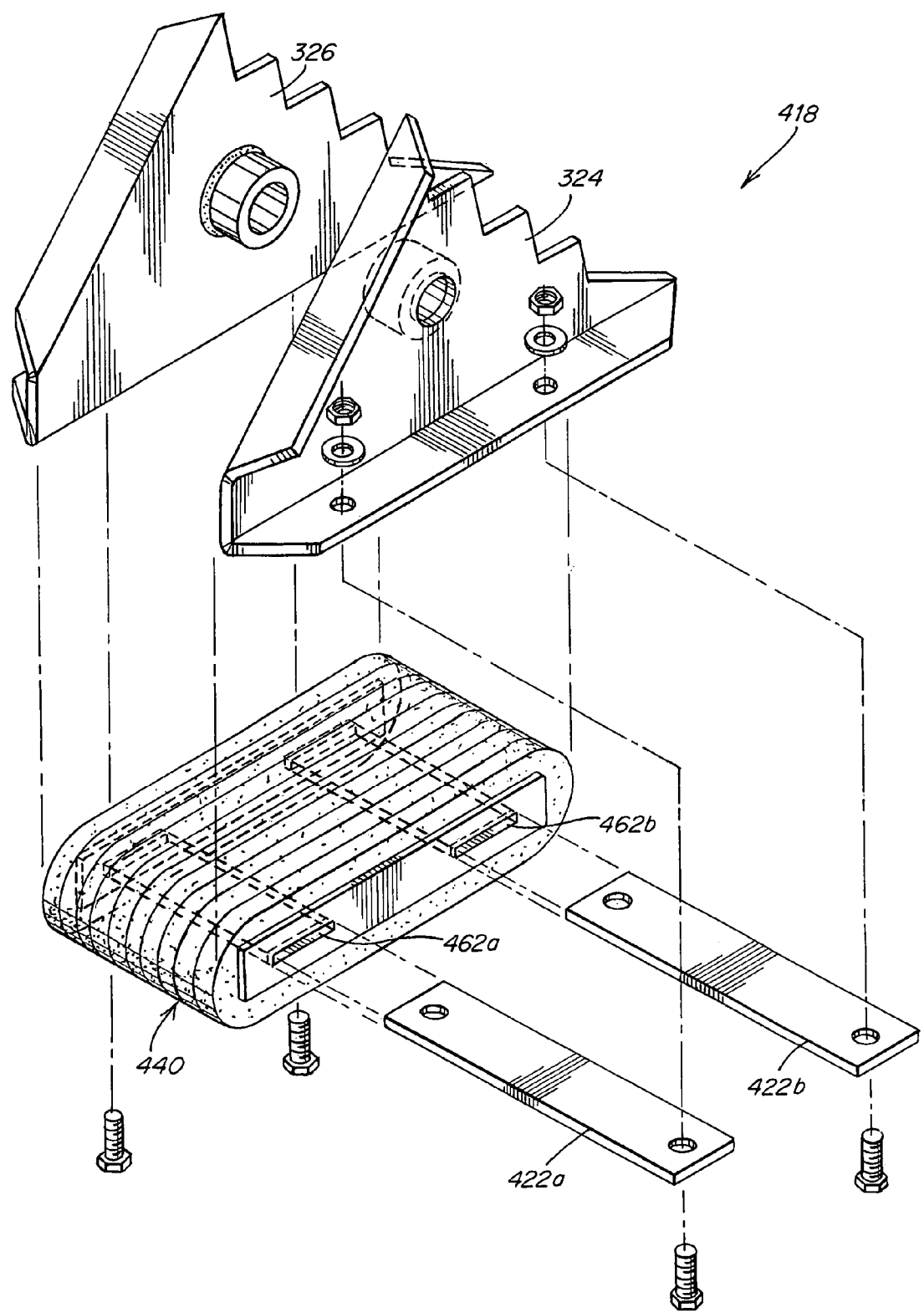
FIG. 18 is an exploded perspective view of the stabilizer pad shown in FIG. 17.
Figure 20:
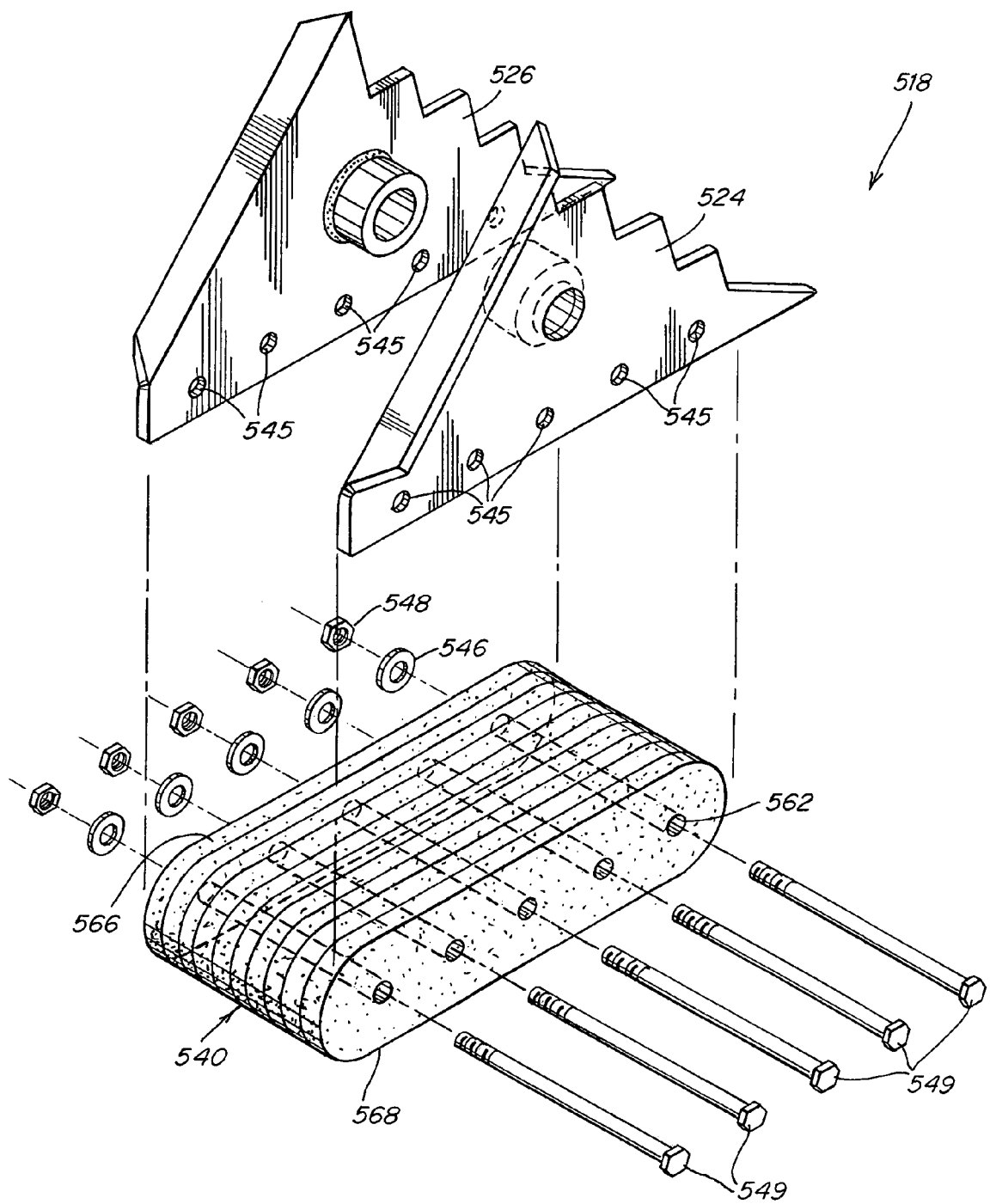
FIG. 20 is an exploded perspective view of the stabilizer pad of FIG. 19.
Figure 21:
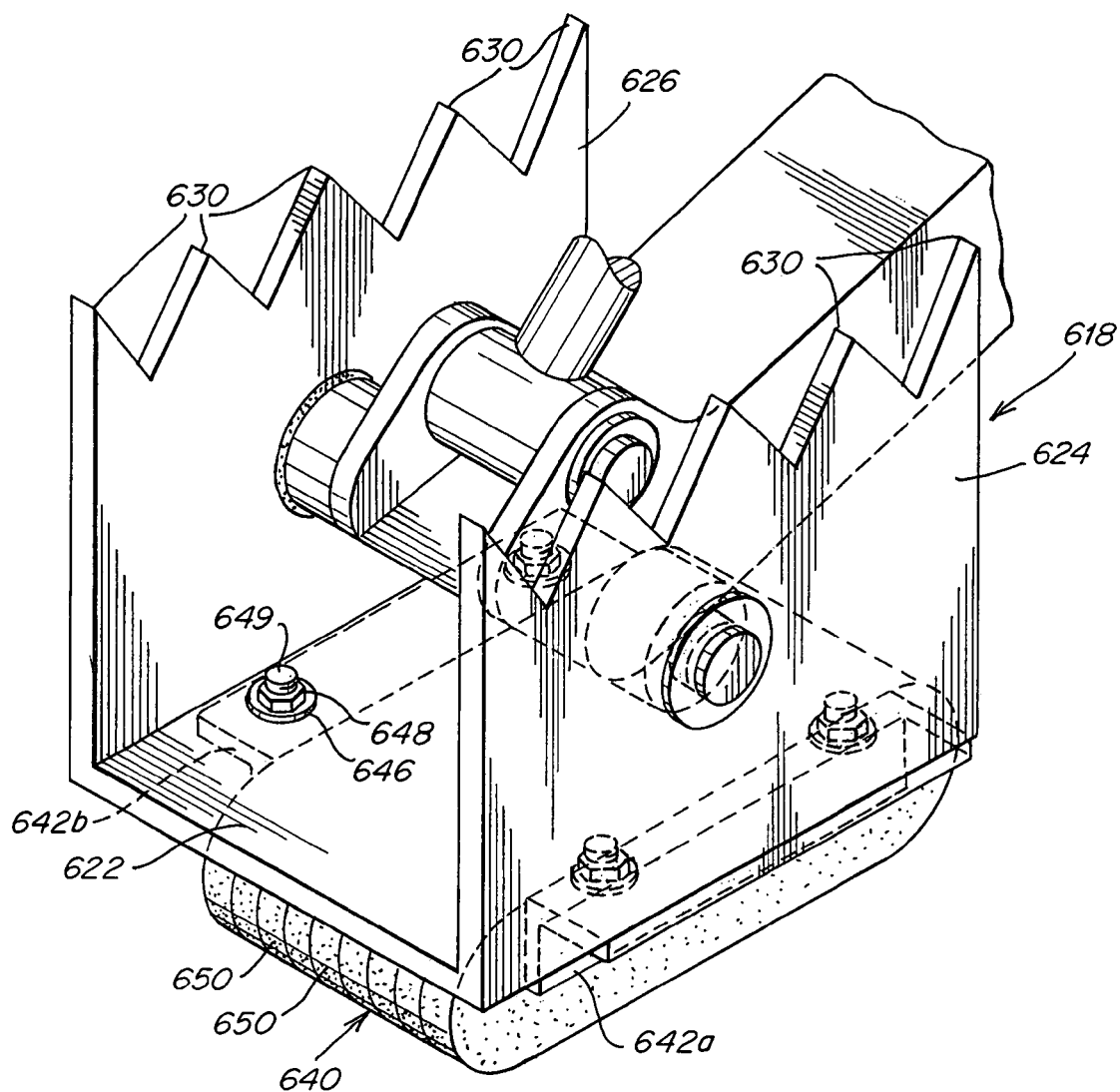
FIG. 21 is a perspective view of a sixth embodiment of a stabilizer pad with the stabilizer pad in the position for engaging a smooth surface.
Figure 22:
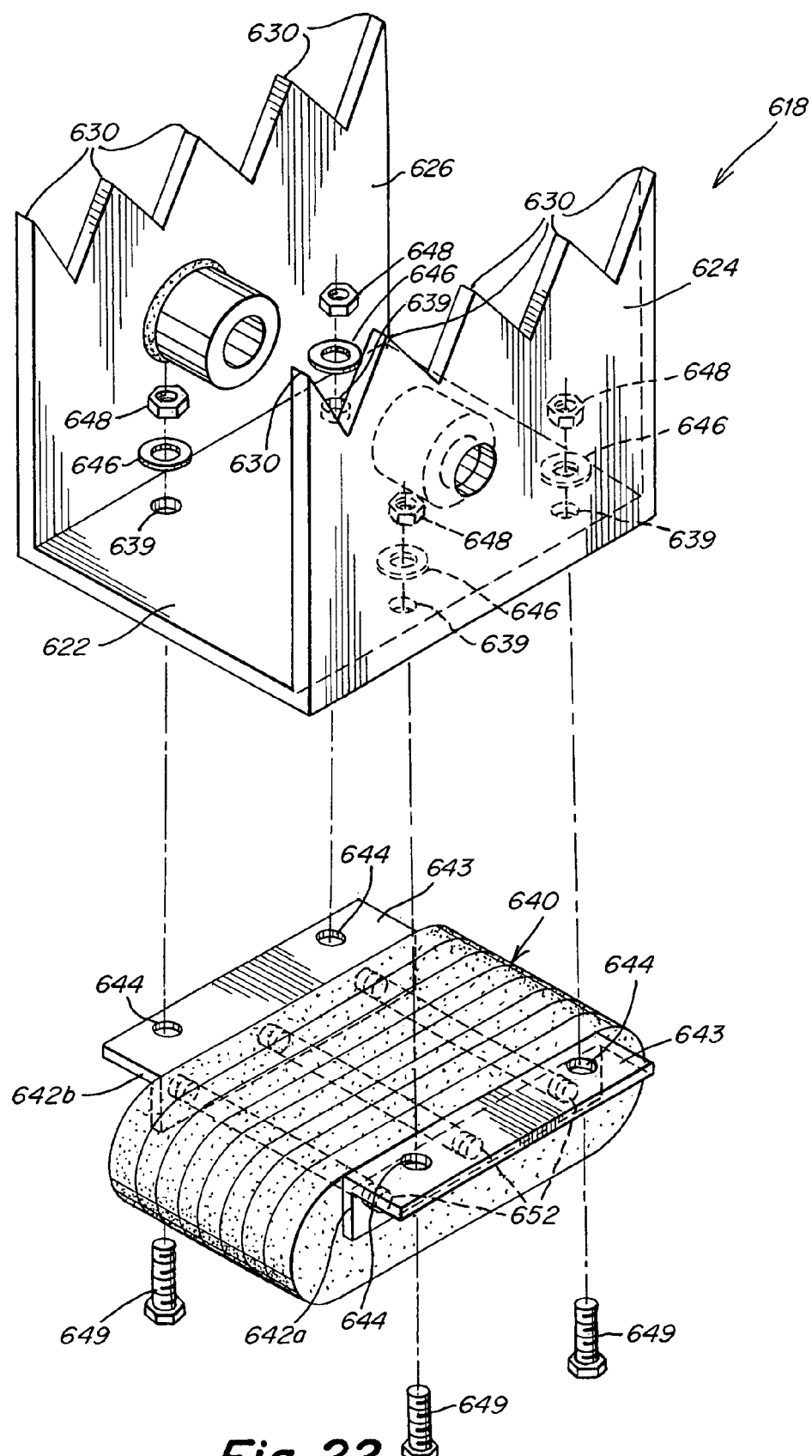
FIG. 22 is an exploded perspective view of the stabilizer pad of FIG. 21.
Figure 23:
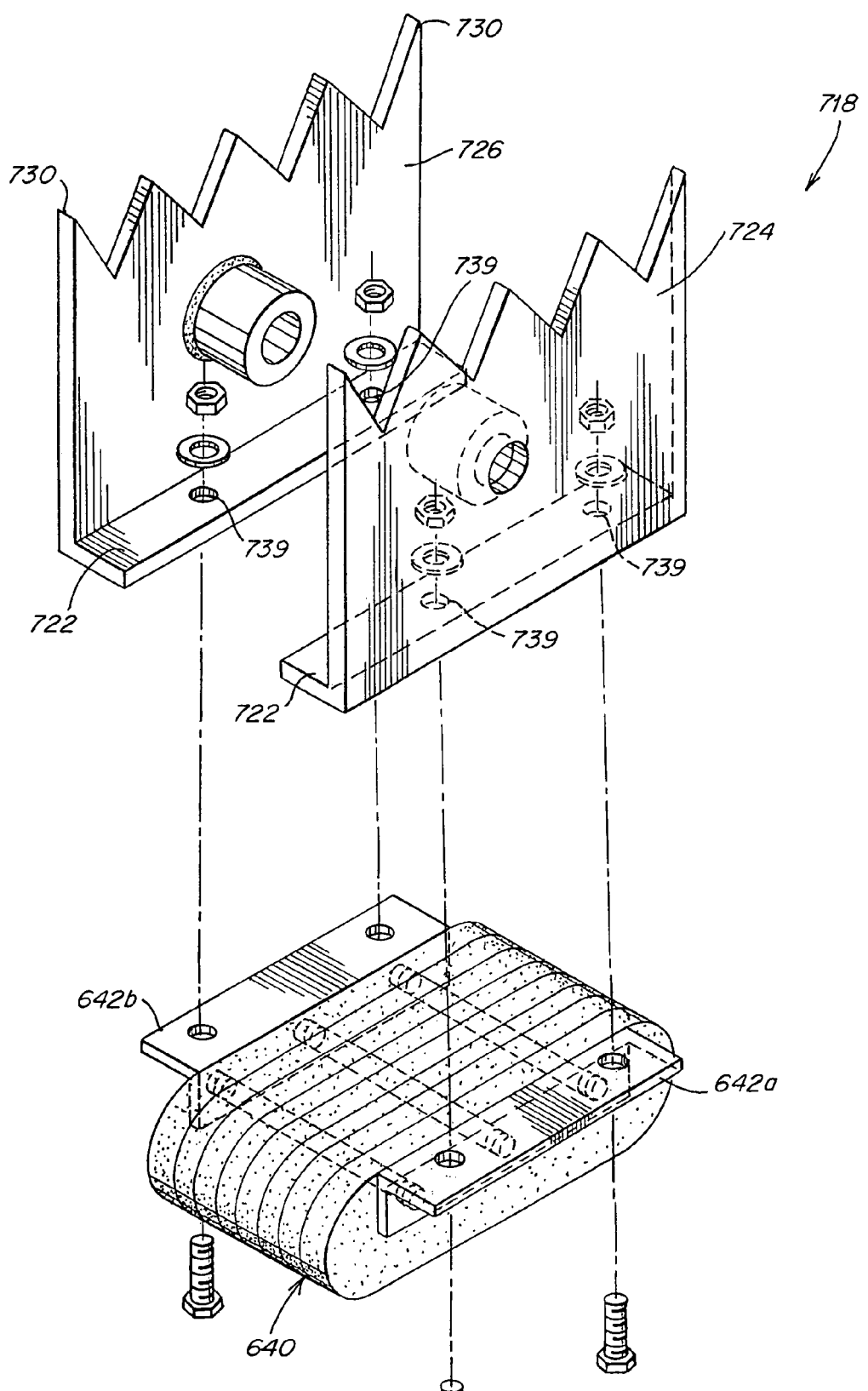
FIG. 23 is an exploded perspective view of a sixth embodiment of a stabilizer pad with the stabilizer pad in the position for engaging a smooth surface.

In other versions of the embodiment shown in FIGS. 21–23, the flanges and brackets can be modified to accommodate the resilient pad 140 shown in FIG. 4, or one of the reversible resilient pads shown in FIGS. 14, 17 and 20.

The embodiments of the invention shown in FIGS. 11–23 do not include the cam 156 and the wheel 158 described above with respect to the stabilizer pad 118. As understood by one skilled in the art, to prevent self-flipping of the stabilizer pads shown in FIGS. 11–23, the cam 156 could be included on the stabilizer pads and the wheel 158 could be included on the arm.

Some embodiments of the present invention described above have reversible rubber pads. The reversible pads could be replaced with single-sided pads as understood by those skilled in the art.

Figure 2:
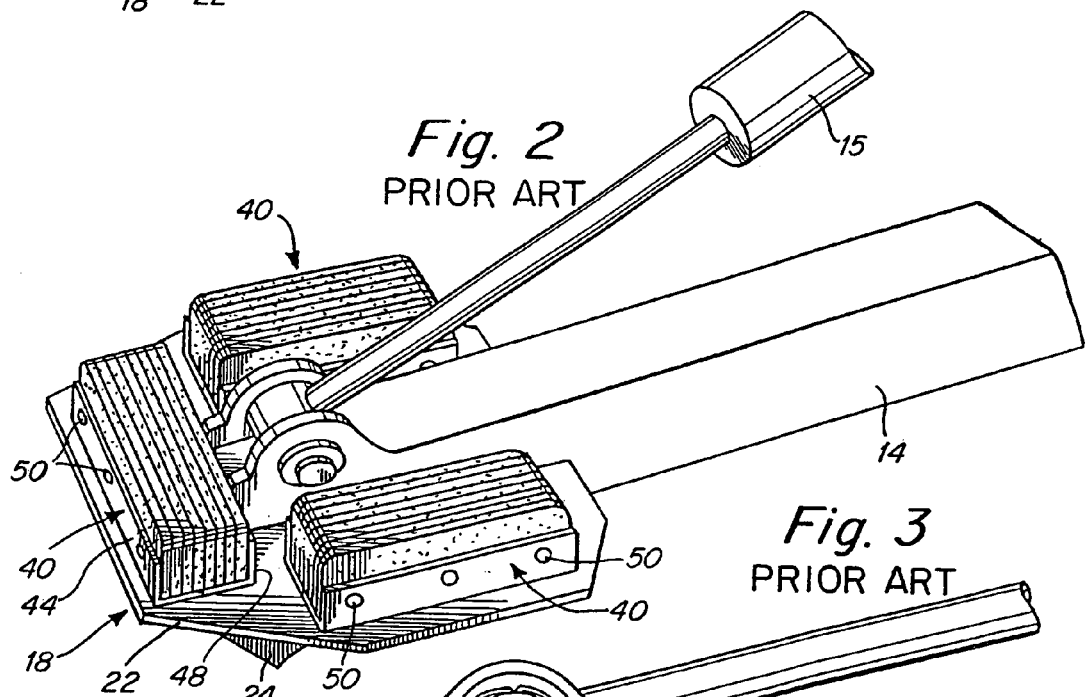
FIG. 2 is a perspective view of the stabilizer pad and arm of FIG. 1 in a gravel or dirt engaging position.

One advantage of embodiments of stabilizer pads of the present invention over prior art stabilizer pads is a reduction in manufacturing costs. In the first embodiment of the present invention, described above with reference to FIGS. 4–10, the U-shaped frame can be formed from one piece of steel without requiring any welding. Alternatively, the U-shaped frame could be manufactured as a single cast piece. A further reduction in manufacturing costs is provided by the use of a single laminated pad in place of the three laminated pads used in the prior art stabilizer pad shown in FIGS. 1–3. In addition to reducing manufacturing costs, stabilizer pads of the present invention are inherently structurally stronger than prior art pads and are therefore less susceptible to wear and have an extended operational life, even in adverse operating environments. Also, the use of a reversible laminated pad significantly increases the life of stabilizer pads of the present invention.

In the prior art, one side of the resilient pad used with stabilizer pads is typically coupled to a rigid mounting member for mounting the resilient pad to the stabilizer pad. The resilient pads used in embodiments of the present invention are mounted to the stabilizer pad at a central point in the pad to allow the pad to have two or more working surfaces to significantly extend the life of the pad. In illustrative embodiments described above, resilient pads have two working surfaces. However, the present invention is not limited to pads having two working surfaces, but includes pads with more than two working surfaces.

In embodiments of the present invention described above, stabilizer pads include flanges having grouser points for engaging a rough or gravel ground surface. As understood by those skilled in the art, grouser points used with embodiments of the present invention are not limited to tapered steel points formed in the flanges, but also include other gripping devices arranged on the stabilizer pad to enable the stabilizer pad to grip a rough or gravel surface to prevent the stabilizer pad from slipping.

An eighth embodiment of a stabilizer pad 818 in accordance with the present invention will now be described with reference to FIGS. 24 and 25. Furthermore, a ninth embodiment of a stabilizer pad 918 will also now be described with reference to FIGS. 26 and 27. Both of these embodiments employ basic stabilizer pad constructions of the type described, for example, in U.S. Pat. Nos. 4,761,021 and 5,050,904. These constructions support the resilient pad laterally in a spaced side-by-side relationship rather than most of the earlier embodiments described herein in which the resilient pad is centrally supported.

Figure 24:
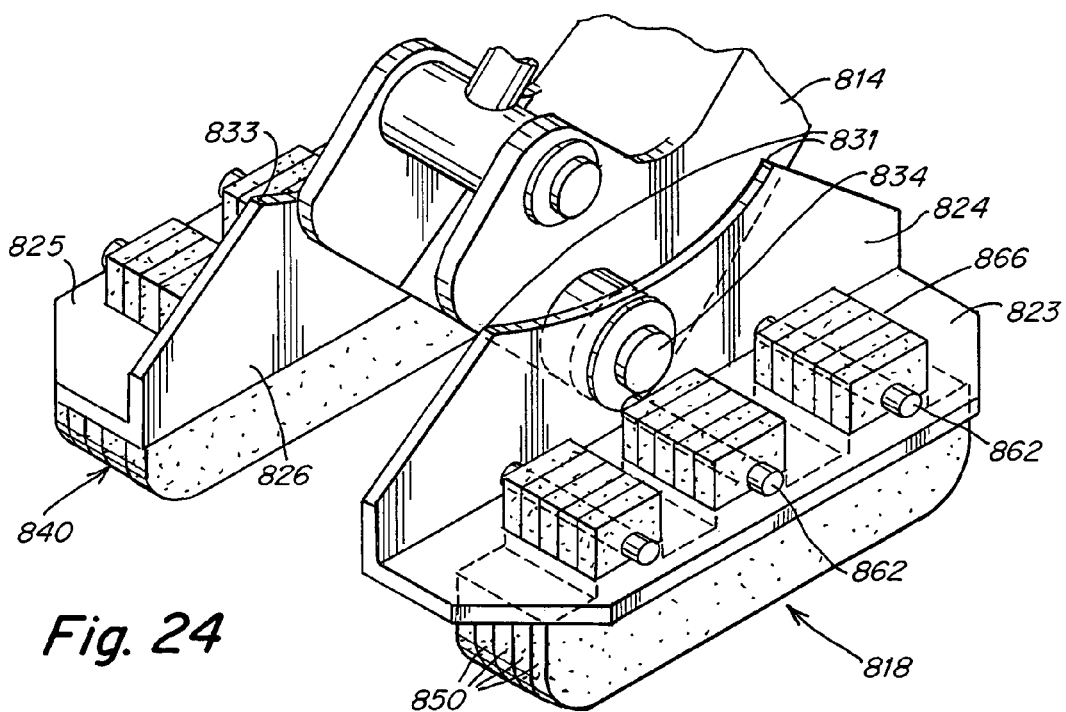
FIG. 24 is a perspective view of a further embodiment of the present invention with the stabilizer pad in a position for engaging a smooth surface.
Figure 25:
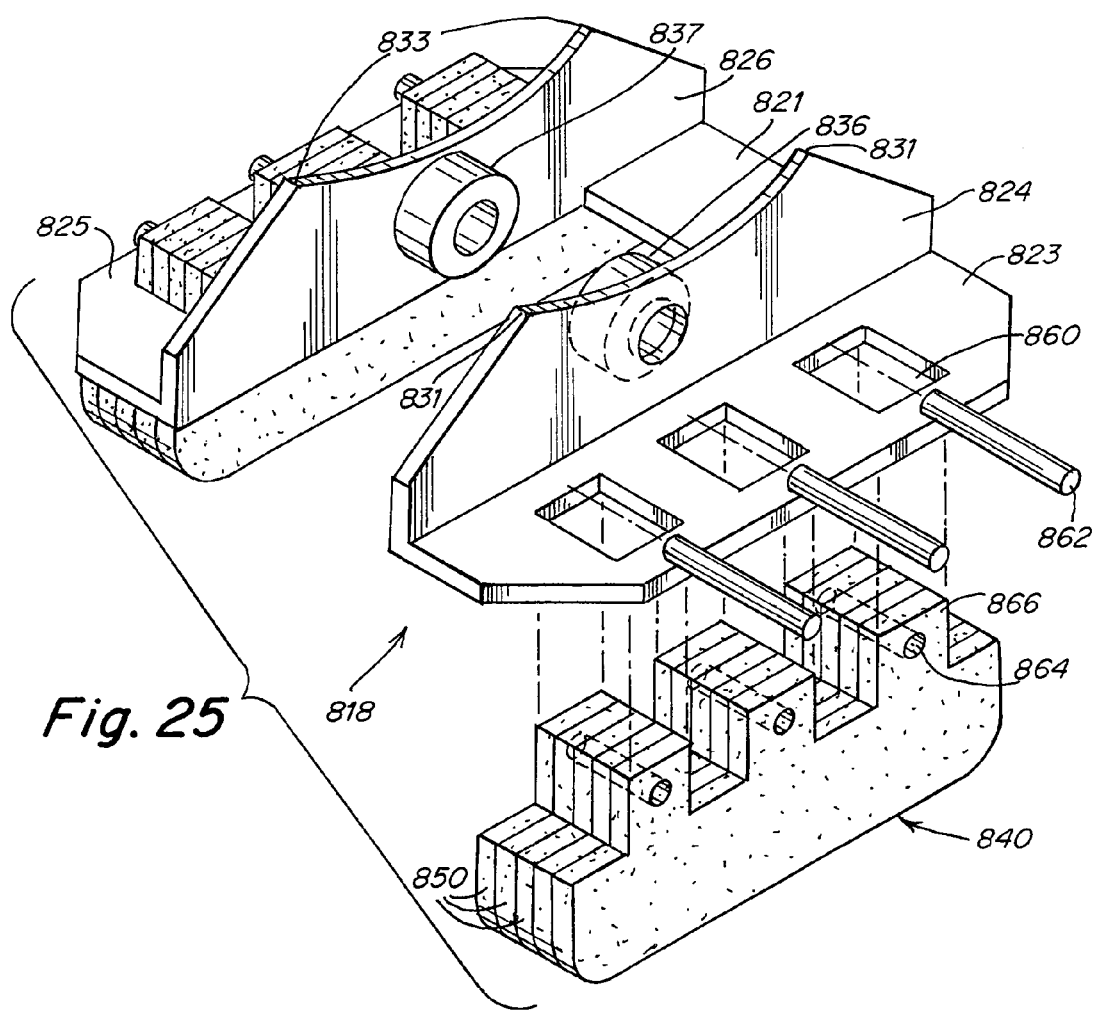
FIG. 25 is an exploded view of the stabilizer pad of FIG. 24.

With further specific reference to FIGS. 24 and 25, there is described a stabilizer pad 818 supported from a stabilizer arm 814. For this support there is provided the bushings 836 and 837 for receiving the support pin 834.

The pad itself is comprised of separate flanges 824 and 826. Each of these flanges has a respective base 823 and 825. For example, the flange 824 is formed with a base 823 in a right angle arrangement and is constructed of a single piece of heavy-duty metal.

Each of the flanges 824 and 826 have respective grouser points 831 and 833. In this particular embodiment there are two grouser points associated with each flange and the grouser points are disposed symmetrically with respect to the bushings associated with each flange. This provides a stable grouser point construction when the pad is used in rough terrain such as in dirt or gravel. In this regard, in the orientation of the pad illustrated in FIGS. 24 and 25, rather than the grouser points contacting the ground, the resilient pads 840 are in position for contact with a ground surface such as an asphalt or concrete surface.

In the embodiment illustrated in FIGS. 24 and 25 the flanges 824 and 826 are interconnected by a cross-piece 821 disposed at one end of each of the flanges. This provides an open center section that receives the arm 814.

The embodiment of FIGS. 24 and 25 provides a quite simplified way of attaching the resilient pad 840 to either of the flanges 823 or 825. For this purpose, each of the flanges is provided with a plurality of slots 860. In the embodiment illustrated in FIG. 24 three slots 860 are provided. However, it is understood that fewer or greater numbers of slots can be employed.

Depending upon the number of slots provided, the resilient pad 840 is likewise cut-out on its top section to provide upstanding portions 866, each having a hole 864 extending therethrough, such as illustrated particularly clearly in FIG. 25. Each of these upstanding portions 866 extends through a corresponding slot 860 into the position illustrated in FIG. 24. A plurality of cross-rods 862 are then used. These extend into the holes 864 and preferably provide a press-fit. The rods 862 are preferably positioned against the top surface of the flange on either side and may be welded to the flange or secured in any other suitable manner to the flange so that the cross-rods do not disengage.

Prior to assembly, the resilient pad 840 which is comprised of a plurality of rubber strips 850, is secured together. These individual strips can be joined together by several different means such as by gluing, stapling, bolting or riveting. Also, the resilient pad 840 can be a single piece molded block still having the cut slots defining the upstanding portions. Further, the strip could be left unglued.

Figure 26:
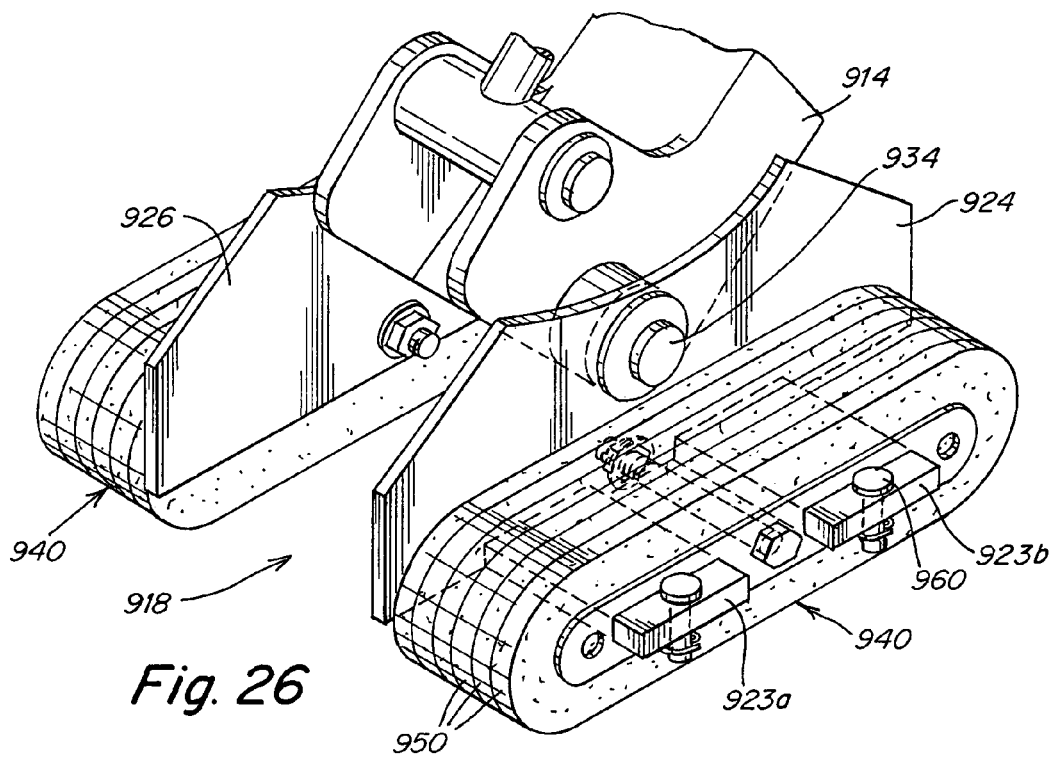
FIG. 26 is a perspective view of still another embodiment of the present invention employing a reversible resilient pad.
Figure 27:
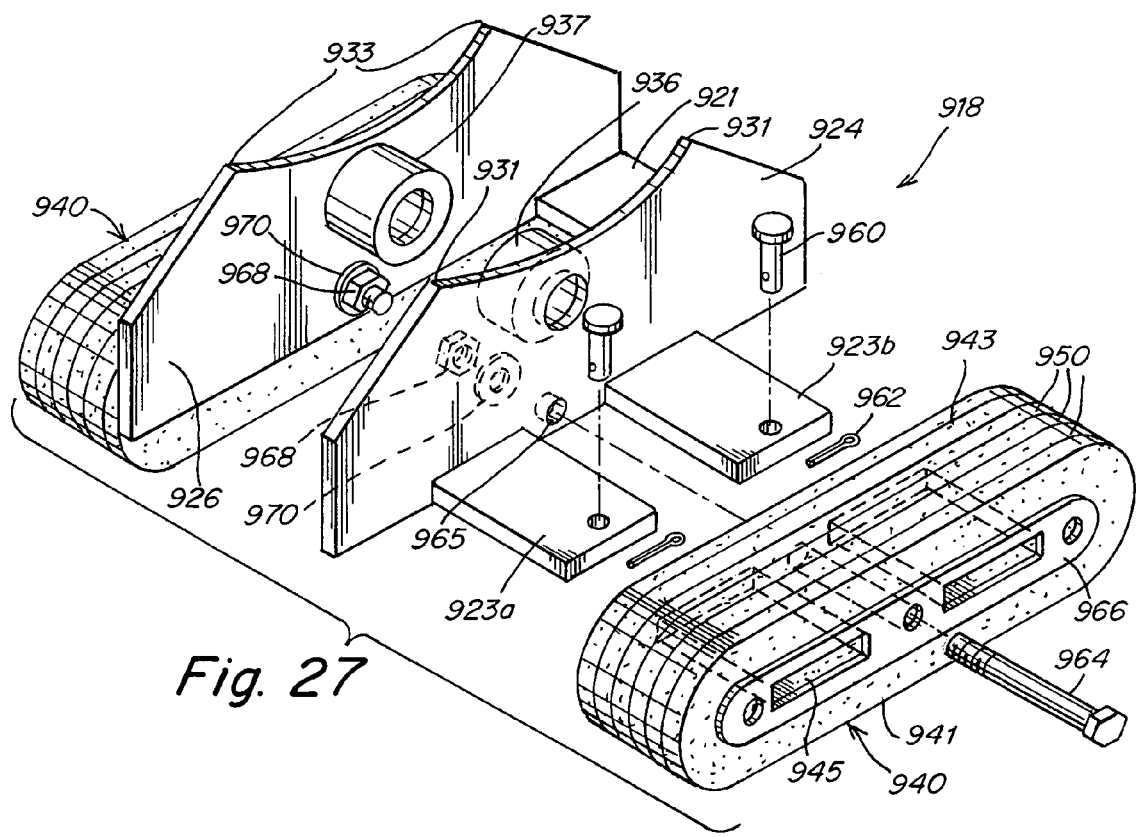
FIG. 27 is an exploded view of the stabilizer pad of FIG. 26.

Now, reference is made to the ninth embodiment of the present invention illustrated in FIGS. 26 and 27. This embodiment, although similar to the embodiment of FIGS. 24 and 25, is different in that the resilient pad 940 in the ninth embodiment is reversible. In this way the resilient pad 940 can be removed and essentially rotated through 180° so that extended wear of the pad becomes an important aspect of this particular construction.

With further reference to FIGS. 26 and 27 there is shown a stabilizer pad 918 that is comprised of flanges 924 and 926. These flanges are similar to the flanges illustrated in FIGS. 24 and 25 and thus include respective grouser points 931 and 933. Instead of the single base piece illustrated in the eighth embodiment, in the ninth embodiment, as illustrated clearly in FIG. 27, there are provided base pieces 923a and 923b. Likewise, the flange 926 has associated therewith base pieces 925a and 925b. Each of these base pieces extends at a right angle from its associated flange and the base pieces are spaced from each other a predetermined distance. Each of the base pieces is provided with a hole at the end thereof for receiving a stud 960, which in turn receives a corresponding cotter pin 962. The purpose of the stud and cotter pin is to secure the resilient pad 940 to these base pieces.

The flanges 924 and 926 are supported from the stabilizer arm 914 by means of the bushings 936 and 937 which receive the pivot pin 934. Also, the flanges are interconnected by means of the cross-piece 921 illustrated in FIG. 27.

The resilient pad 940 is constructed of a number of individual strips or segments 950. These segments are secured together and form a somewhat oblong shape. The shape could also be rectangular, circular, hexagon, triangular, octagon, or some other form and preferably has a lower contact surface 941 and an upper contact surface 943. These two surfaces are preferably, but not necessarily, parallel to each other.

The resilient pad 940 is supported in a central manner and for that purpose there are provided slots 945 that extend through the pad. The base pieces extend into these slots and the pad is finally positioned in the manner illustrated in FIG. 26. To hold the pad together, the individually strips may be glued, stapled, bolted or riveted. Alternatively, the strip may be left unglued. Also, there is provided an end plate 966 also having slots corresponding to the slots in the pad material itself. As illustrated in FIG. 26 the studs 960 extend through end holes in each of the base pieces. These studs may also bear against the outer surface of the end plate 966 and are held in position by means of the aforementioned cotter pins 962.

Also, a bolt 964 of somewhat elongated construction extends through the resilient pad and through a hole 965 in the flange 924. The bolt 964 is secured by means of a washer 970 and a nut 968. The bolt 964 and its associated nut and washer is used, of course, on each of the pads associated with the respective flanges 924 and 926.

As can be seen quite readily, in the embodiment of FIGS. 26 and 27, the pad 940 is reversible. This can be reversed by simply removing the bolt 964 and the studs 960 and rotating the pads so that rather than surface 941 being the ground contact surface, the surface 943 is the ground contact surface.

A further embodiment of the present invention is now illustrated in FIGS. 28–33. This particular pad construction may be referred to as an offset pad. It has been found that due to certain machine constraints, clearances between the pad and machine make this offset arrangement more advantageous. For example, machine tires or fenders may be arranged so that a symmetrical type pad cannot be employed. The design in this last embodiment provides an offset arrangement yet allowing the loading on the resilient pads to be equalized. Proper pad balance may be achieved without the use of additional counterweights.

Figure 28:
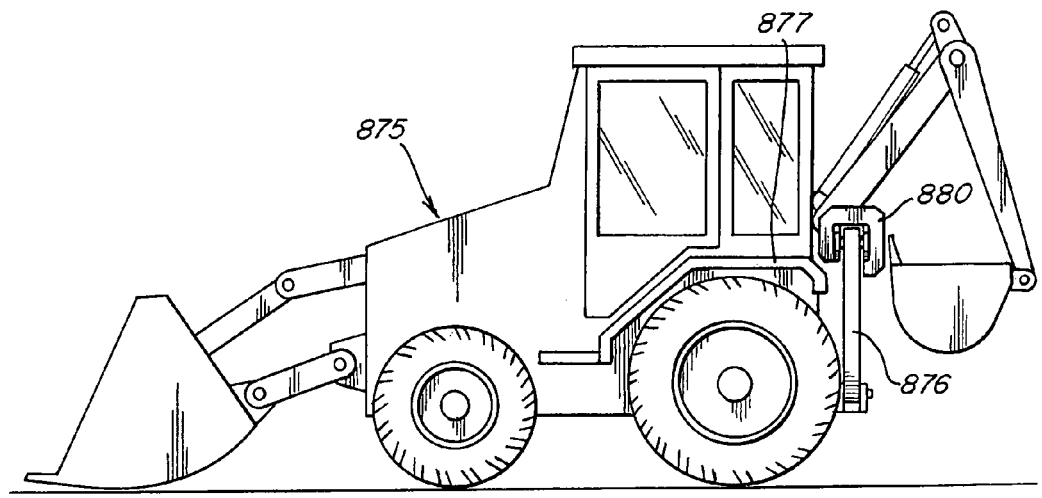
FIG. 28 is an illustration of a backhoe embodying an offset pad construction.
Figure 29:
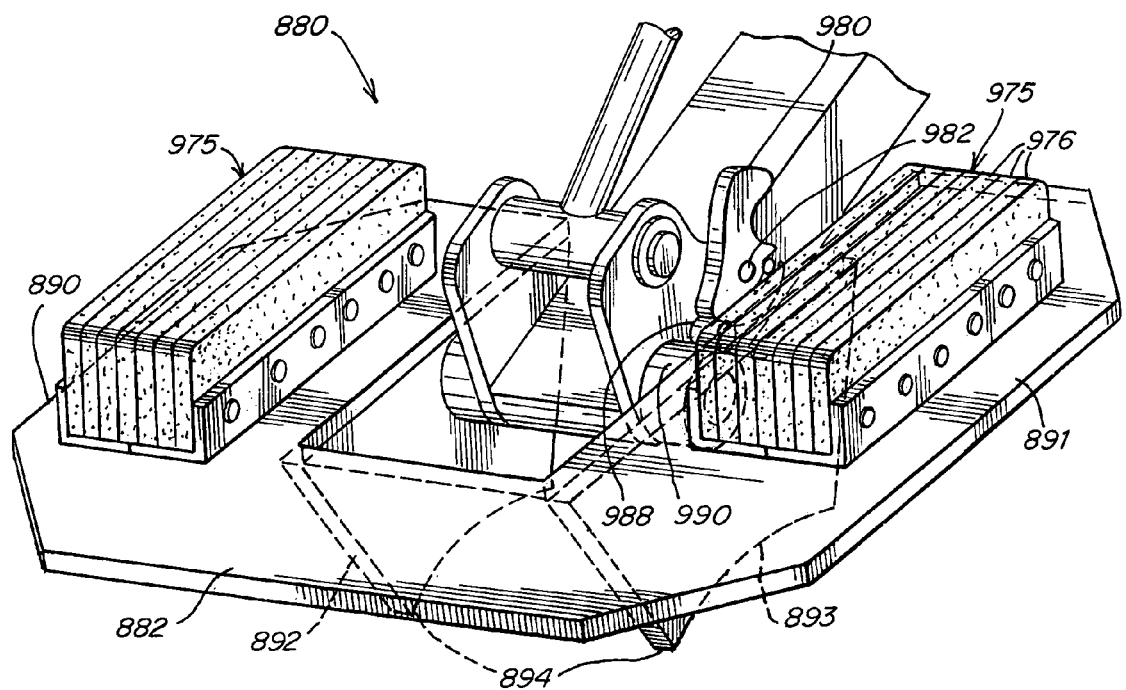
FIG. 29 is a perspective view of the offset pad construction also employing a releasable latch.

FIG. 28 is a depiction of a backhoe 875 with there being provided a stabilizer arm 876 depicted as having the offset pad 880 affixed thereto. By way of example it is noted that a fender 877 is arranged in a manner so that if the symmetrical pad were to be used there would be interference between the pad and the body of the vehicle. Accordingly, by means of this offset pad arrangement there is no interference between the pad and any parts of the body of the vehicle.

Figure 30:
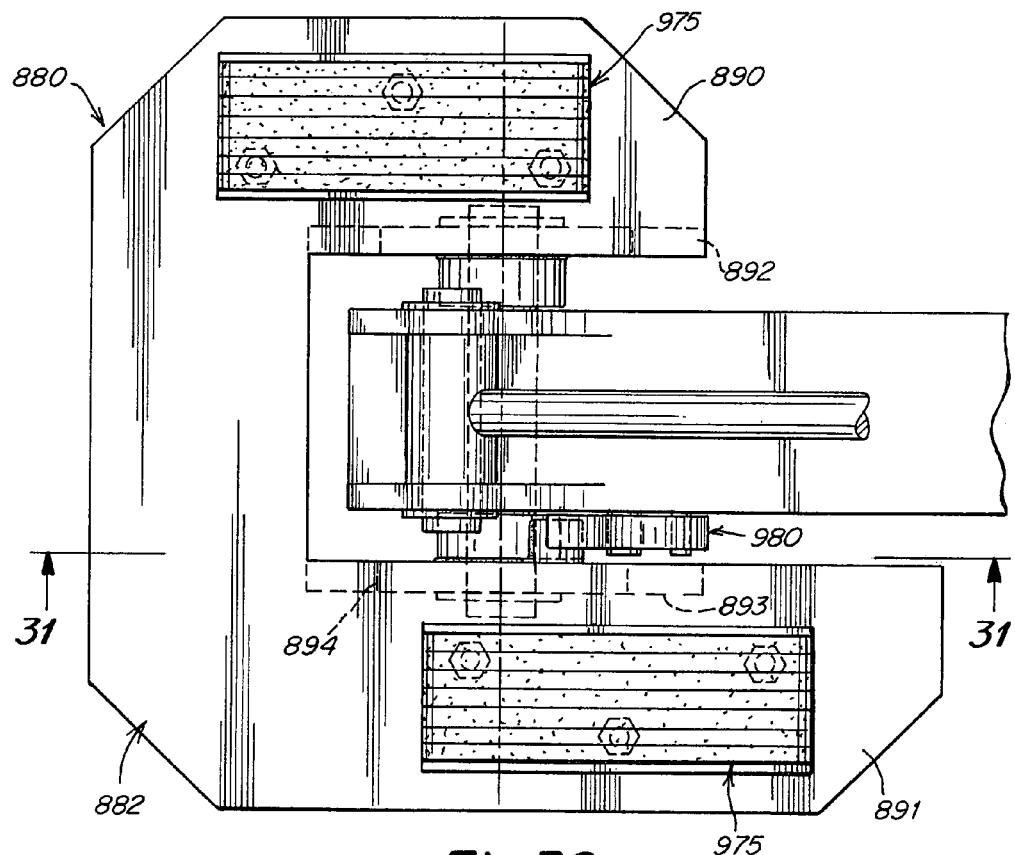
FIG. 30 is a plan view of the embodiment of FIG. 29.
Figure 31:
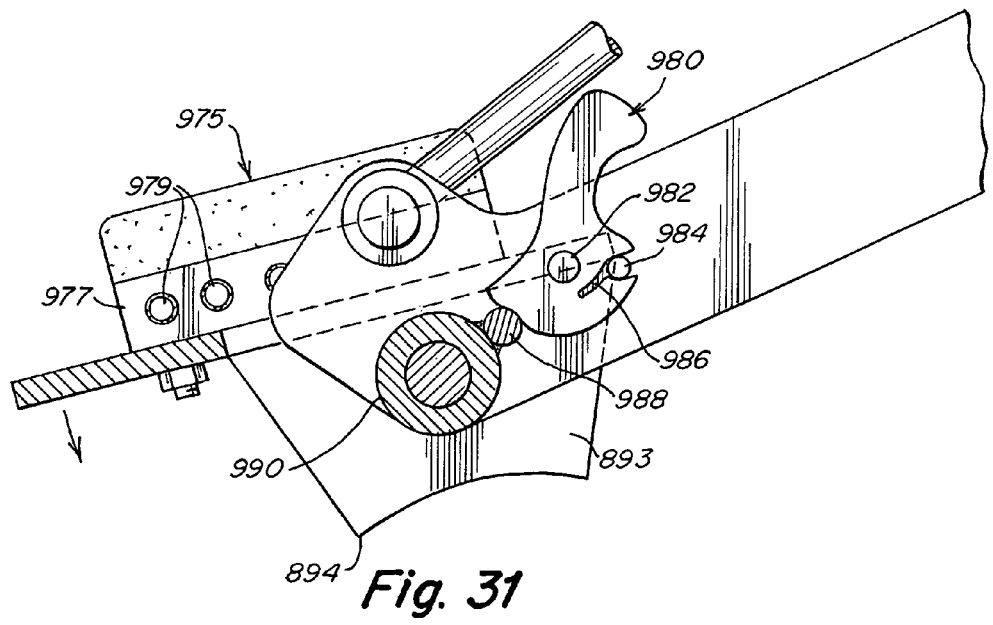
FIG. 31 is a side view of the embodiment of FIG. 29 with the latch in a locked position.
Figure 33:
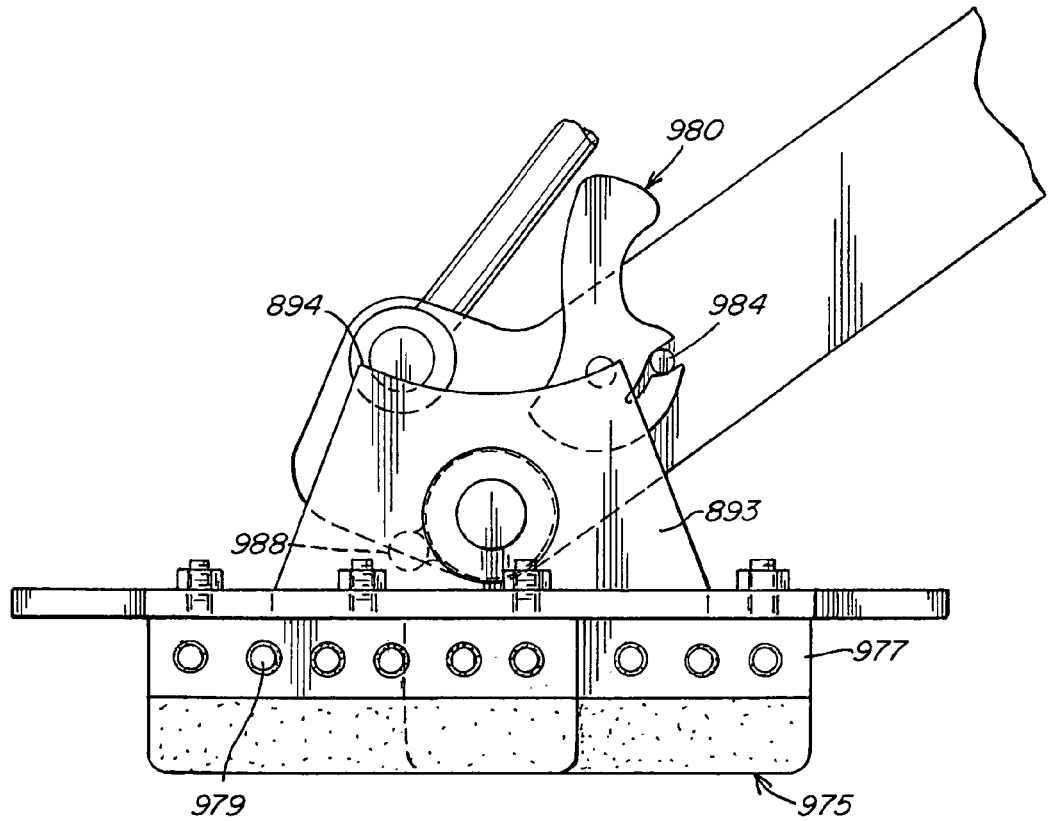
FIG. 33 is a side view of the stabilizer pad with the pad rotated through 180°.

The pad 880 is constructed with a base 882 having, as illustrated in, for example, FIG. 30, offset legs 890 and 891. Associated with legs 890 and 891 are upstanding flanges 892 and 893, respectively. Each of these flanges have a pair of grouser points 894 such as illustrated in FIG. 33. FIG. 31 shows the pad in the position in which the grouser points are engaging the ground surface.

Figure 32:
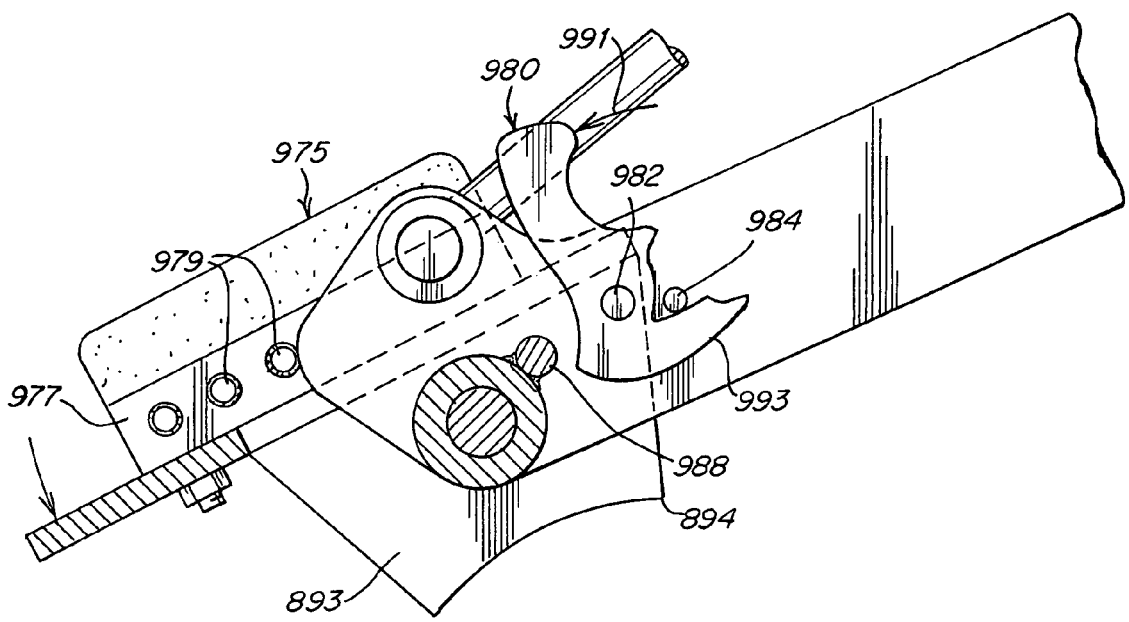
FIG. 32 is a side view with the latch in a released position.

This last embodiment of the present invention also illustrates a resilient pad 975, one associated with each of the legs 890 and 891. The pad 975 may be constructed of a series of separate resilient strips 976, all secured together and disposed within a U-shaped holder 977. As illustrated in FIGS. 31–33, a series of rods 979 may be employed to hold the resilient pad in the U-shaped holder 977. For a somewhat similar pad construction refer to U.S. Pat. No. 4,761,021 which is hereby incorporated by reference hereinto.

As illustrated in FIG. 30, the offset legs 890 and 891 are of different length. Leg 890 is shorter than the leg 891. Accordingly, the resilient pad on the leg 890 is arranged more towards the outer end of the pad construction while the pad associated with leg 891 is disposed more inwardly of the pad construction.

This embodiment of the present invention also illustrates an important concept in a releasable latch. Although this releasable latch is illustrated with regard to the embodiment of FIGS. 28–33, such a releasable latch may also be used with other embodiments of the present invention described herein.

This embodiment of the invention illustrates the latch 980. The latch 980 is supported from the arm by means of a pivot pin 982. Also supported from the arm is a fixed position stop 984. The latch 980 has a slot 986 for engaging with the stop 984. As illustrated is, for example, FIG. 31 a cam 988 is provided to interact with the latch 980. The cam 988 is supported from bushing 990. The cam 988 may be a fixed metal rod. The releasable latch 980 is made of a resilient material. It may be of material 95a Duro with a thickness of $\frac{7}{8}^{ths}$ inch.

Now, with regard to FIG. 31, it is noted that the latch is basically in its locked position. The stop 984 is engaged with the latch and the far end of the latch is in turn engaged with the cam 988. However, because the latch 980 is resilient it will allow the pad to reverse if potentially damaging obstacles are encountered when operating the machine.

Also, the latch can be released as is illustrated in FIG. 32. By pushing the latch manually in the direction of arrow 991, the latch essentially disengages from cam 988. This permits the pad to then be rotated to the position illustrated if FIG. 33 with the resilient pads now in engagement with the ground surface. In connection with the illustration of FIG. 32, it is noted that the latch 980 has a tab 993 that functions as a spring to return the latch to its locked position. In the position of FIG. 33 the latch is in its locked position but is not in engagement with the cam as the pad has been rotated to its other position.

In the previous embodiments described in FIGS. 4–33, as well as other embodiments to be described hereinafter, the pad is shown as a laminated pad with several separate pad layers. In other embodiments in accordance with the invention, such as illustrated in FIG. 16, the pad may be a single pad pack of laminated construction, or alternatively, a pad pack of a single piece block or multiple blocks. When a block of resilient material is used it may be molded or otherwise formed, such as by cutting from a larger block of resilient material. When individual layers or strips are used they are preferably oriented vertically, as illustrated in FIG. 16, or could be oriented horizontally or angularly. When individual strips, blocks or layers are used they may be joined together using various techniques such as gluing, stapling, screwing, nailing, riveting, bolting or welding. Also, the strips, blocks or layers may be encapsulated by dipping, molding, coating, or shrink-wrapping with various components.

In at least some of the previous embodiments described in FIGS. 4–33, as well as other embodiments to be described hereinafter, the pad is reversible. Not only that, but also, the pad is formed as a pad pack or pad assembly making the reversal of the pad very easy. The pad packs can be stored, each as a unit, and in readiness for use. Also, the pad pack arrangement makes it easy to reverse from one side of the pad to the other, without having to disassemble any part of the pad pack. This ease of use and reversal makes the pad more useable in the field. This is invaluable, in that operating with worn out pads causes substantial damage to paved surfaces. The repair of the damaged surface is typically an additional expense that can be readily avoided with the construction of the present invention.

Figure 34:
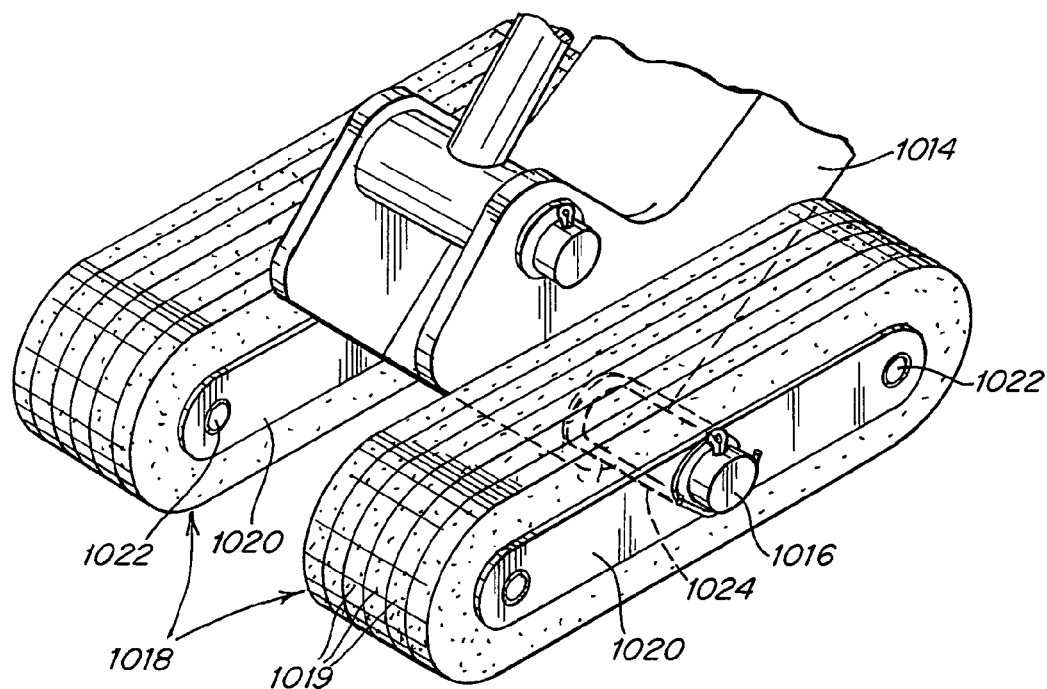
FIG. 34 is a perspective view of a further embodiment of a pad construction.
Figure 35:
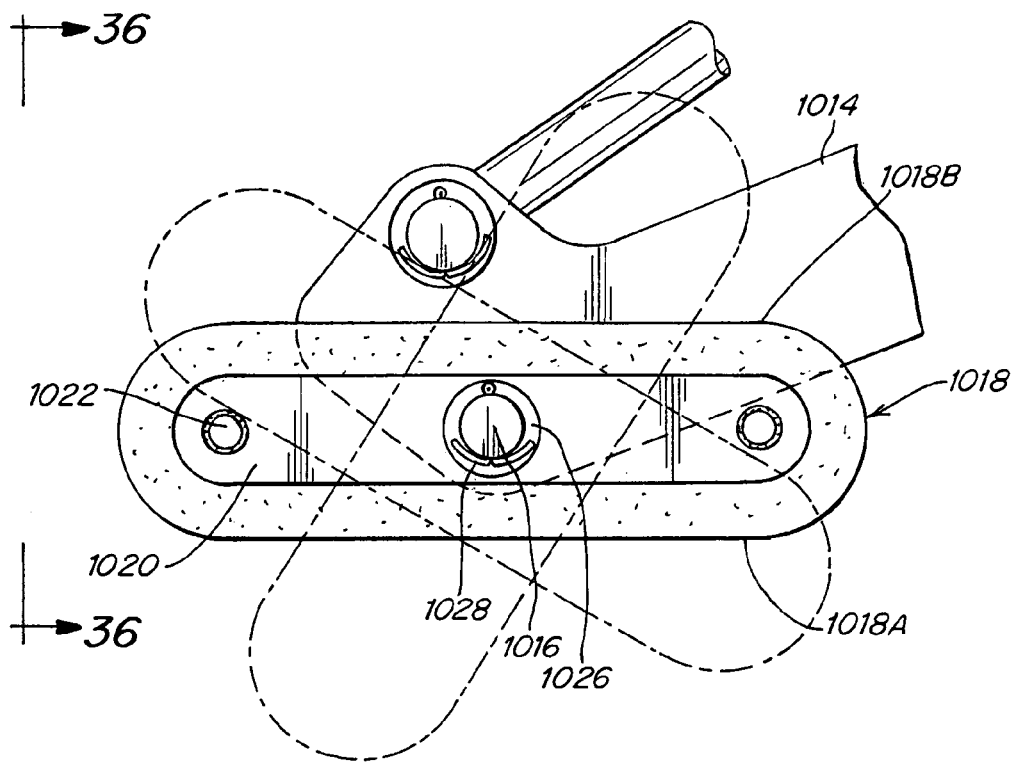
FIG. 35 is a side elevational view of the pad construction of FIG. 34.
Figure 36:
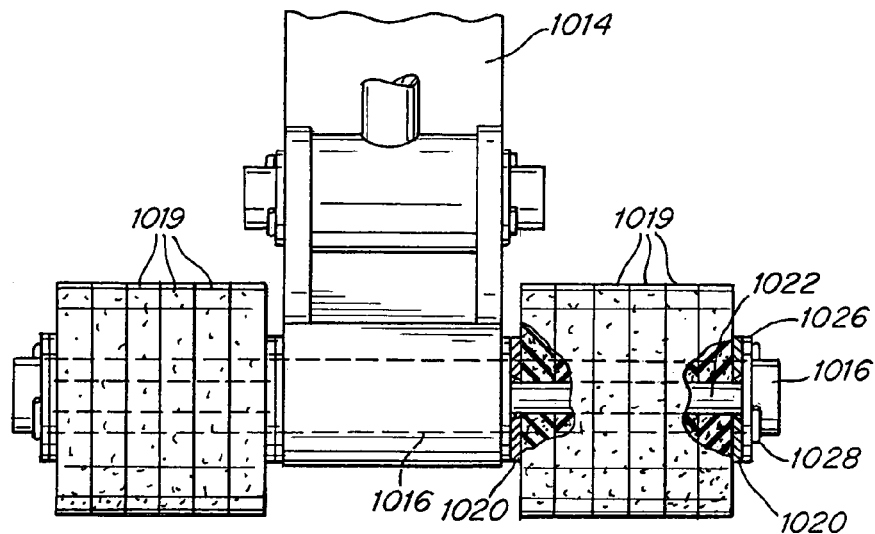
FIG. 36 is a front elevational view of the pad construction of FIG. 34, partially broken away to show the pad construction.

Reference is now made to FIGS. 34 through 36 for another embodiment of the present invention. This describes a stabilizer pad construction in which the resilient pad is directly supported from the arm of the machine. As with other embodiments described herein, the stabilizer arm 1014 has the stabilizer pads 1018 supported therefrom by means of opposite end pin segments of support pin 1016. In the version of FIGS. 34 and 35, there are two pad packs supported, respectively, outboard on either side of the arm 1014. Each pad pack is comprised of a plurality of resilient pad layers 1019 that are held together by oppositely disposed side plates 1020. Also shown in FIGS. 34 and 35 are through pins 1022. These may be solid or hollow pins. In FIG. 34 two of these are shown associated with each pad pack, however, any number of securing pins may be used. Each pin may be held to the side plate by being flanged at the end. See also FIG. 37 for an illustration of the flanging operation. Alternatively, the pins or rods may be welded at their ends to the side plates, or a bolting arrangement may be used In FIGS. 34 through 36 each of the pad packs are supported directly from opposite ends of the support pin 1016. Each of the pad packs is held to its associated pin segment by means of a sleeve 1024 which extends through the pad pack, a washer 1026 and a cotter pin 1028. The sleeve 1024 may be a permanent part of the pad pack and is readily engageable and disengageable with the pin 1016. The pin 1016 is preferably a single piece pin but could also be two separate pins. In the illustrated embodiment the pin 1016 is free to rotate in the arm 1014.

In the embodiment illustrated in FIGS. 34 through 36 the pad pack is readily reversible so that either surface 1018A or 1018B may be used as the ground engaging surface. A latch arrangement (not shown) may be used for holding the pad pack in a particular ground engaging surface. FIG. 35 shows, in solid outline, the pad with the surface 1018A in ground engagement and also shows, in dotted outline, the rotation of the pad so as to change to the opposite surface. Also, in the embodiment of FIGS. 34 and 35 the pad packs are separately supported and thus need not be rotated from one position to the other in unison. Should the wear be uneven on either pad pack, then it is possible that only one pad pack will be reversed and the other maintained in the existing ground engaging position. FIG. 36 is a front elevational view of the pad construction of FIG. 34, partially broken away to show the pad construction.

In the embodiment illustrated in FIGS. 34 through 36 it is noted that there is no flanged weldment and instead, each of the pad packs is mounted in a relatively simple manner directly from the associated pad support pin. This provides a relative simple and inexpensive, and yet durable, pad construction.

Figure 37:
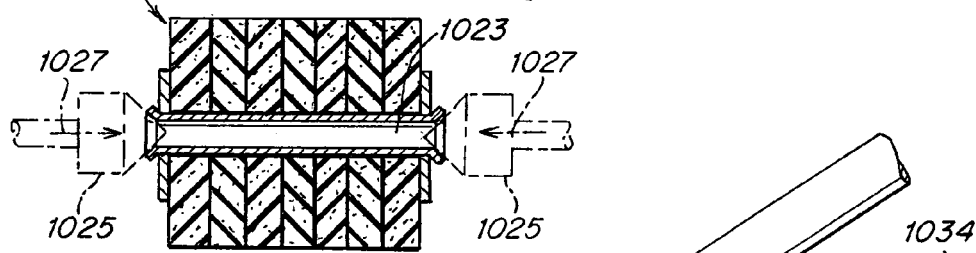
FIG. 37 is an alternate cross-sectional detail showing a swaging technique.

FIG. 37 shows an alternate way of securing a hollow pin or tube 1023 within the pad pack 1018. FIG. 37 also schematically illustrates the flaring or swaging tool 1025 that is closed in the direction of arrows 1027 to flare the opposite ends of the securing tube 1023. The flared end of the tube 1023 bear against the side plates and hold the laminate in a secure position, making for a tight pad pack. Any number of securing tubes may be used, preferably at a minimum two, but usually more than two.

Figure 38:
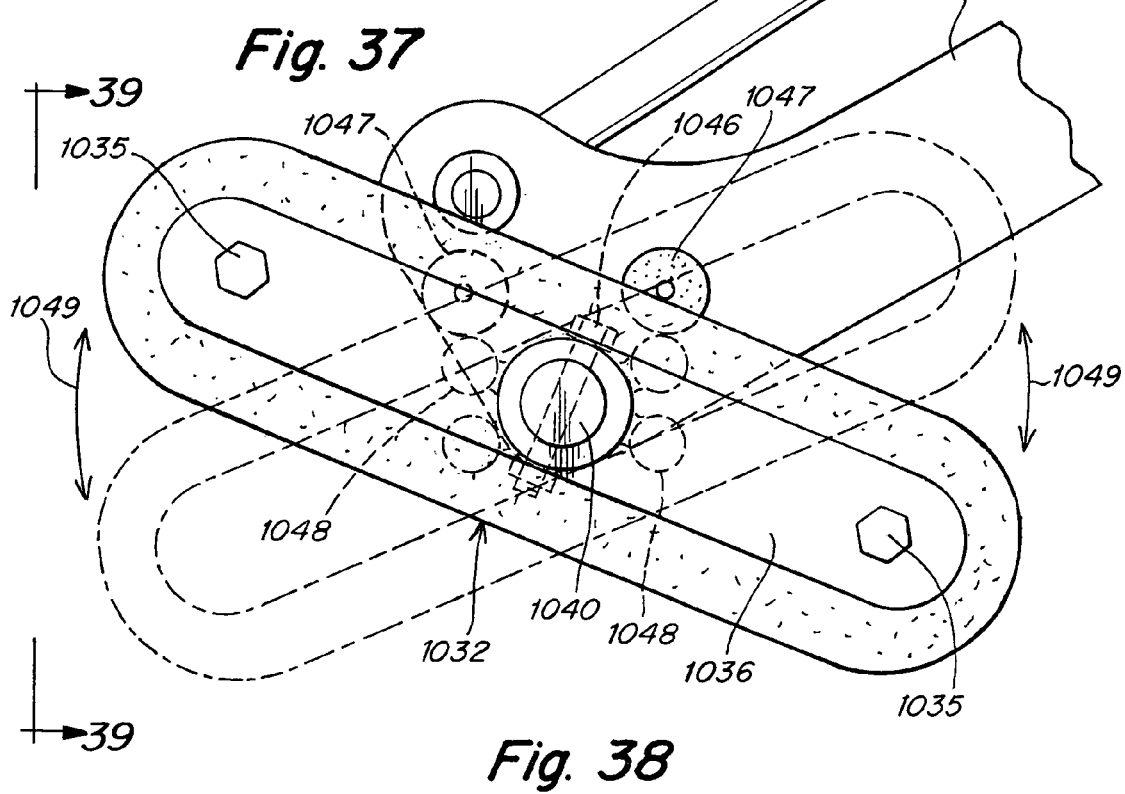
FIG. 38 is a side elevational view of another embodiment.
Figure 39:
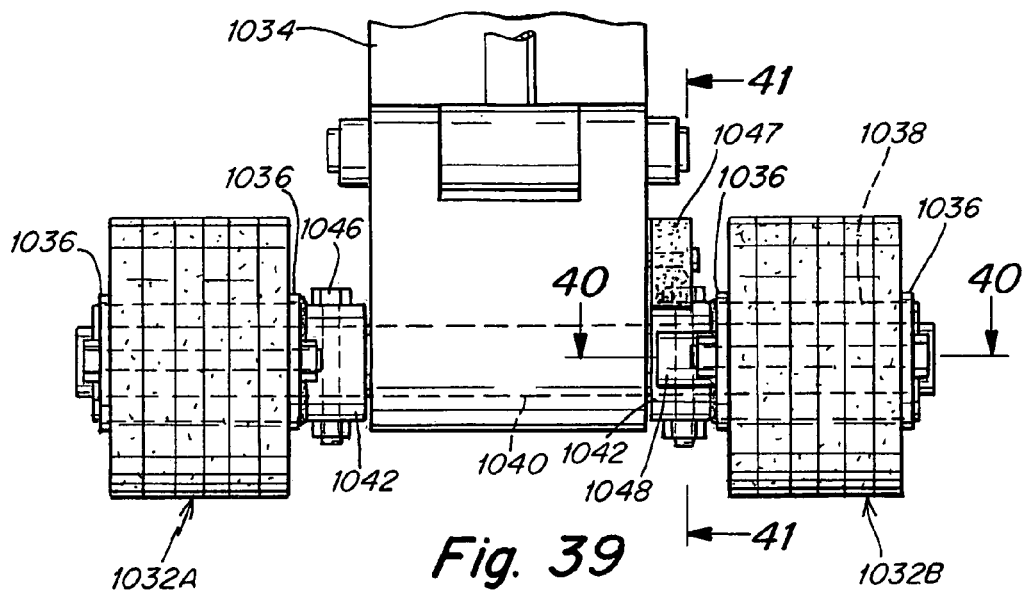
FIG. 39 is a front elevational view of the embodiment of FIG. 38.
Figure 40:
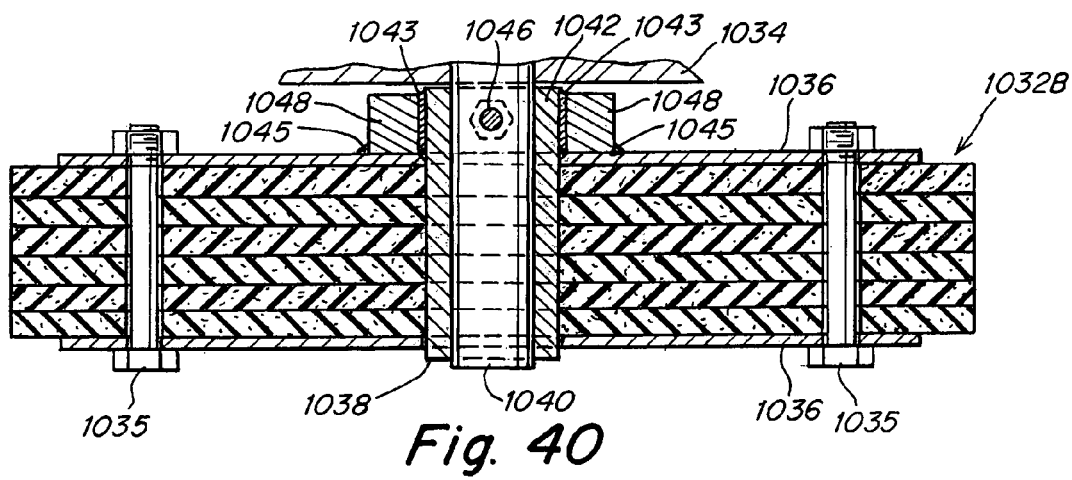
FIG. 40 is a cross-sectional plan view taken along line 40—40 of FIG. 39.

Reference is now made to FIGS. 38–41 for another embodiment of the present invention similar to that described in FIGS. 34 through 36. In this embodiment the stabilizer pad construction is also directly supported from the arm of the machine. FIGS. 38–41 illustrate the stabilizer arm 1034, having supported therefrom, the resilient pad packs 1032A and 1032B. Each of these pad packs is comprised of a plurality of layers that are compressed together. In the particular embodiment of FIGS. 38–41 bolts 1035 are used for securing the laminate layers together usually in a compressed state. The bolts 1035 extend between opposite side plates 1036. The outer facing plate 1036 may be loose and held in position by the bolts 1035, while the inner facing plate 1036 is preferably welded to the sleeve 1038 (see FIG. 40). A lug 1042 is provided between the pad and the arm. The lug 1042 is welded to the sleeve 1038 as indicated at 1043. FIG. 40 also shows a further weld 1045 between the side plate 1036 and the lug 1042. The through sleeve 1038 is shown in FIG. 40 positioned on the support pin 1040. The pad and sleeve are pinned or bolted to the pivot pin 1040. This is provided by the bolt 1046. As illustrated in FIG. 39, there are bolts 1046 on either side of the arm 1034. By bolting the supporting pin with its associated pads, and providing the pin 1040 extending as a single piece pin through the arm, then the pads will rotate together.

Figure 41:
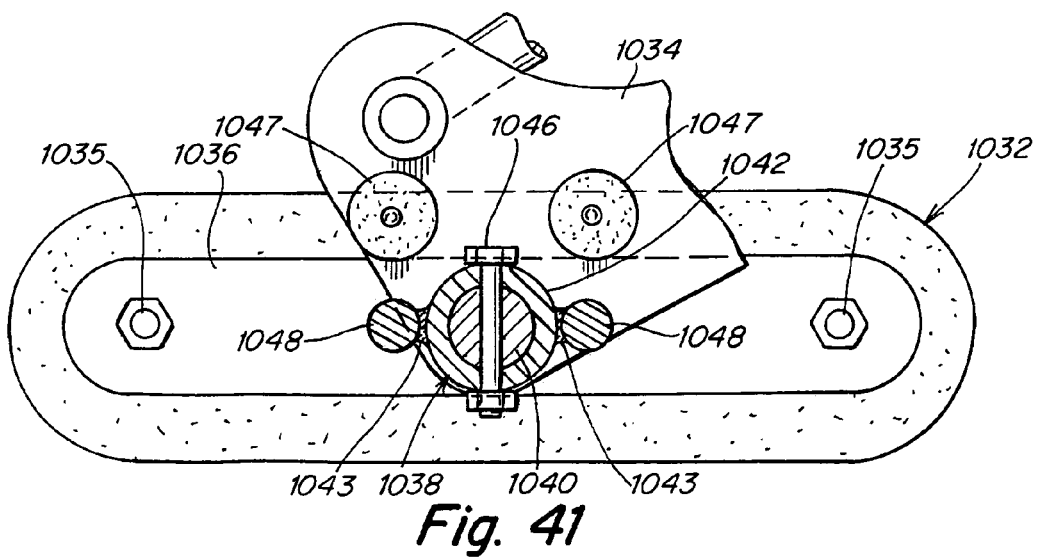
FIG. 41 is a cross-sectional side view taken along line 41—41 of FIG. 39.

FIGS. 38–41 also illustrate a stabilizing or latching arrangement that will inhibit the self-rotation of the resilient pad packs. This structure is illustrated in FIGS. 38–41 as including resilient wheels 1047 that are adapted to cooperate with anti-rotation lugs 1048. The lugs 1048 are integral with the through sleeve 1038. FIG. 38 illustrates the rotation of the pad in the direction of arrows 1049, and further illustrates the manner in which the lugs 1048 limit the rotational movement of the pad by engagement with one or the other of the resilient wheels 1047. FIG. 41 shows the pad 1032 in its normal, horizontally-disposed, position with the lugs 1048 out of engagement with the wheels 1047. However, should the pad start to rotate depending upon the terrain that it is engaging, the lugs 1048 engage with the wheels 1047 and inhibit any further rotation, other than to the extreme positions illustrated in FIG. 38.

The resilient wheels 1047 are constructed of a resilient material so that they are capable of some deflection. Accordingly, when it is desired to rotate from one position to the other, the arm of the machine may be lifted and the operator may then rotate the pad with the lug 1048 passing by the wheel 1047 with a certain amount of force being needed to be applied by the operator to engage past the resilient wheel.

Figure 42:
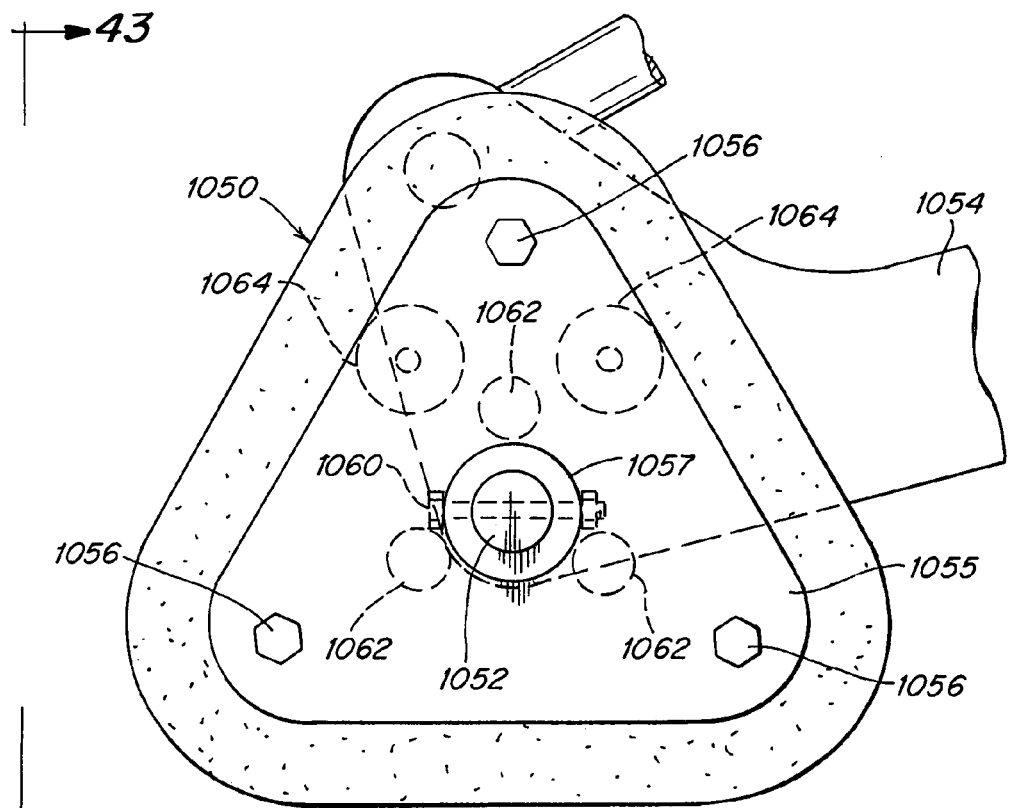
FIG. 42 is a side elevational view of another embodiment using a triangular-shaped pad.
Figure 43:
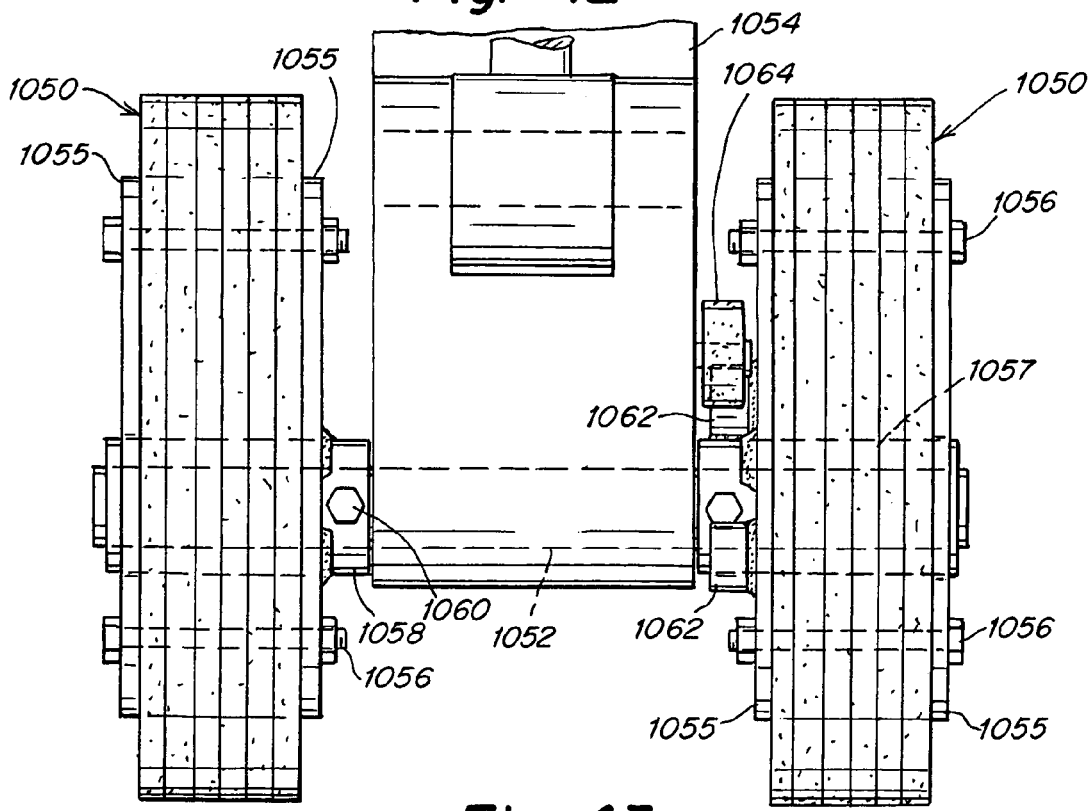
FIG. 43 is a front elevational view of the embodiment of FIG. 42.

Reference is now made to FIGS. 42 and 43 for a further embodiment of the present invention similar to that illustrated in FIGS. 38–41 but employing a pair of triangular shaped pads 1050. These pads 1050 are also supported by means of a single common support pin 1052 that is supported from the stabilizer arm 1054. This embodiment also includes side plates 1055, bolts 1056, sleeves 1057, lugs 1058 and securing bolts 1060. A resilient wheel latch arrangement is also provided in this embodiment. For this purpose, associated with the sleeve 1057 are three anti-rotation lugs 1062 that are adapted to engage with the two resilient wheels 1064. Each of the two wheels 1064 are supported from the side of the stabilizer arm 1054 as illustrated in FIG. 43. The interaction of the lugs 1062 and the wheels 1064 operate in the same manner as described in connection with the embodiment illustrated in FIGS. 38–41, inhibiting the rotation of the pad beyond a certain amount so as to prevent undesired self-flipping of the pad. The bolts 1060 then engage with the lug and the support sleeve to provide for common rotation between the oppositely disposed pads.

Reference is now made to still another embodiment of the present invention illustrated in FIGS. 44–47. In this particular embodiment the pad construction comprises a pair of laterally-disposed side plates or flanges 1066 that are supported from the stabilizer arm 1067 by means of the support pin 1068. The pin 1068 is received by the stabilizer arm 1067 and extends on either side of the arm for support of the side plates 1066. The pin 1068 may be free to rotate in the arm 1067. The pin 1068 may also be free to rotate relative to the flanges, or may be fixed against rotation relative to the flanges. The side plates may be supported in a manner as previously described in conjunction with earlier embodiments such as those illustrated in FIGS. 4 and 5.

In the embodiment of FIGS. 44–47 there is illustrated the laminated resilient pad 1070 that is secured along a lower edge 1071 of the respective side plates or flanges 1066. The laminated resilient pad 1070 is secured by means of three through bolts 1072. The pad itself is a laminated pad constructed of a plurality of secured resilient pad layers. All working loads associated with the apparatus are transferred from the resilient pad material to the side flanges or plates through the pad-supporting member whether it be by means of pins, rods, bolts, lugs, bars, plates, or the like.

The construction illustrate in FIGS. 44–47 also preferably includes a connecting plate 1074 that extends between the laterally disposed side plates 1066. Preferably, the front of the plate 1074 is turned upwardly as indicated at 1075 in FIG. 44. The plate 1074 is primarily for support between the side plates 1066 and is positioned spaced above the pad pack, out of contact therewith.

In the embodiment illustrated in FIGS. 44–47 the laminated resilient pad 1070 is also reversible. Once one of the wear surfaces becomes worn down or damaged, the bolts 172 may be withdrawn and the pad can then be reversed so that the opposite side of the pad becomes the ground engaging surface. The bolts are then reinserted and tightened.

Figure 44:
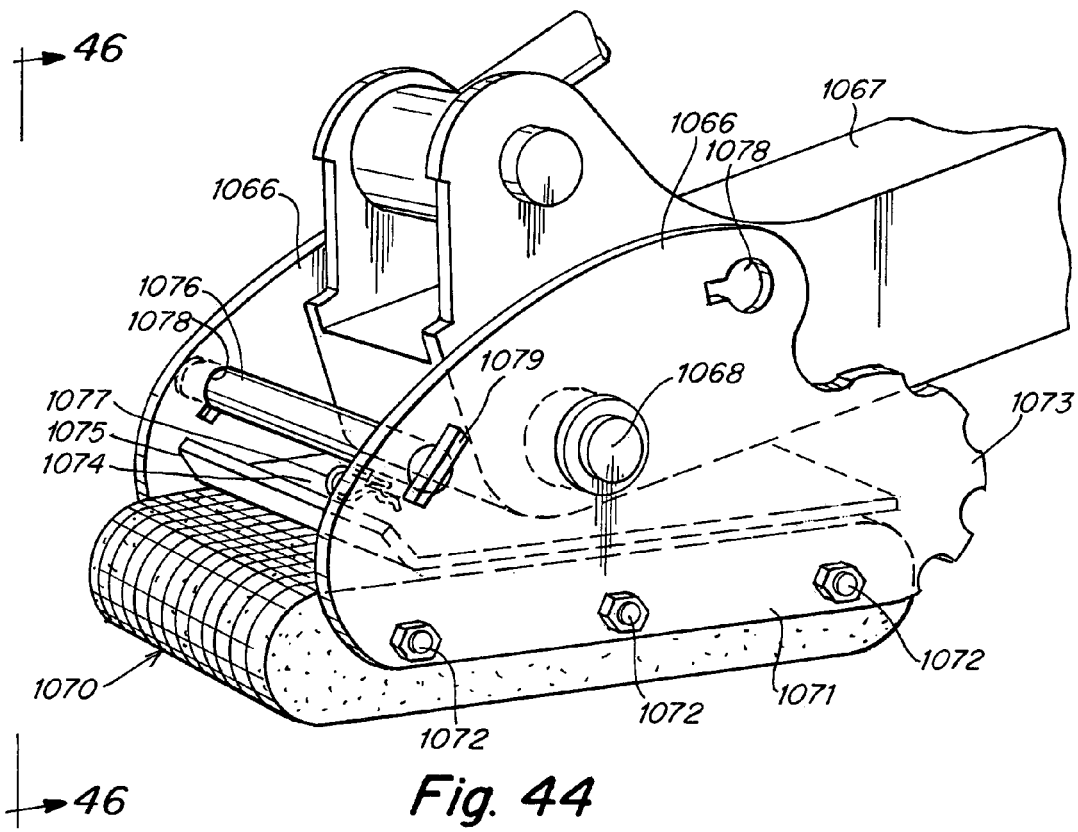
FIG. 44 is a perspective view of still another embodiment of the present invention.
Figure 47:
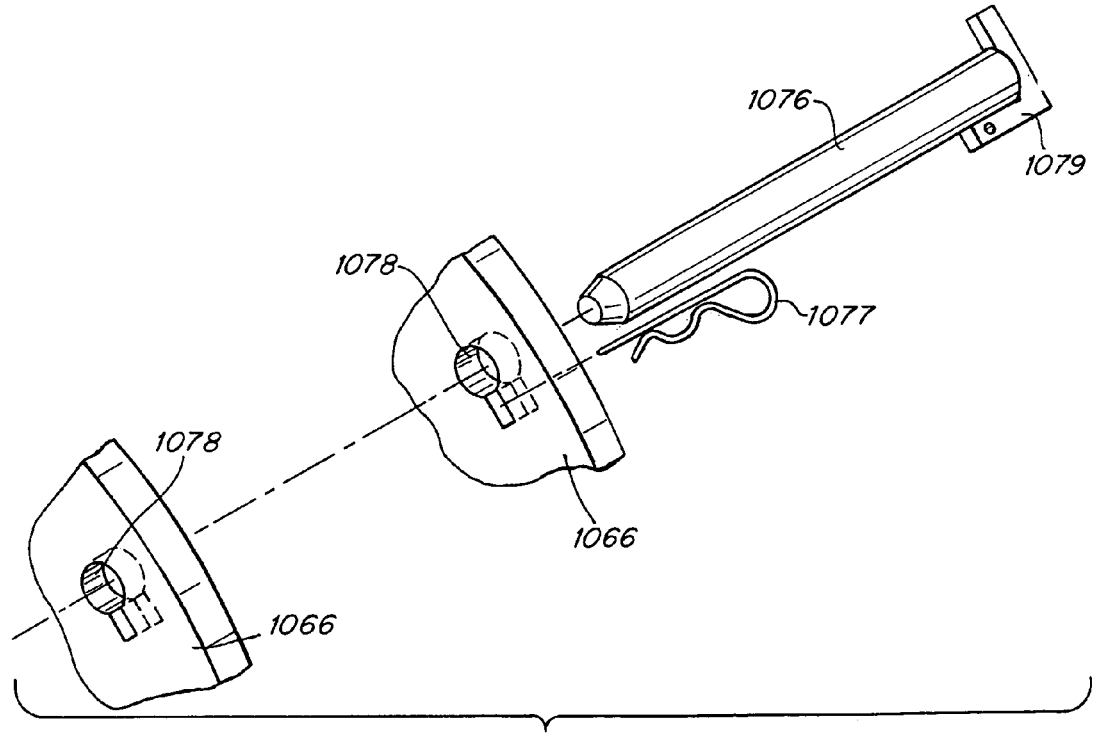
FIG. 47 is a fragmentary exploded perspective view of the locking pin.

This embodiment of the present invention also employs a latch pin 1076 and associated hitch pin 1077. The side plates 1066 are provided with holes 1078 for receiving the latch pin 1076. Each of the holes has a keyway slot for receiving the head 1079 of the latch pin 1076. There is a small hole in the head 1079 of the latch pin 1076 for receiving the hitch pin 1077. FIG. 47 is an exploded view showing the various components of the latch arrangement including the latch pin 1076 and the hitch pin 1077. The latch pin 1076 is shown in FIG. 44 in its stored position, out of use. In this stored position the pin does provide some limited inhibiting of rotation of the pad assembly. In an alternate embodiment the latch pin 1076 can be secured by other means such as a bolt and nut or a large cotter key with a hitch pin.

Figure 45:
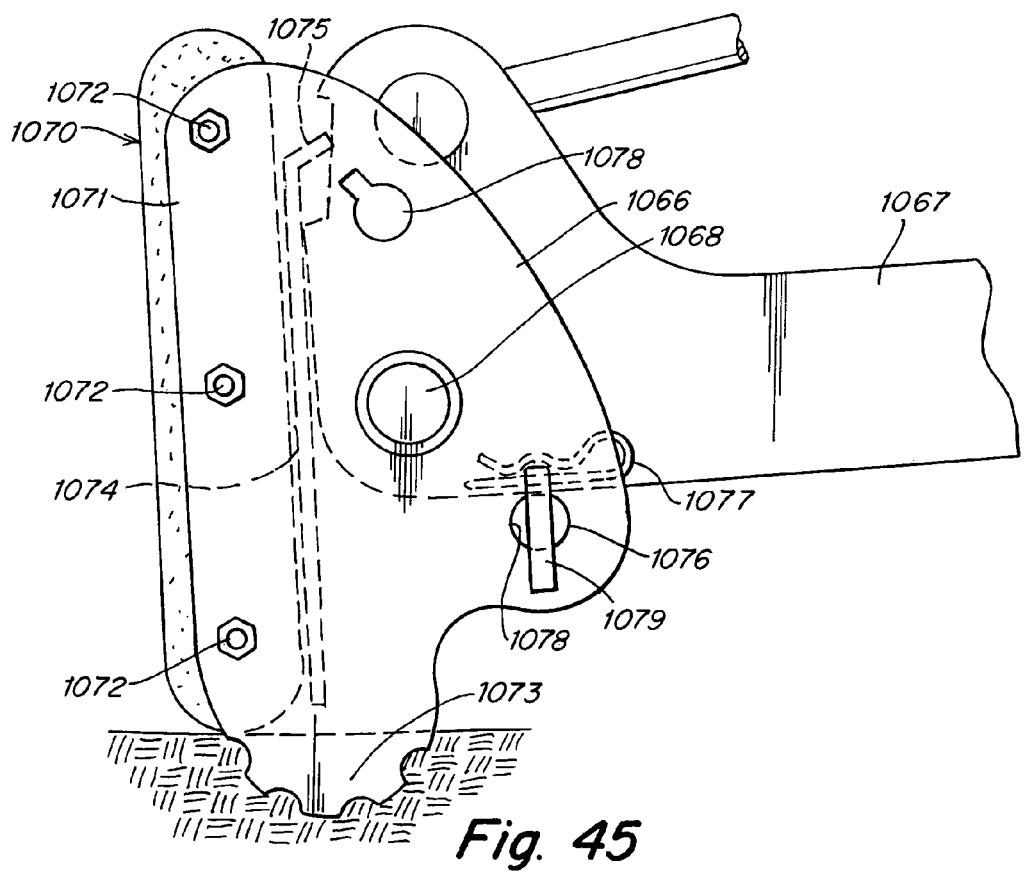
FIG. 45 is a side view of the embodiment of FIG. 44 an the claw position.
Figure 46:
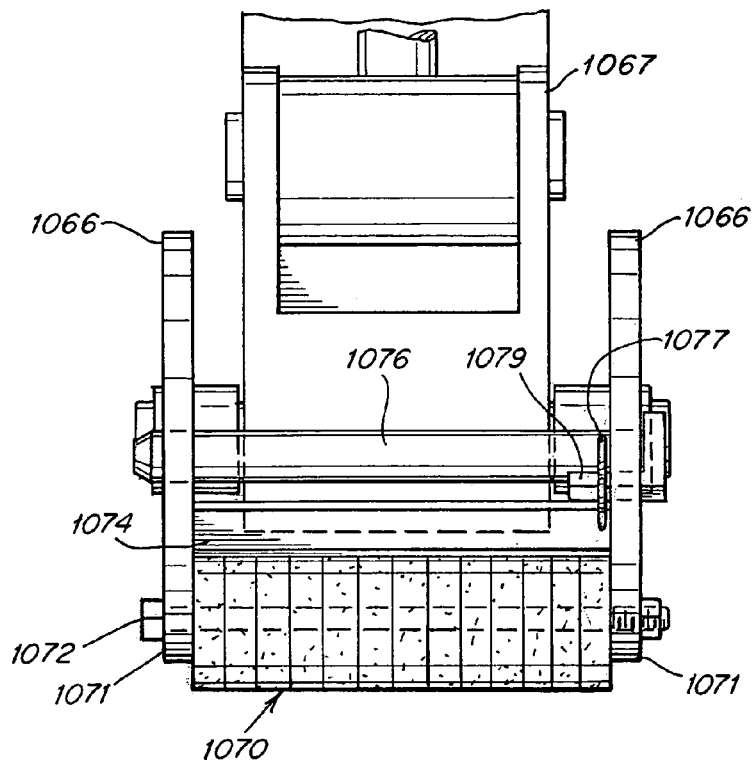
FIG. 46 is a front elevational view of the embodiment of FIG. 44 as taken along line 46—46 of FIG. 44.

In FIGS. 44 and 45 it is noted that there are a pair of holes 1078 for receiving the latch pin in either of two different positions depending upon whether the resilient pad is going to be engaging the ground or whether the grouser end 1073 is going to be engaging the ground. In FIG. 44 the resilient side of the pad is engaging the ground while in FIG. 45 the pad has been moved to a position wherein the grouser points at 1073 are engaging the ground. It is furthermore noted that the rotation from one position to the other is not through 180° but instead is through approximately only a 90° rotation of the resilient pad construction. In FIG. 44 the latch pin 1076, in its stored position, is shown disposed between the end of the arm 1067 and the plate 1074. The latch pin 1076 is held in position by the hitch pin 1077 passing through the hole in the head 1079 of the latch pin 1076. In the position illustrated in FIG. 45 the latch pin is inserted in the other hole, the entire pad assembly having being rotated through 90° to the position illustrate in FIG. 45. In this position the latch pin is reinserted and the hitch pin 1077 engages the latch pin to lock it in position. In this position the latch pin 1076 is disposed under the arm 1067 basically holding the pad in the position illustrated in FIG. 45 preventing any significant rotation in either direction. This is desired when the grouser points are engaging the ground in order to provide a firm hold by the grouser end of the pad. It is also noted in this position that the end 1075 of the plate 1074 is about into engagement with the end of the stabilizer arm to inhibit rotation.

Reference is now made to FIGS. 48–51 for another embodiment of the present invention employing a readily reversible pad pack that can be engaged with the weldment in either of alternate positions. The reversal of the pad enables enhanced life of the overall pad construction because after one surface has been worn down the pad can be reversed and the opposite surface can then be used as the ground engaging surface.

In the embodiment of FIGS. 48–51, the weldment is comprised of a pair of laterally disposed plate members or flanges 1086 that are supported from the stabilizer arm 1087. A pin 1088 pivotally supports the side plates 1086 from the stabilizer arm 1087. The laminated resilient pad 1080 is constructed as a pad pack, illustrated in the exploded view of FIG. 50 as comprising a series of laminated layers 1081 that are held together by appropriate means such as the securing members 1082. In the embodiment illustrated in FIG. 50 there are six such members that are employed, although fewer or greater numbers may be employed. The laminated pad 1080 also has a centrally disposed through-hole 1083 for receiving the retaining bolt 1084.

Figure 50:
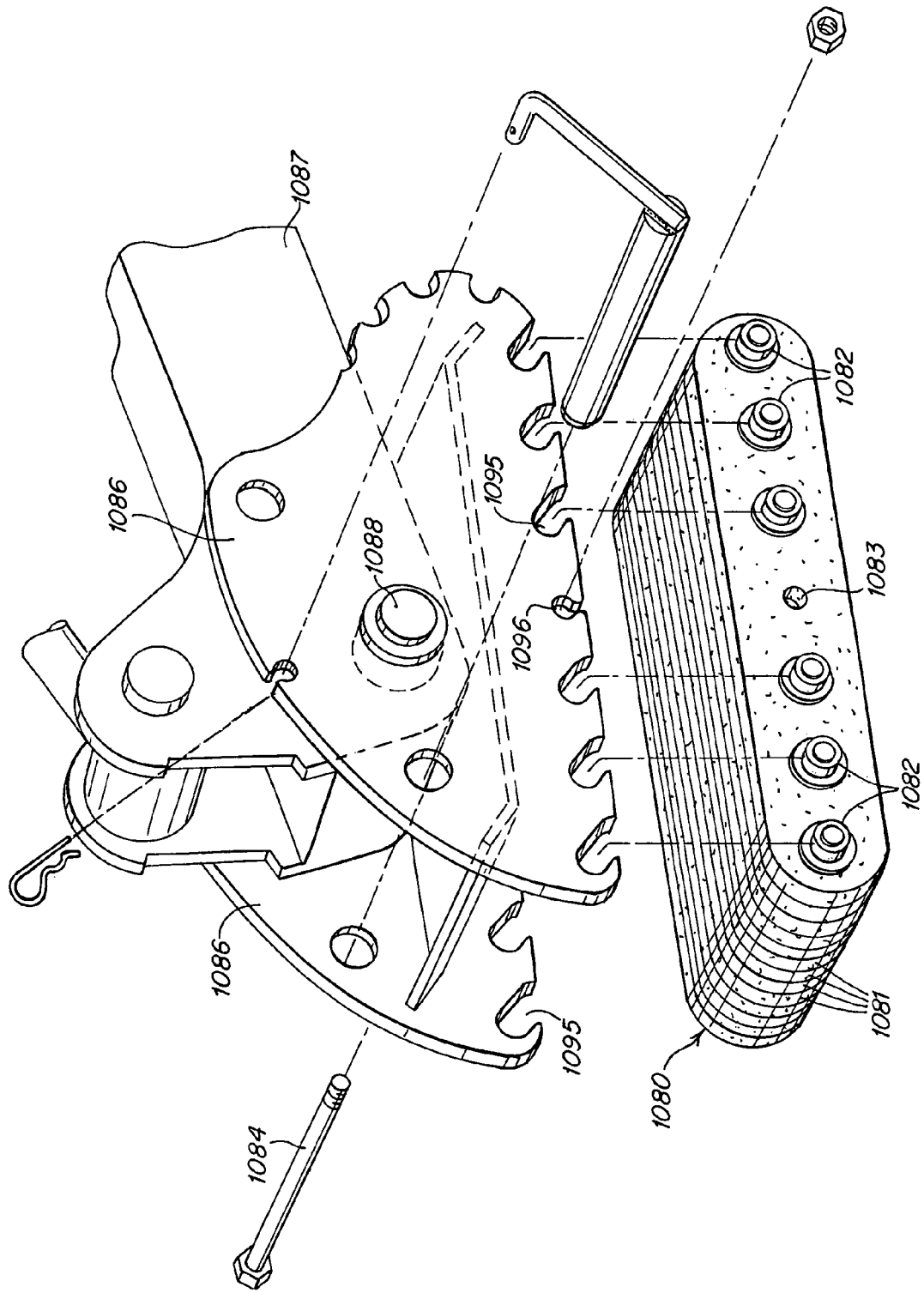
FIG. 50 is an exploded perspective view of the embodiment of FIGS. 48 and 49.
Figure 51:
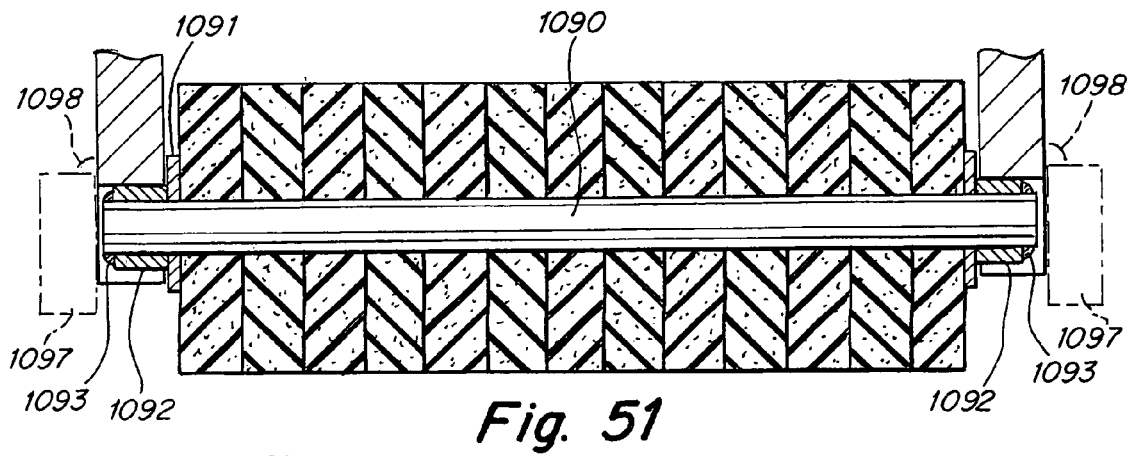
FIG. 51 is a cross-sectional view taken along line 51—51 of FIG. 48.

FIG. 51 illustrates the construction of the pad pack 1080, including the securing members for holding the pad together. This may include a center rod 1090. The laminated pad is drilled to snugly receive the rod 1090. The rod 1090 may be, for example, a thee-quarter inch diameter rod that is adapted to snugly or even force fit through the laminated pad assembly. A three-quarter inch washer 1091 is placed over the end of the rod against the end laminate layer. A metal side plate may also be used between the washer and the end laminate layer. The laminate layers are preferably compressed to a proper width and a one inch outside diameter sleeve 1092 is slid over the end of the rod and tack-welded as indicated at 1093 in FIG. 51. This arrangement holds the laminate construction in an integral pad pack configuration. FIG. 50 shows the angled slots 1095 in which the sleeve is adapted to mate. It is noted that these slots are preferably angled, although they could also be disposed perpendicular to the bottom edge of the flange. Once the sleeves are placed in the slots, then the resilient pad pack is maintained in position by inserting the retaining bolt 1084 through the hole 1083 in the pad as well as through the hole 1096 in each of the side plates 1086. FIG. 51 also shows in phantom outline a skirt 1097 that may be used to cover the ends of the sleeves 1092. This may be tack-welded as indicated at 1098.

Figures 52, 53A, 53B:
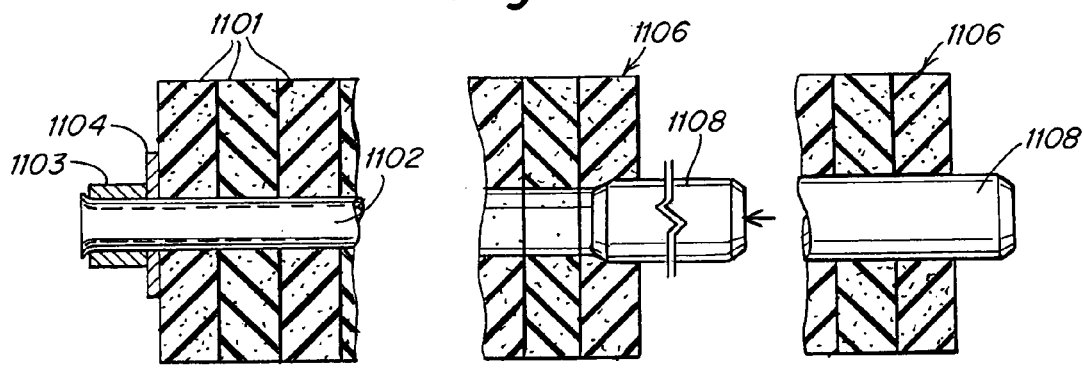
FIG. 52 is a fragmentary cross-sectional view of an alternate pad construction.
FIGS. 53A and 53B show cross-sectional views of pad constructions using a forced pin.

FIG. 52 is a fragmentary cross-sectional view of an alternate embodiment of pad construction. This illustrates a fragment of the laminate layers 1101 being held together by a steel pipe 1102. The steel pipe may have an outer diameter of three quarters of an inch. This pipe may be peened over in order to retain the sleeve 1103 and washer 1104. This arrangement is useable instead of providing welding.

FIGS. 53A and 53B illustrate still a further alternate arrangement illustrating a fragment of a pad at 1106 the use of a supporting rod 1108. This may be a one inch outer diameter rod or pin that is force-fit into an undersized hole through the resilient rubber pad. By providing an undersized hole and force-fitting, no further retainers are necessary and the pin will remain in a position wherein it extends a slight distance from either end of the laminate pad for engagement with the slots in the side plate.

Figure 54:
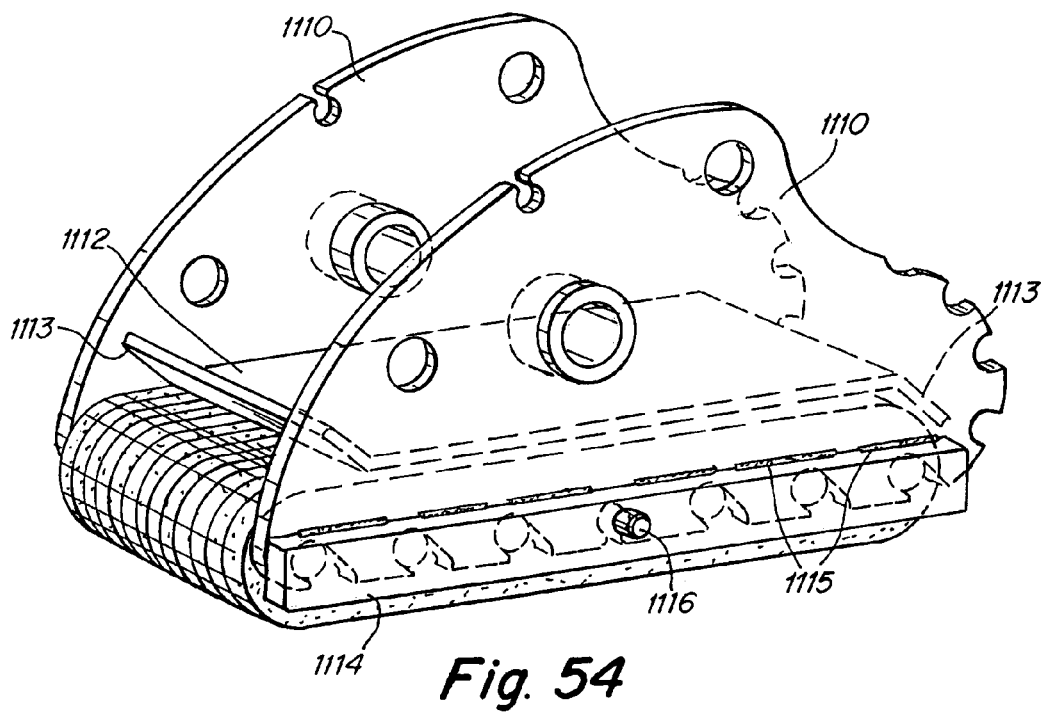
FIG. 54 is a perspective view of still a further embodiment of the present invention.

Reference is now made to FIG. 54 which is a perspective view of a further alternate embodiment of a pad construction. This pad construction is similar to that described in FIG. 48 including side plates 1110 and interconnecting plate 1112 with the turned lip 1113 at either end. At one end the lip is turned up and at the other end it is turned down. The resilient rubber pad construction may be substantially identical to that described in FIG. 50 employing end sleeves that are adapted to engage in lower slots of the side plates. This embodiment also illustrates a pair of skirts 1114 that may be tack-welded at 1115. These skirts are used to protect the mounting slots from distortion during the use of the pad. FIG. 54 also illustrates a retaining pin 1116 that may be used in place of the retaining bolt 1084 illustrated in FIG. 50. The retaining pin 1116 may a three quarter inch diameter rod that is force-fit into an undersized hole in the pad. This pin may be pushed out with a hammer and drift pin. The pin 1116 when removed enables the reversal of the resilient rubber pack. The retaining pin 1116 may also be in the form of a bar, plate or other elongated member, and may be alternatively secured by being molded into a solid pack so that it would thereby be an integral part of the pack.

In accordance with still a further alternate version of the invention, and with reference to the embodiment of FIG. 54, the through hole in the pad can actually be of larger diameter than the pin or other support bar, thereby simplifying the pad assembly construction, with the pin or bar being glued into place. Alternatively, the pin or bar could be supported loosely in the through hole or passage, but would be retained in place by means of the side skirts 1114, when the pack is installed between the side flanges or plates 1110. In this arrangement the pad pack is preferably of laminated construction and is held together, such as by the aforementioned techniques including gluing in order to provide a self-supporting pad pack.

Reference is now made to a further embodiment of the present invention illustrated in FIGS. 54A–54D. This embodiment of the invention is similar to that described in FIG. 48. The stabilizer pad construction includes a pair of laterally disposed side flanges or plates 1120 that is supported, by means of rotating pin 1124, from the distal end of the stabilizer arm 1122. The lateral flanges or plate members 1120 are substantially the same as described in FIG. 50 including at their lower edge receiving slots 1126. The slots 1126 receive the end sleeves 1128 at the ends of the support rods 1129 of the resilient pad pack. 1130. The laminate rubber pad 1130 also is provided with a through hole 1133 that receives the retaining pin 1134. The retaining pin 1134, as in the embodiment of FIG. 50, is also received by the hole 1135 in each of the lateral plates 1120.

Figure 48:
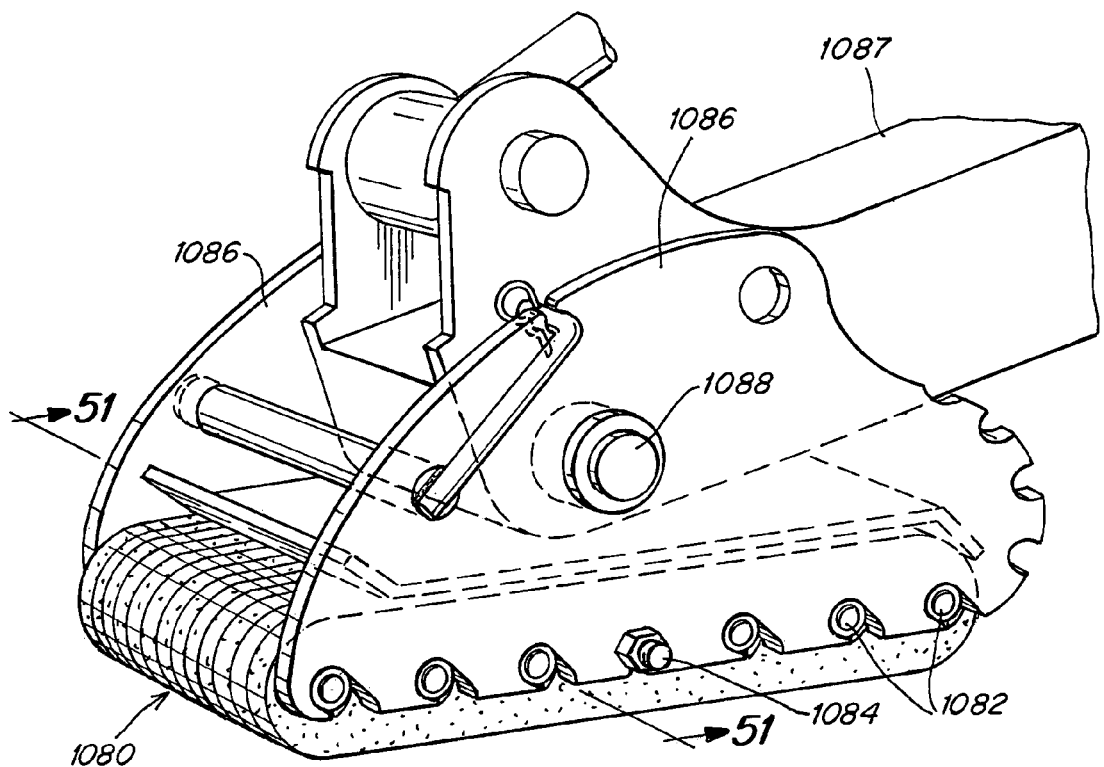
FIG. 48 is a perspective view of still another embodiment of the present invention.
Figure 49:
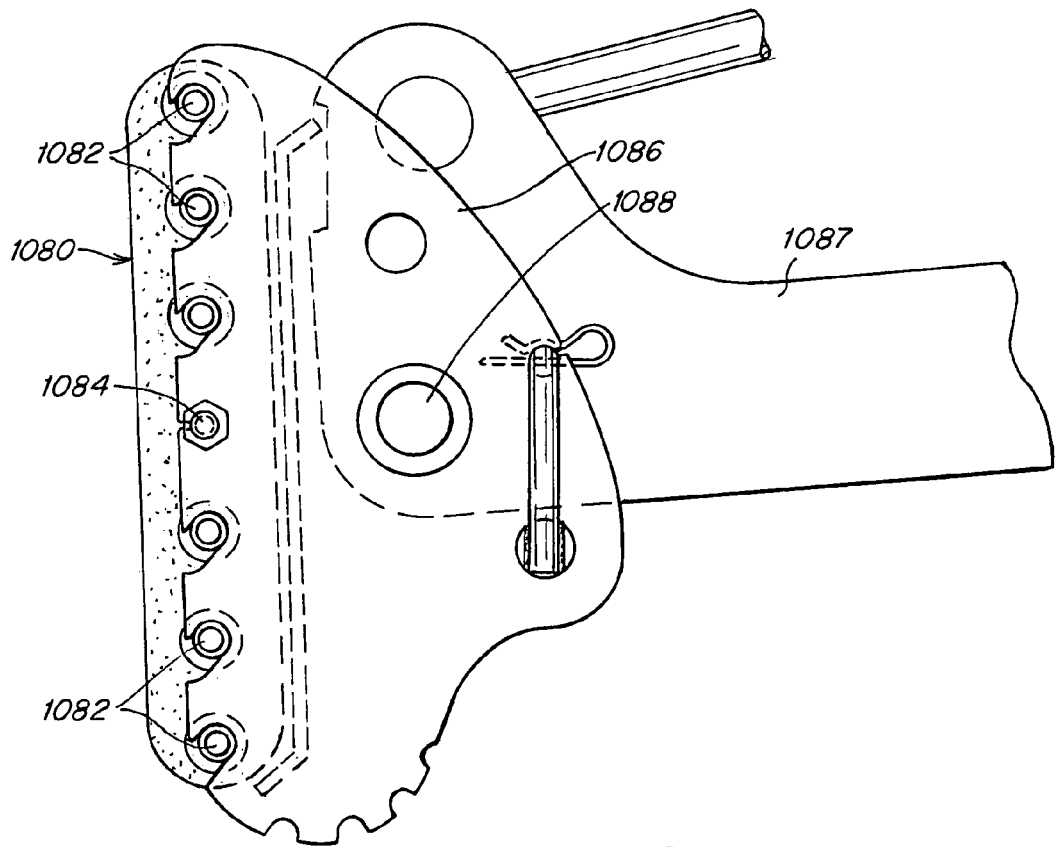
FIG. 49 is a side view of the embodiment of FIG. 48 an the claw position.

The laminate rubber pack 1130 is meant to engage the lateral side plates 1120 in the same manner as described in connection with FIG. 50. The primary difference between the embodiment of FIG. 54 and that of FIG. 48 is that the embodiment of FIG. 54D now includes a T-bar 1138 that provides support between the cross-plate 1140 and the pad pack 1130. The cross-plate 1140 extends between the lateral side plates 1120. It is noted that the opposite ends of the cross-plate 1140 are turned down as indicated at 1141. This assists in retaining the T-bar 1138 in position, as illustrated in the cross-sectional view of FIG. 54C. The T-bar 1138 is generally free-floating between the pad and plate 1140, and provides some transfer of forces fro the pad to the weldment, and from there, to the arm of the machine.

The laminated pad 1130, as noted, has a gap 1144 between opposite side laminate sections. In the preferred arrangement the securing rods 1129 are force-fit with the laminate leaving the gap 1144 between the different side sections. This gap allows for easy assembly and provides looser tolerances for the compressed rubber strips or layers. This gap is sized to receive the base of the T-bar 1138, as illustrated in FIG. 54B.

Figure 54A:
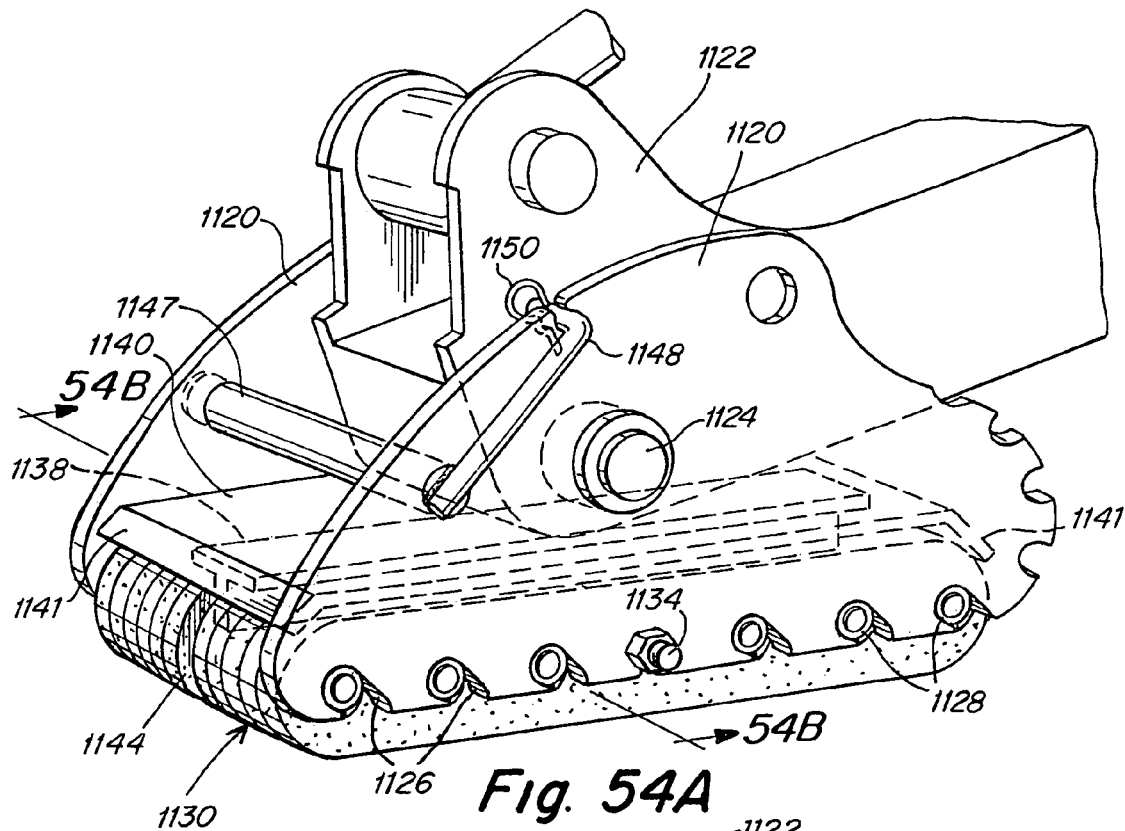
FIG. 54A is a perspective view of yet another embodiment of the present invention.
Figure 54B:
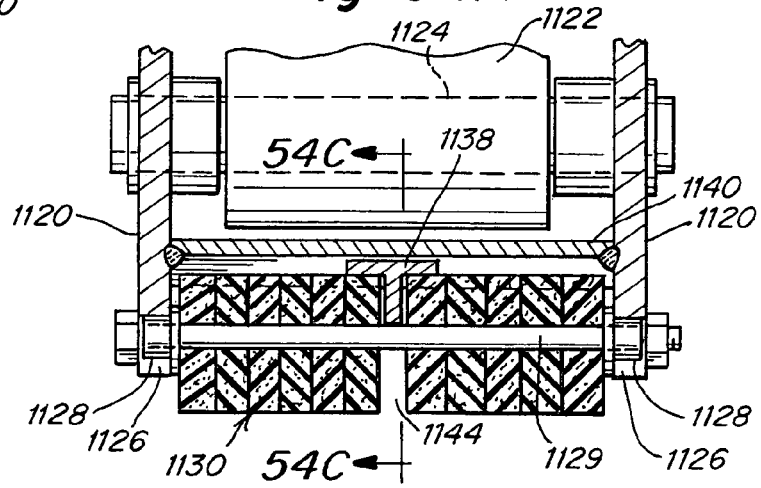
FIG. 54B is a cross-sectional view of the embodiment of FIG. 54A as taken along line 54B—54B of FIG. 54A.
Figure 54C:
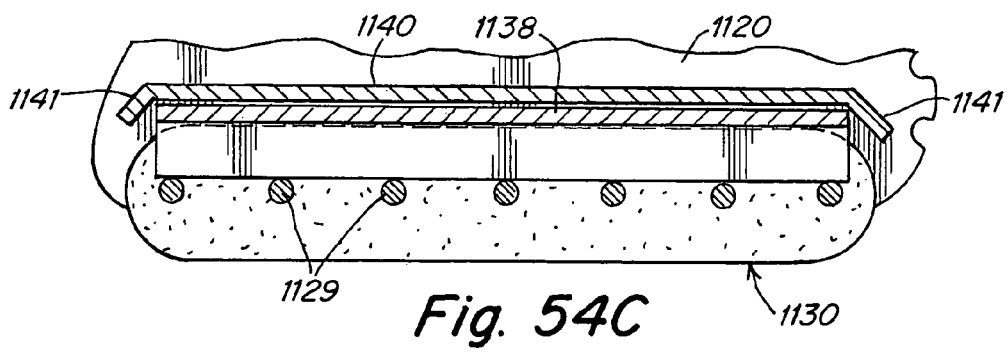
FIG. 54C is a cross-sectional view taken along line 55C–54C of FIG. 54B.

As illustrated in FIGS. 54B and 54C, the bottom of the T-bar 1138 disposed above the rods 1129. Deflective forces against the bottom of the pad are transferred through the rods to the T-bar 1138 and the cross-plate 1140. This prevents the bending of the rods 1129.

Figure 54D:
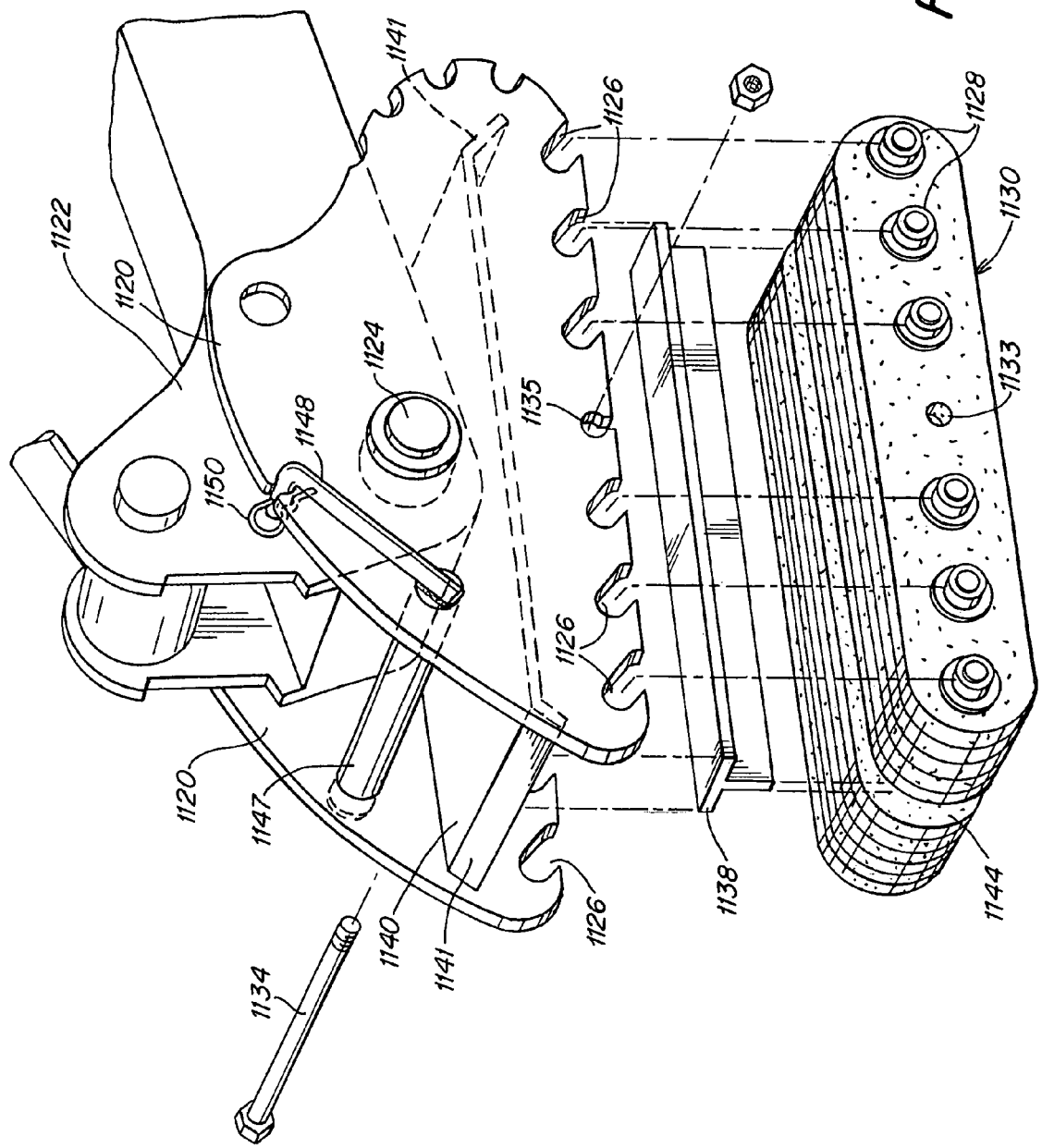
FIG. 54D is an exploded perspective view of the embodiment of FIG. 54A.

FIGS. 54A and 54D also illustrate a latch arrangement including the locking pin 1147 that engages between the side walls 1120. The locking pin 1147 has an extending leg 1148 that is secured by means of the hitch pin 1150. The latch pin is shown in its storage position in FIG. 54A. It is also noted that the side plates 1120 also have another hole for receiving the locking pin 1147 so that when the pad is moved to the grouser point engaging position, as in FIG. 49, the locking pin 1147 can retain the pad in that position. Refer to the discussion hereinbefore regarding the use of the pin 1076 in the version of FIG. 45. In the embodiment of FIG. 54A the hitch pin 1150 is used in the same location to retain the locking pin in place, holding the grouser points in a firm position in ground engagement.

Figure 55:
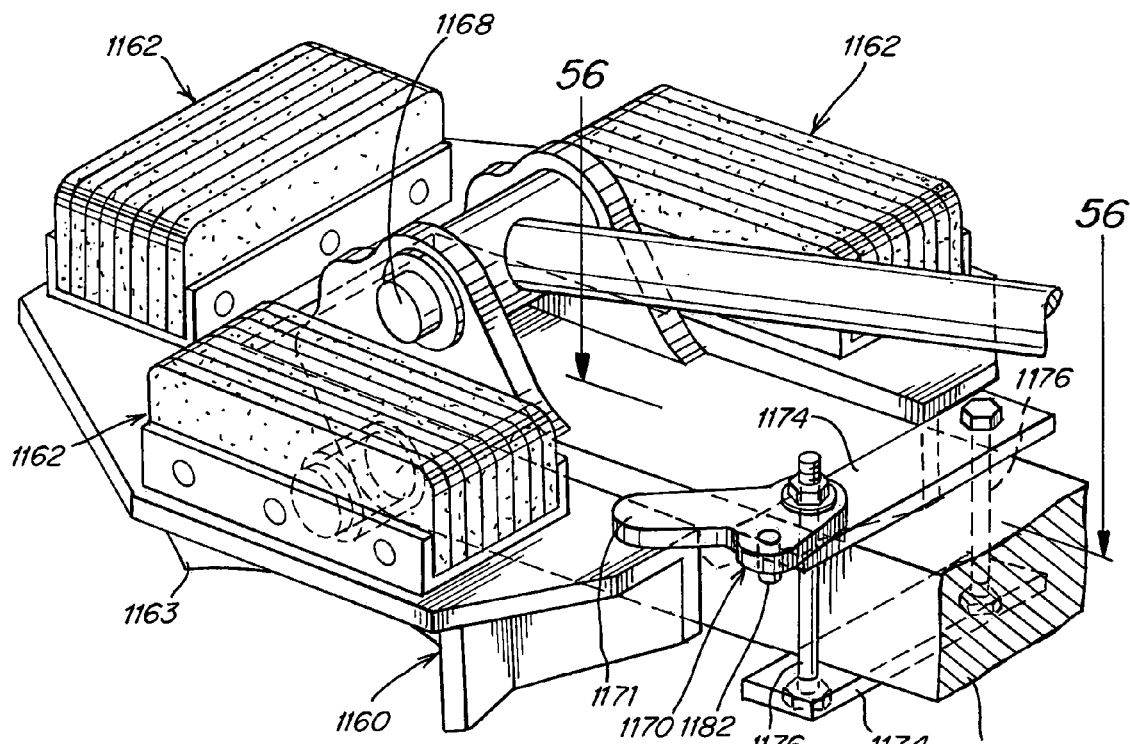
FIG. 55 is a perspective view of still a further embodiment of the present invention using a latch construction.
Figure 56:
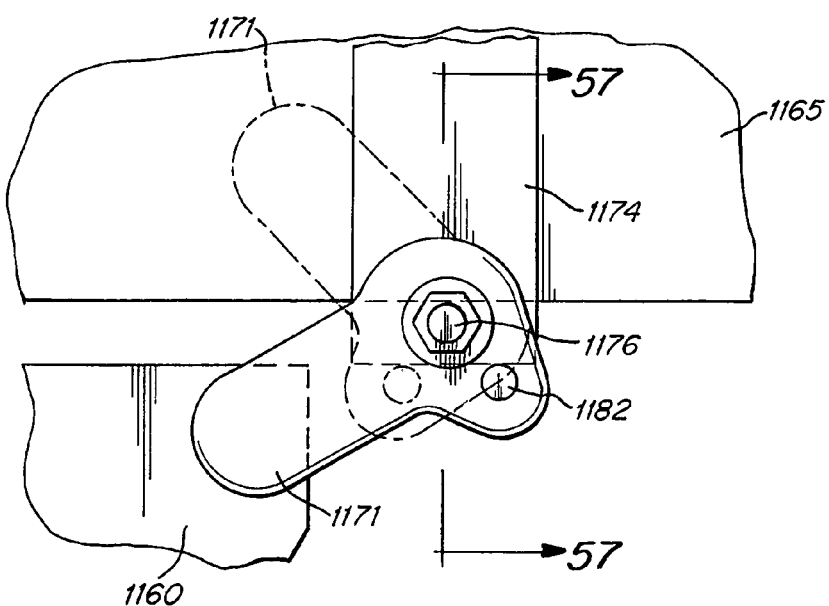
FIG. 56 is a cross-sectional view of the embodiment of FIG. 55 as taken along line 56—56 of FIG. 55.
Figure 57:
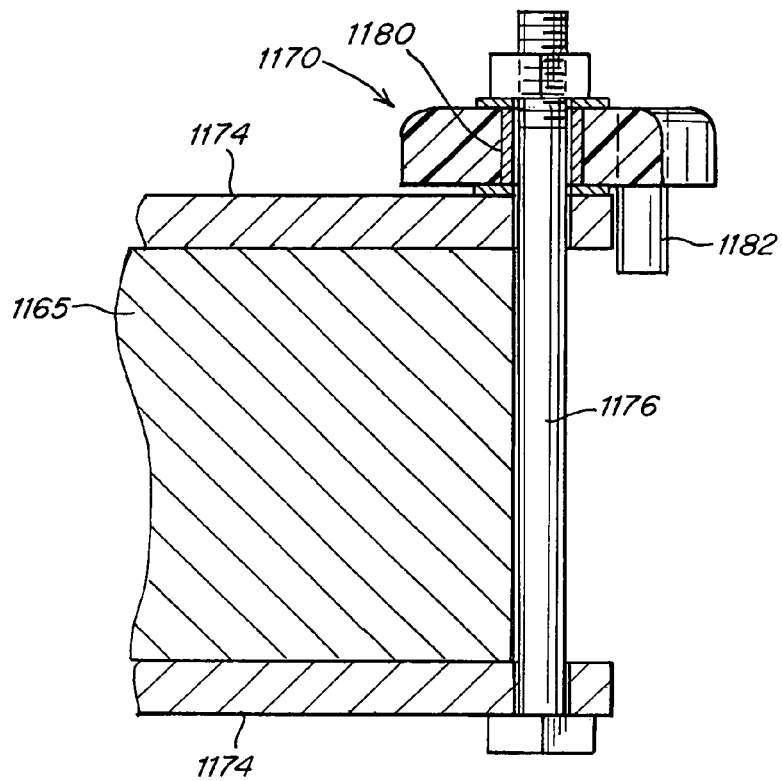
FIG. 57 is a cross-sectional view taken along line 57—57 of FIG. 56.

Reference is now made to FIGS. 55–57 for another version of a latch arrangement in accordance with the present invention. This particular embodiment of the pad construction includes a weldment 1160 that supports three pad assemblies 1162. The metal weldment 1160 is provided on the opposite side with grouser points 1163. The weldment 1160 is supported for rotation from the stabilizer arm 1165 by means of the support pin 1168. In FIG. 55 the stabilizer pad construction is shown in a position in which the grouser points are facing downwardly.

FIGS. 55–57 also show the latch arrangement that is employed with this structure. This includes the pivotal latch 1170 which is shown in solid outline in FIGS. 55 and 56 as having its leg 1171 in a position over the edge of the weldment 1160.

In this position the weldment and the whole pad assembly are prevented from rotation to the resilient pad side. This prevents self-flipping from the grouser point side to the resilient pad side of the assembly. FIG. 56 also shows, in phantom outline, the latch 1170 moved to its unlocked position enabling the pad assembly to be rotated from one side to the other.

The latch arrangement depicted in FIGS. 55–57 also includes, in addition to the latch member 1170, support plates 1174 and elongated bolts 1176. The bolts 1176 are used to clamp the plates 1174 about the stabilizer arm 1165. The latch 1170 is adapted to rotate about one of the bolts 1176 between the two opposite positions illustrated in FIG. 56 including a latching position and an unlatched position.

FIG. 57 illustrates a bushing 1180 that provides the support between the bolt shaft and the latch 1170. This bushing limits the squeezing of the elastomeric material of the latch 1170 so as to provide proper friction against any inadvertent rotation. The latch 1170 also includes a stop pin 1182. The pin 1182 extends from the polyethylene latch 1170. In the position shown in solid outline in FIG. 56, the stop pin 1182 is butted up against the end of the plate 1174. This limits the position of the latch in the counter clock-wise direction of rotation. In the position shown in FIG. 56 in phantom, the stop pin also limits the clock-wise rotation of the latch by bearing against the end of the plate 1174.

The bushing 1180 is preferably press fit into the elastomeric material of the latch 1170. The sleeve of the bushing is slightly longer than the hole depth in the latch so as to slightly stick out therefrom. As the bushing is clamped, the friction between the bushing and latch provides some resistance to rotation, so that the latch will not inadvertently rotate from one position to the other.

In the embodiment of FIG. 55 it is noted that the latch is secured to the arm 1165. In another embodiment of the invention the latch may be secured to the pad itself, and be positioned to engage and disengage with the arm to prevent rotation.

Figure 57A:
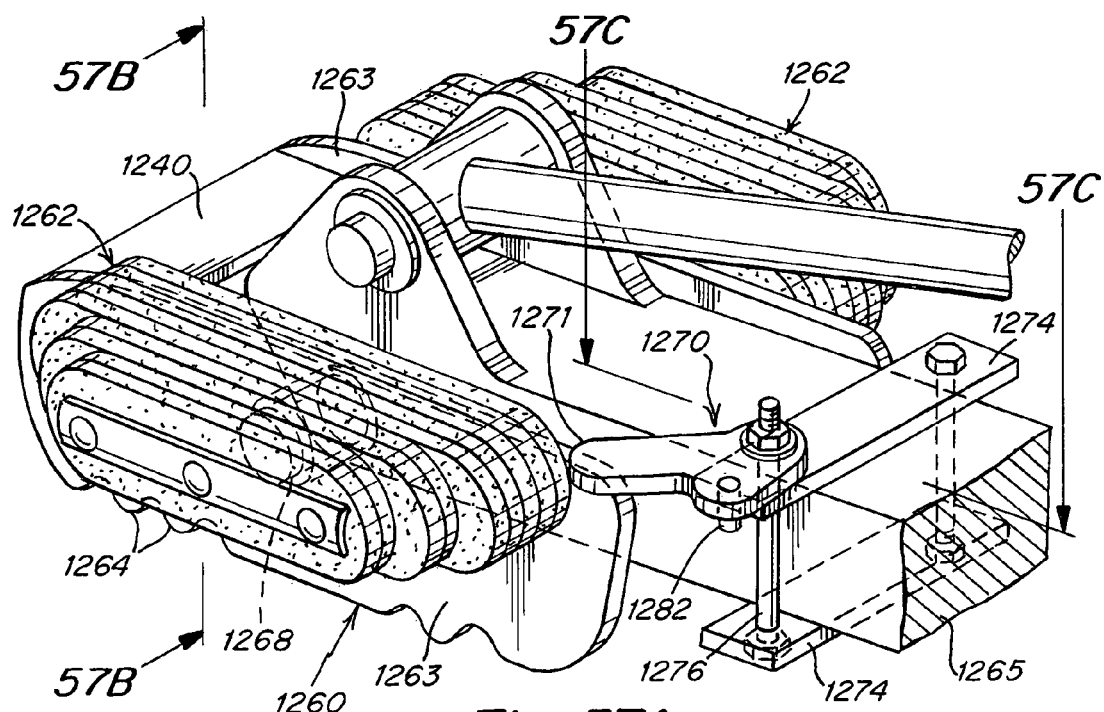
FIG. 57A is a perspective view of still another embodiment of the present invention using a latch construction similar to that described in FIG. 55.
Figure 57B:
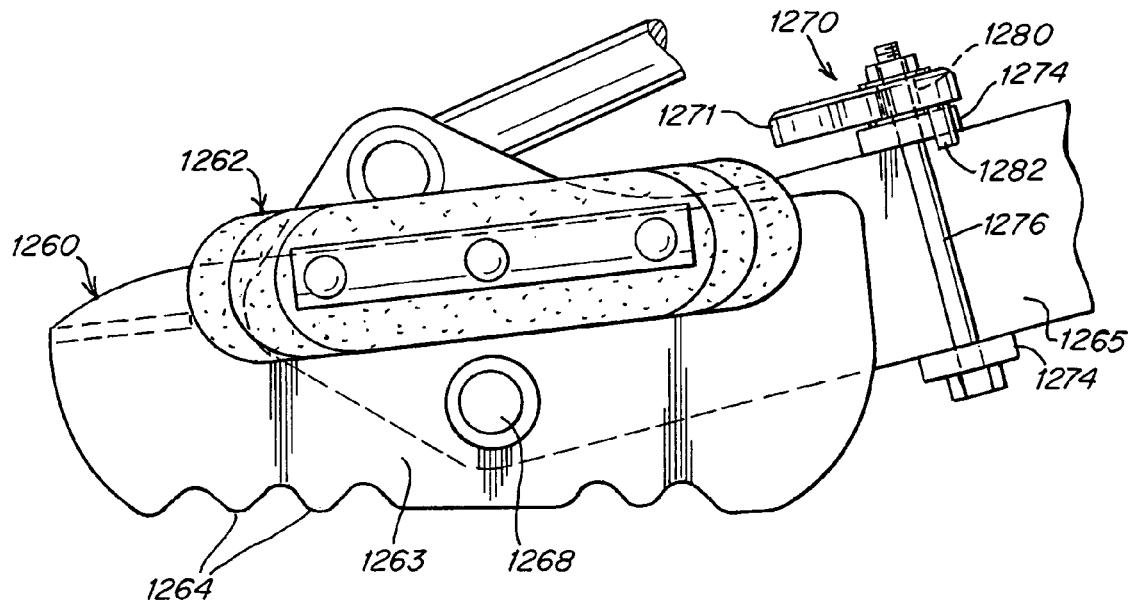
FIG. 57B is a cross-sectional view of the embodiment of FIG. 57A as taken along line 57B—57B of FIG. 57A.
Figure 57C:
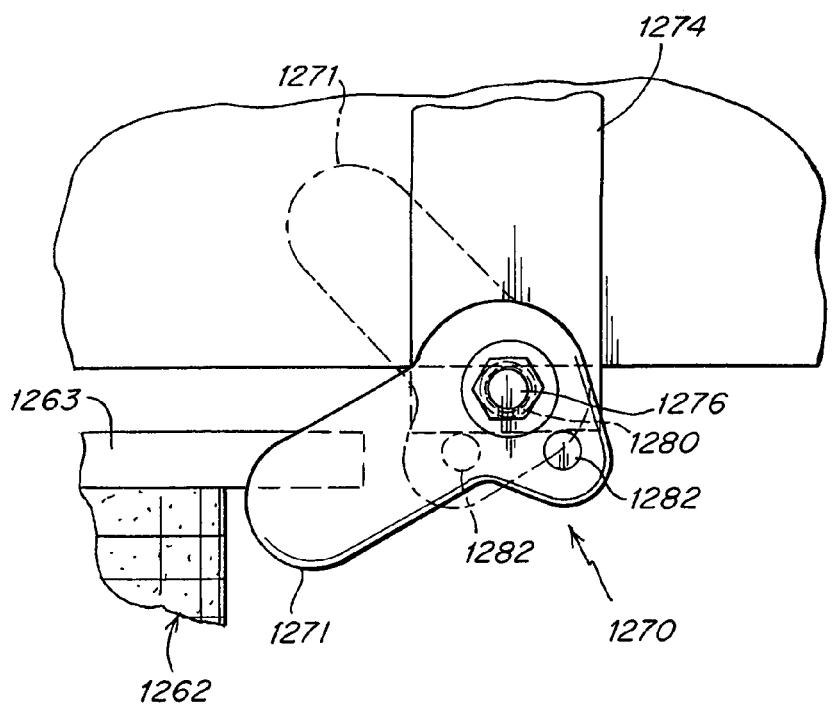
FIG. 57C is a cross-sectional view taken along line 57C—57C of FIG. 57A.

Reference is now made to FIGS. 57A–57C for another version of a latch arrangement in accordance with the present invention. This particular embodiment of the pad construction includes a weldment 1260 that supports two pad assemblies 1262. The metal weldment 1260 is comprised of metal flanges 1263 that may be interconnected by a plate 1240. Each flange 1263 is provided on the opposite side with grouser points 1264. The weldment 1260 is supported for rotation from the stabilizer arm 1265 by means of the support pin 1268. In FIG. 57A the stabilizer pad construction is shown in a position in which the grouser points are facing downwardly for ground engagement.

FIGS. 57A–57C also show the latch arrangement that is employed with this structure. This includes the pivotal latch 1270 which is shown in solid outline in FIGS. 57A and 57B as having its leg 1271 in a position over the edge of the flange 1263. In this position the weldment and the whole pad assembly is prevented from rotation to the resilient pad side. This prevents self-flipping from the grouser point side to the resilient pad side of the assembly. FIG. 57C also shows, in phantom outline, the latch 1270 moved to its unlocked position enabling the pad assembly to be rotated from one side to the other.

The latch arrangement depicted in FIGS. 57A–57C also includes, in addition to the latch member 1270, support plates 1274 and elongated bolts 1276. The bolts 1276 are used to clamp the plates 1274 about the stabilizer arm 1265. The latch 1270 is adapted to rotate about one of the bolts 1276 between the two opposite positions illustrated in FIG. 57C including a latched position and an unlatched position.

FIG. 57B illustrates a bushing 1280 that provides the support between the bolt shaft and the latch 1270. This bushing limits the squeezing of the elastomeric material of the latch 1270 so as to provide proper friction against any inadvertent rotation. The latch 1270 also includes a stop pin 1282. The pin 1282 extends from the polyethylene latch 1270. In the position shown in solid outline in FIG. 57C, the stop pin 1282 is butted up against the end of the plate 1274. This limits the position of the latch in the counter clock-wise direction of rotation. In the position shown in FIG. 57C in phantom, the stop pin also limits the clock-wise rotation of the latch by bearing against the end of the plate 1274.

The bushing 1280 is preferably press fit into the elastomeric material of the latch 1270. The sleeve of the bushing is slightly longer than the hole depth in the latch so as to slightly stick out therefrom. As the bushing is clamped, the friction between the bushing and latch provides some resistance to rotation, so that the latch will not inadvertently rotate from one position to the other.

In the embodiment of FIG. 57A it is noted that the latch is secured to the arm 1265. In another embodiment of the invention the latch may be secured to the pad itself, and be positioned to engage and disengage with the arm to prevent rotation.

Figure 58:
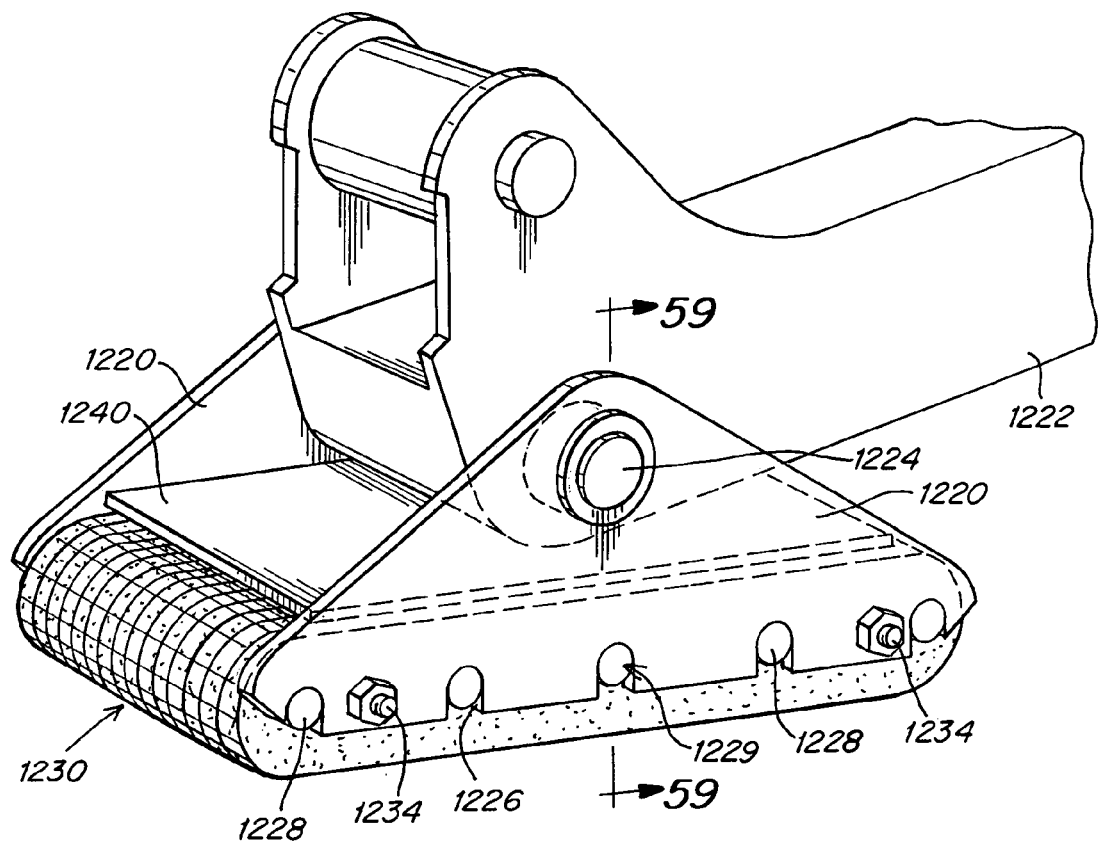
FIG. 58 is a perspective view of a further embodiment of the invention.
Figure 59:
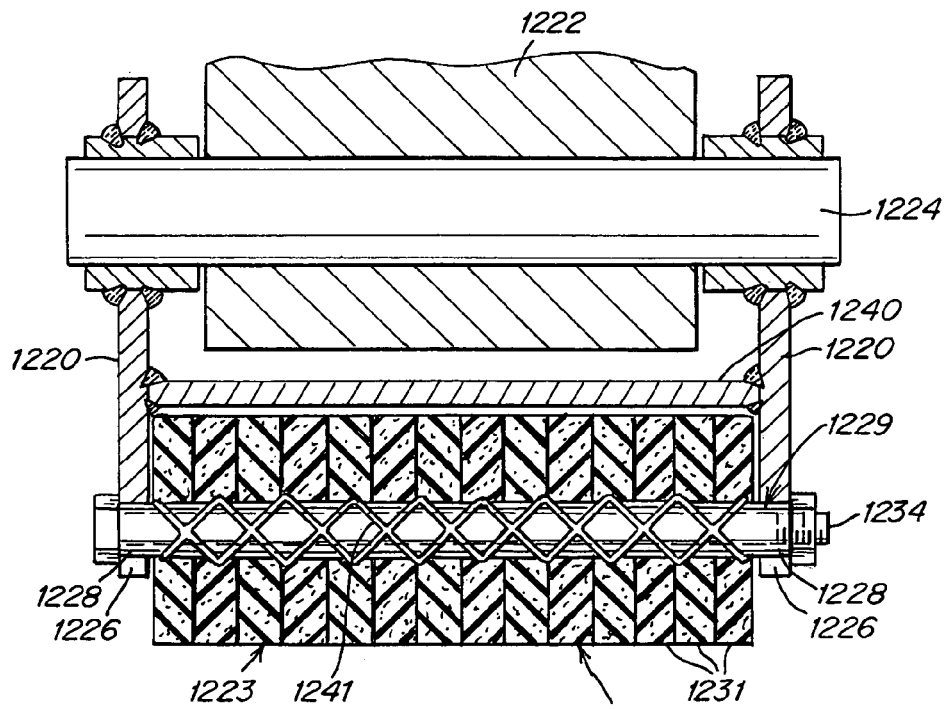
FIG. 59 is a cross-sectional view through the pad of FIG. 58 as taken along line 59—59 of FIG. 58.
Figure 60:
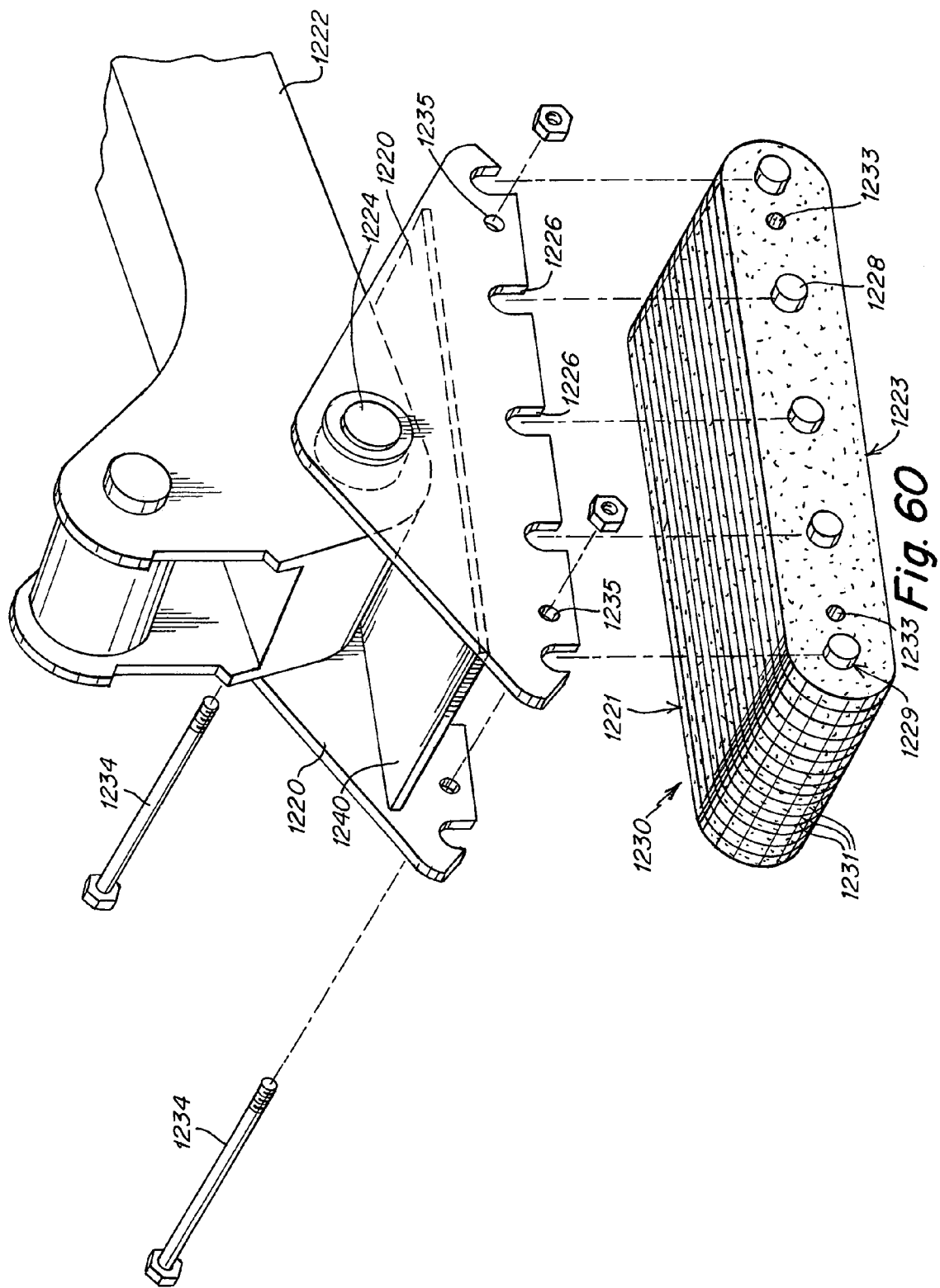
FIG. 60 is an exploded perspective view of the embodiment shown in FIGS. 58 and 59.

Reference is now made to a further embodiment of the present invention illustrated in FIGS. 58–60. This embodiment of the invention is similar to that described in, for example, FIG. 48. However, in this particular embodiment the pad does not have both resilient pad and grouser point opposed sides. In FIGS. 58–60 the weldment is meant primarily only for engagement with surfaces that are best suited for use with a resilient pad construction, such as on concrete or asphalt surfaces. The stabilizer pad construction includes a pair of laterally disposed side flanges or plates 1220 that is supported, by means of rotating pin 1224, from the distal end of the stabilizer arm 1222. The lateral flanges, plates or plate members 1220 are substantially the same as described in FIG. 14, but instead include at their lower edge receiving slots 1226. See also the embodiment of FIG. 48 using slots for receiving the pad pack rods. The slots 1226 in the version of FIG. 58 are vertical slots rather than angled slots. The slots 1226 receive the ends 1228 of the support rods 1229 of the resilient pad pack 1230. The laminate rubber pad 1230 also is provided with a pair of through holes 1233 that receive respective retaining pins 1234, and as depicted in FIG. 60. The retaining pins 1134 are also received by the holes 1235 in each of the lateral side plates 1220.

The laminate rubber pack 1230 is meant to engage between the lateral side plates 1220 in the same manner as described in connection with, for example, FIG. 50. To provide additional support between the side plates there may also be provided a cross-plate 1240 extending between the lateral side plates 1220. It is noted that the opposite ends of the cross-plate 1240 are welded to the side plates, and preferably a small gap is provided between the cross-plate 1240 and the pad pack 1230, as depicted in FIG. 59.

The pad pack 1230, shown as a separate item in FIG. 60, is formed of a plurality of laminated rubber layers that are stacked together to form the pack. These layers may be compressed and the support rods then engaged. The support for the pack is preferably about midway of the pack so that it can be readily reversed from one working surface to the other. These working surfaces are depicted in FIG. 60 as ground engaging or working surfaces 1221 and 1223.

In previous embodiments described herein a force fit has been used to secure the rods or pins 1229 in place. However, there may be a need in certain applications to secure these pins or rods more positively. In the embodiment of FIGS. 58–60 this is accomplished by means of a pin structure that is in the form of a reinforcing rod or other roughened surface rod or pin. This surface is most clearly depicted in FIG. 59 at 1241 in the form of a diagonal rib pattern similar to that used in a reinforcing rod typically used in cast concrete construction. The ends 1228 may be formed without the reinforcing ribs so as to easily mate with the slots in the side plates.

A jig or the like may be used to stack the laminate layers 1231 with the layers having been drilled with holes of a diameter so that the rods 1229 have to be force-fitted into the holes. In this way the rods are held firmly in place and the laminate layers are also firmly stacked against each other. This forms a unitary pad pack 1230 that can be easily secured in place with the use of only a couple of securing pins 1234 and associated nuts. In other embodiments of the invention only a single securing pin, or the like may be used.

Furthermore, the pad pack is also readily reversible once one side thereof is worn down. The pad pack is then dis-assembled by removal of the securing pins 1234 and the pad pack is reversed in position. For example, if the surface 1223 is first the working surface and gets worn down, the pad pack can then be reversed 180 degrees so that the surface 1221 then is facing downwardly and functions as the ground-engaging surface. The embodiment depicted in FIG. 58 can also be provided with a grouser point side so that, not only is the pad pack reversible, but the weldment itself can be reversed between respective resilient and grouser point sides.

Figure 61:
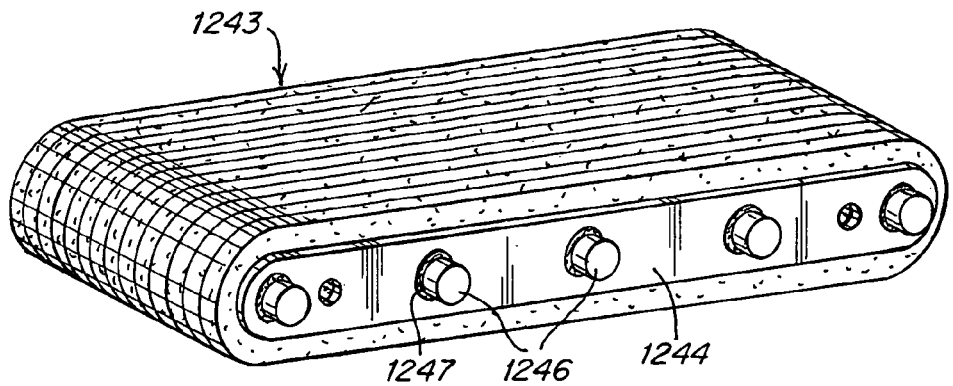
FIG. 61 is a perspective view of an alternate embodiment of a pad assembly or pad pack with side plates.
Figure 62:
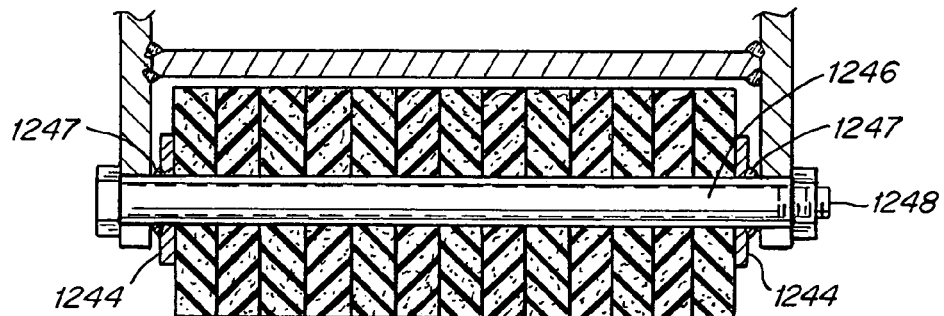
FIG. 62 is a fragmentary cross-sectional view similar to the embodiment of FIG. 59 but showing the alternate construction of FIG. 61.

In the embodiment depicted in FIGS. 58–60 it is noted that the sides of the pad pack are supported essentially only by the side plates 1220. In another variation of this embodiment separate side pieces or plates may be provided. This is depicted in the embodiment shown in FIG. 61 which is a perspective view illustrating the pad pack 1243 having, on opposite sides thereof, the additional side plates 1244. FIG. 61 also shows the securing or retaining pins or rods 1246 that extend through the laminated layers. Each of the rods 1246 is secured to the plates 1244 at each end by a weld depicted at 1247. FIG. 62 also shows one of the two retaining pins 1248 that are used to hold the pad pack to the weldment In FIGS. 61 and 62 the opposite ends of the rods 1246 are received in slots of the weldment, such as in the manner that is depicted in FIG. 58.

Figure 63:
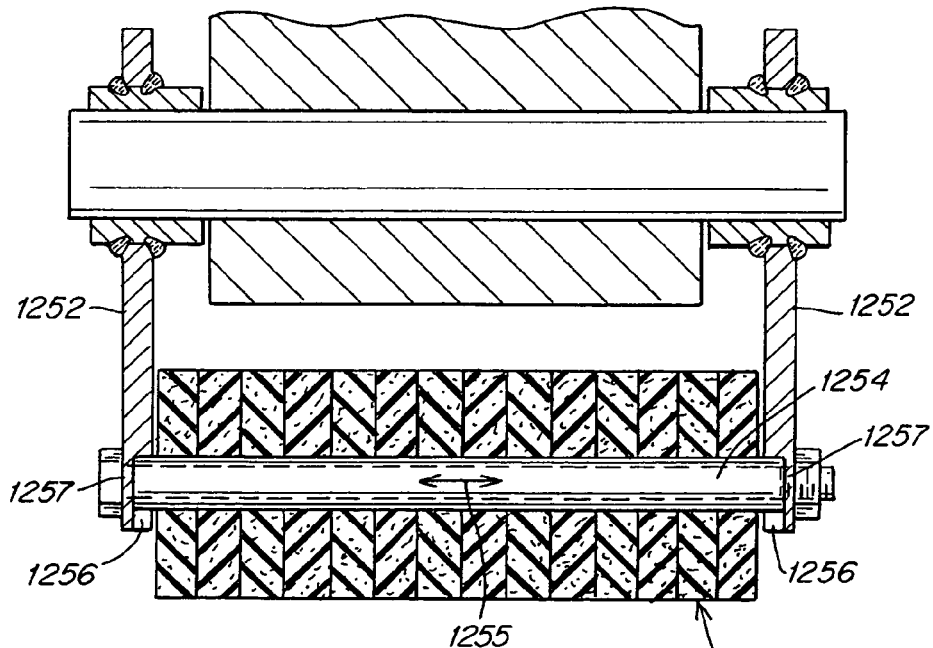
FIG. 63 is a cross-sectional view similar to that shown in FIG. 59 but showing an alternate embodiment in which the support pins are captured in grooves in the weldment.

In the previous embodiments of FIGS. 58–62 one purpose for the structures disclosed is to prevent the support rods from slipping out of the pad pack during the heavy duty use of the machine. In FIG. 58 a reinforcing bar is used, while in FIG. 61 end plates are used welded to the support rods. Still another means of holding the supporting rods of the pad pack in place is depicted in FIG. 63. This embodiment depicts a pad assembly comprising a pad pack 1250 that includes a plurality of separate but joined pad layers in a laminate form, and side plates 1252 of a weldment. The pad pack may be held between the side plates in the same manner as depicted in, for example, FIG. 58 but without the use of any supporting cross-plate. As in FIG. 58, a series of spaced support rods may be employed, along with one or two securing pins that hold the pad pack to the weldment.

The support rods 1254 are depicted in FIG. 63 as engaging with the corresponding side plates 1252. In order to prevent lateral movement, such as in the directions illustrated by double-headed arrow 1255, instead of providing through holes in the side plates, only a partial groove 1256 is used at each end of the rod and in each said plate 1252. A separate groove 1256 can be provided for each support rod 1254. The securing pins pass through the side plates and pad pack in the manner depicted in FIG. 60. It can readily be seen that with the use of the grooves 1256, the rod 1254 is prevented from lateral movement, this movement essentially being blocked by the wall 1257 of the side plates that at least partially define the groove 1256.

Figure 64:
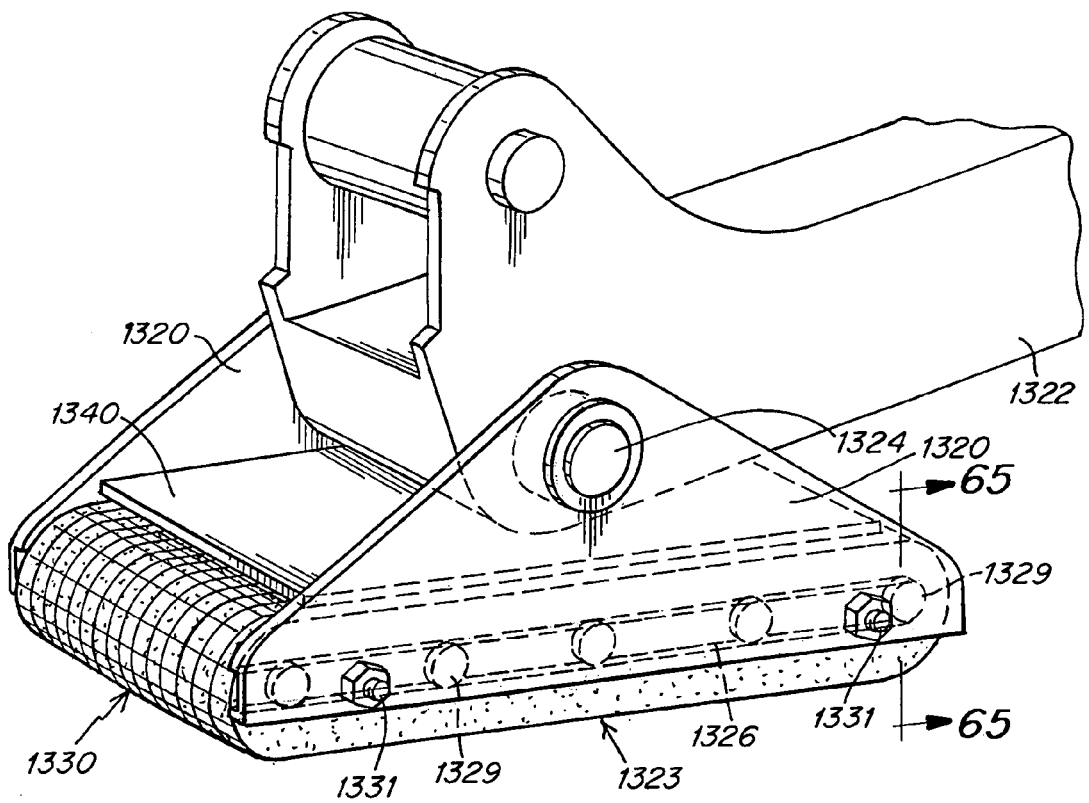
FIG. 64 is still another alternate embodiment in a perspective view and in which the pad pins engage in a horizontal slot.
Figure 65:
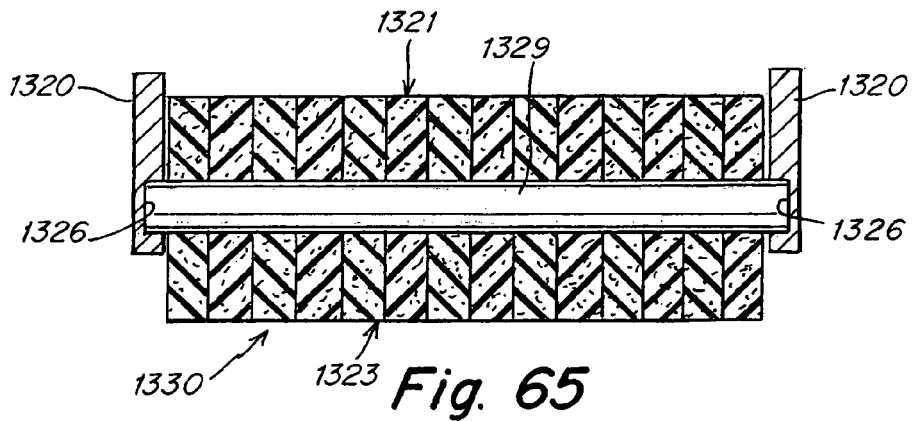
FIG. 65 is a fragmentary cross-sectional view taken along line 65—65 of FIG. 64.

Reference is now made to a further embodiment of the present invention illustrated in FIGS. 64 and 65. FIG. 64 is a perspective view and in which the pad support rods engage in a horizontal slot, rather than the individual vertical slot of FIG. 63. FIG. 65 is a fragmentary cross-sectional view taken along line 65—65 of FIG. 64. This embodiment of the invention is similar to that described in, for example, FIG. 58. In FIGS. 64 and 65 the weldment is meant primarily only for engagement with surfaces that are best suited for use with a resilient pad construction, such as on concrete or asphalt surfaces. The stabilizer pad construction includes a pair of laterally disposed side flanges or plates 1320 that are supported, by means of rotating pin 1324, from the distal end of the stabilizer arm 1322. The lateral flanges or plate members 1320 are substantially the same as described in FIG. 58, but instead include at their lower edge a single horizontally-disposed receiving groove or slot 1326.

The groove 1326 receives the ends of the support rods 1329 of the resilient pad pack 1230. In this embodiment, rather than providing one slot for each support rod, there is provided a single horizontal groove 1326. With this arrangement the pad pack is engaged horizontally rather than vertically with the weldment with one end of all of the support rods 1329 passing through the single groove 1326. The securing pins 1331 are then used in the same manner as in FIG. 60 to hold the pad pack with the weldment.

The laminate rubber pad 1330 also is provided with a pair of through holes that receive respective retaining pins 1331. The retaining pins 1331 are also received by holes in each of the lateral plates 1320.

The laminate rubber pack 1330 is meant to engage between the lateral side plates 1320 in the same manner as described in connection with, for example, FIG. 50. To provide additional support between the side plates there may also be provided a cross-plate 1340 extending between the lateral side plates 1320. It is noted that the opposite ends of the cross-plate 1340 may be welded to the side plates, and preferably a small gap is provided between the cross-plate 1340 and the pad pack 1330, as depicted in FIG. 64.

The pad pack 1330, shown in FIG. 64, is formed of a plurality of laminated rubber layers that are stacked together to form the pack. The support for the pack is preferably about midway of the pack so that it can be readily reversed from one working surface to the other. These working surfaces are depicted in FIG. 60 as ground engaging or working surfaces 1321 and 1323.

Figures 66, 66A:
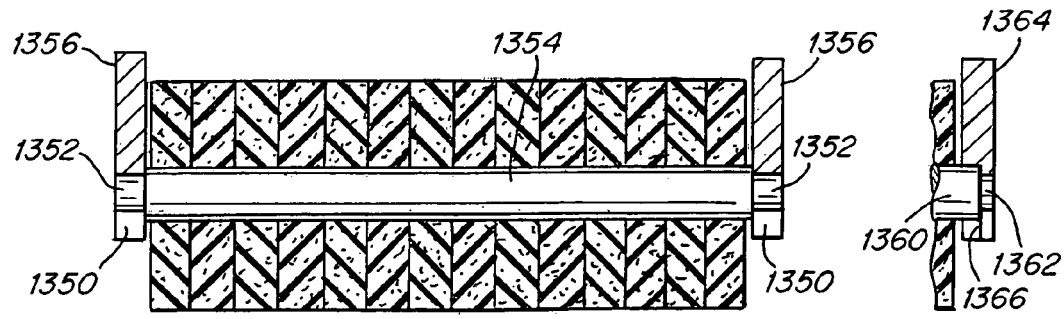
FIG. 66 is also a fragmentary cross-sectional view like that shown in FIG. 65 but illustrating an alternate version in which the support pins have a stepped end to hold them in place.
FIG. 66A is a fragmentary cross-sectional view like that shown in FIG. 66 but illustrating a stepped pin, as well as a stepped shoulder in the support flange.

Reference is now made to a further alternate version of the invention as depicted in FIG. 66. This cross-sectional view is similar to that illustrated in FIG. 65, but instead of providing a groove or grooves in the side plates, a slot 1350 is provided in conjunction with a stepped (reduced diameter) end 1352 of each support rod 1354. A pair of retaining pins are also employed in this version for holding the pad pack in the weldment. The reduced diameter end 1352 of the support rod forms a flange or shoulder that butts up against an inner surface of the side plate 1356 preventing any lateral movement of the support rod 1354. These ends 1352 are provided at both ends of the support rod.

FIG. 66A shows another version in which the support rod 1360 has a stepped, smaller diameter end 1362, while the side plates 1364 are also formed with a slot that is stepped as illustrated at 1366.

Figure 67:
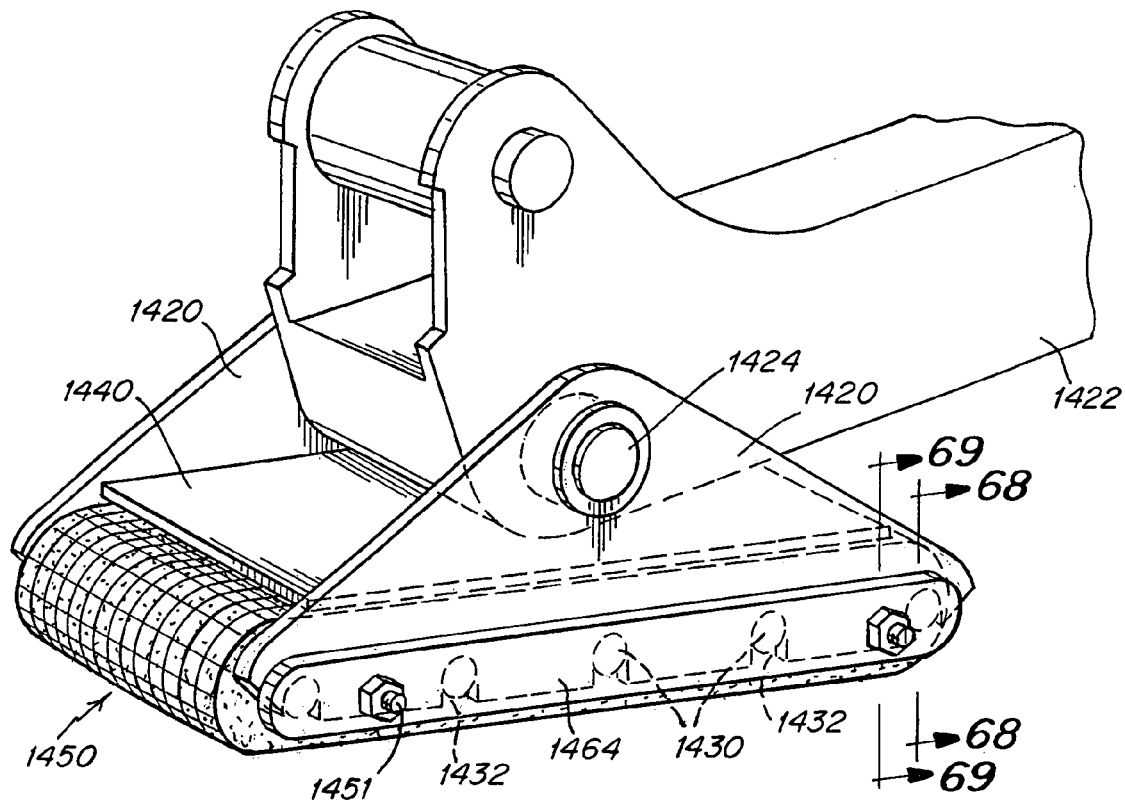
FIG. 67 is yet another perspective view of an alternate embodiment of the pad in which side plates are added to the sides of the weldment.
Figure 68:
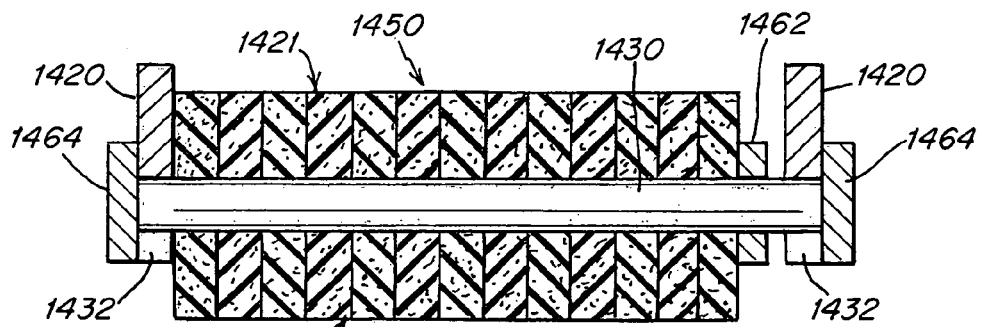
FIG. 68 is a fragmentary cross-sectional view taken along line 68—68 of FIG. 67.
Figure 69:
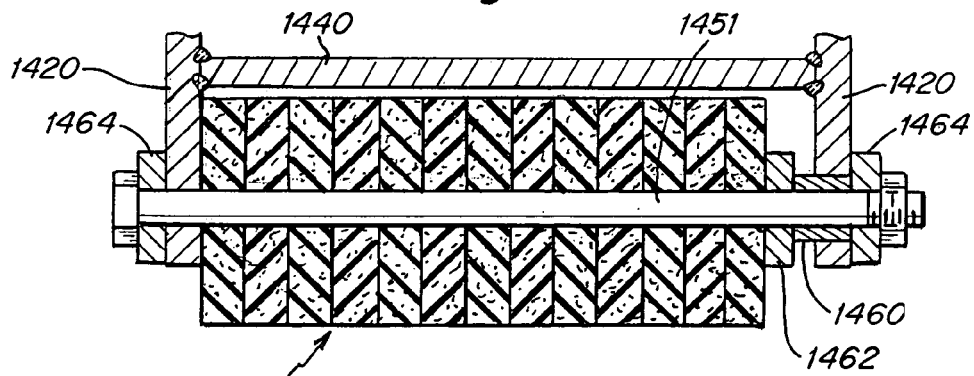
FIG. 69 is a fragmentary cross-sectional view taken along line 69—69 of FIG. 67.

Reference is now made to still a further embodiment of the present invention illustrated in FIGS. 67–69. FIG. 67 is a perspective view in which the pad pins engage corresponding vertical slots. FIG. 68 is a fragmentary cross-sectional view taken along line 68—68 of FIG. 67. FIG. 69 is a fragmentary cross-sectional view taken along line 69—69 of FIG. 67. This embodiment of the invention is similar to that described in, for example, FIG. 58, but employs a different means for holding the pad support rods 1430 in place. In FIGS. 67–69 the weldment is meant primarily only for engagement with surfaces that are best suited for use with a resilient pad construction, such as on concrete or asphalt surfaces. In an alternate embodiment the weldment may be additionally provided with grouser points in which case the entire weldment is meant to be reversible between the resilient pad side and the grouser point side. The stabilizer pad construction includes a pair of laterally disposed side flanges or plates 1420 that are supported, by means of rotating pin 1424, from the distal end of the stabilizer arm 1422. The lateral flanges or plate members 1420 are substantially the same as described in FIG. 58, including vertical slots 1432 at their lower edge for receiving the support rods 1430.

The laminate rubber pad 1450 also is provided with a pair of through holes that receive respective retaining pins 1451. See FIG. 69 where two pins are used. Fewer or greater than two pins may be provided. The retaining pins 1451 are also received by holes in each of the lateral plates 1420. FIG. 69 also shows the addition of a sleeve 1460 disposed within a hole in the side plate 1420 and for receiving the securing pin 1451.

The laminate rubber pack 1450 is meant to engage between the lateral side plates 1420 in the same manner as described in connection with, for example, FIG. 50. To provide additional support between the side plates there may also be provided a cross-plate 1440 extending between the lateral side plates 1420. It is noted that the opposite ends of the cross-plate 1440 may be welded to the side plates, and preferably a small gap is provided between the cross-plate 1440 and the pad pack 1450, as depicted in FIG. 69.

The pad pack 1450, shown in FIG. 67, is formed of a plurality of laminated rubber layers that are stacked together to form the pack. The support rods may be press fit or force fit with the laminate layers. These rods may also be provided with a roughened or abraded external surface to help to hold them in place. A clamping bar 1462 is also illustrated in FIGS. 68 and 69 on one side of the laminate layers. This clamping bar may be provided as illustrated in, for example, FIG. 61 to hold at least one side of the laminate pack. A pair of clamping bars may also be provided at opposite sides of the pad pack. The support for the pack is preferably about midway between working surfaces of the pack so that it can be readily reversed from one working surface to the other. These working surfaces are depicted in FIG. 68 as ground engaging or working surfaces 1421 and 1423.

To retain the pad pack in place, and in particular the support rods 1430, there is also provided on either side of the pad pack the retaining side plates 1464. The side plates 1464 retain the ends of the support rods 1430 preventing them from moving in either direction and out of the pad pack. As shown in FIG. 68 the rods 1430 are preferably flush with the outer surface of the side plates 1420. The side plates 1464 thus cover the end of each rod 1430 to prevent each of them from moving laterally. As illustrated in FIG. 69, the side plates are held in position my means of the retaining pins 1451. These pins extend through holes in the side plates 1464, the clamping bar 1462 and the laminate pad pack 1450.

In the embodiment of FIGS. 67–69 there is provided a sleeve 1460 and a clamping bar 1462. In an alternate embodiment these elements may be removed. In that case the laminate may then be made wider as is apparent from FIG. 69.

Figure 70:
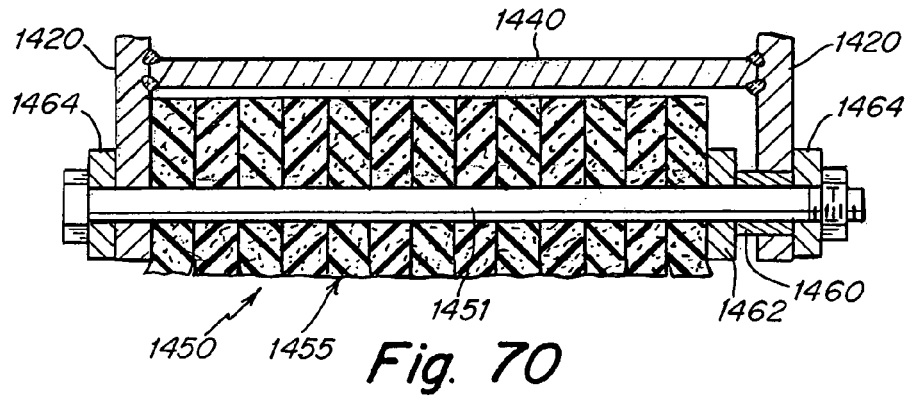
FIG. 70 is a fragmentary cross-sectional view similar to that illustrated in FIG. 69 showing the worn laminate pad before reversing the position thereof.
Figure 71:
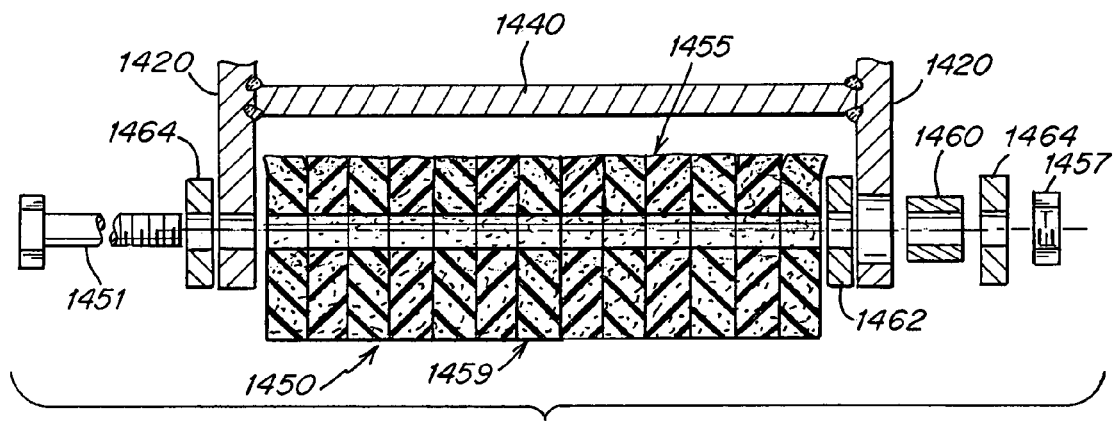
FIG. 71 is an exploded cross-sectional view with a first step in reversing the pad.
Figure 72:
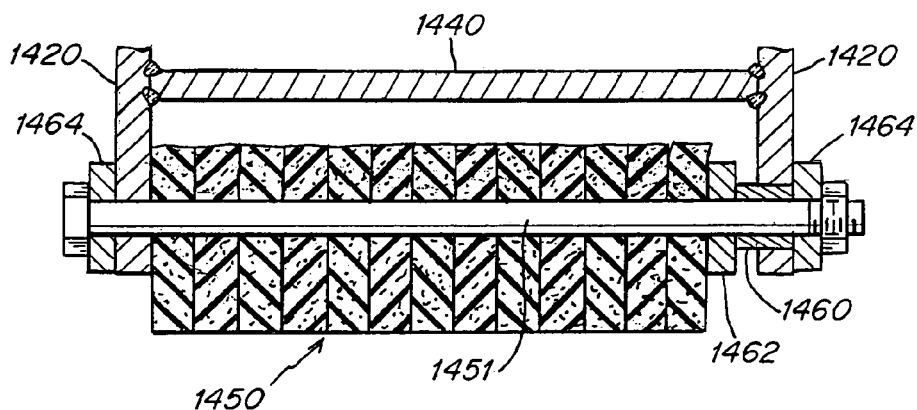
FIG. 72 is a cross-sectional view similar to that shown in FIG. 70 and illustrating the pad being reversed and clamped in place.

Reference is now made to FIGS. 70–72 for a further illustration of the principles of the present invention. FIG. 70 is a fragmentary cross-sectional view similar to that illustrated in FIG. 69 showing the worn laminate pad before reversing the position thereof. FIG. 71 is an exploded cross-sectional view with a first step in reversing the pad by disassembling components. FIG. 72 is a cross-sectional view similar to that shown in FIG. 70 and illustrating the pad having been reversed and clamped in place. In FIGS. 70–72 the same reference numbers are used as identified in FIGS. 67–69.

In FIG. 70 the pad pack 1450 is shown in a worn condition with the worn surface 1455 illustrated as almost worn to the level of the side plates 1420. This occurs after substantial use of the pad in that particular position. FIG. 71 illustrates the pad pack being reversed, at an initial stage wherein the retaining pins 1451 have been disengaged. The retaining pins 1451 are threaded at their end, as illustrated, to receive the nut 1457. When the nut is removed then the assembly can be dismounted. The retaining pins are withdrawn, along with the side plates 1464. This allows one to reverse the position of the pad pack so that the worn side 1455 is now facing upwardly. FIG. 71 thus illustrates the unused surface 1459 as the downwardly facing work surface of the pad pack 1450. Lastly, FIG. 72 shows the pad pack then reassembled with the retaining pins secured in place.

In the various embodiments described herein it is to be noted that a number of different ways have been described for holding the pad support members in place. All of these described ways, as well as other alternative ways, are characterized by some means that prevents the support member or members from moving laterally or longitudinally. This may be accomplished by the structures as described in FIGS. 58–72 or by other equivalent structures.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

The invention claimed is:

1. A stabilizer pad assembly for use with a stabilizer arm of heavy equipment, the stabilizer pad assembly comprising:
   a pair of laterally spaced apart plate members, the pair of plate members being pivotally attached at a proximal end thereof to the stabilizer arm so that the plate members can rotate relative thereto;
   at least one resilient pad formed with at least one passage extending transversely therethrough between opposite sides of said resilient pad, and having opposite work surfaces;
   at least one support member extending through said pad passage, integral with said resilient pad and constructed and arranged to be supported from a distal end of said plate members; and
   at least one retaining member disposed between said plate members and for securing the resilient pad to the plate members, said retaining member removable to permit said resilient pad to be moved between said opposite work surfaces and to be re-engagable so as to permit selective positioning of either of said opposite work surfaces for use as a surface for ground engagement.

2. A stabilizer pad assembly as set forth in claim 1 including means disposed at at least one end of said support member for inhibiting lateral movement of said support member relative to said resilient pad.

3. A stabilizer pad assembly as set forth in claim 2 wherein the means for inhibiting comprises at least one plate piece at the side of said pad and secured with said retaining member.

4. A stabilizer pad assembly as set forth in claim 2 wherein the means for inhibiting comprises a blocking wall defined in at least one of said plate members.

5. A stabilizer pad assembly as set forth in claim 2 wherein the means for inhibiting comprises a horizontal slot at the distal end of said plate members, said support member comprising a plurality of support rods that are adapted to ride into said slot.

6. A stabilizer pad assembly as set forth in claim 2 wherein the means for inhibiting comprises a stepped end of said support member.

7. A stabilizer pad assembly as set forth in claim 2 wherein the means for inhibiting comprises a stepped slot in said plate member.

8. A stabilizer pad assembly as set forth in claim 2 wherein the means for inhibiting comprises a side plate outside of said plate member for blocking lateral movement of said support member.

9. A stabilizer pad assembly as set forth in claim 8 including a pair of side plates, one on either side of the resilient pad, and wherein there are plural support members spaced along the plate members.

10. A stabilizer pad assembly as set forth in claim 9 wherein the support members comprise support rods that extend at both ends beyond the resilient pad.

11. A stabilizer pad assembly as set forth in claim 1 comprising at least a pair of retaining members each including a retaining pin secured between the plate members.

12. A stabilizer pad assembly as set forth in claim 11 wherein each plate member has a distal slot for receiving said support member.

13. A stabilizer pad assembly as set forth in claim 1 wherein said support member is constructed with a roughened outer surface so as to secure the support member in place.

14. A stabilizer pad assembly as set forth in claim 13 wherein the support member is formed of a reinforcing rod.

15. A stabilizer pad assembly adapted for mounting from a metal weldment and comprising:
   a resilient pad having opposite ground engageable surfaces, one of which is adapted to be in a downwardly facing orientation for ground engagement;
   means integral with and extending from said resilient pad, forming with said resilient pad a unitary pad assembly, and adapted for releasable engagement with said metal weldment; and
   at least one elongated securing member that is releasably connectable between said resilient pad and said metal weldment for holding said resilient pad to said metal weldment;
   further including at least one clamping bar positioned between said resilient pad and said weldment for retaining at least one side of said resilient pad.

16. A stabilizer pad assembly for use with a stabilizer arm, the stabilizer pad assembly comprising:

a pair of laterally spaced apart plate members each having proximal and distal ends, the pair of plate members forming a metal weldment and being pivotally attached to a stabilizer arm by a pin extending laterally between facing surfaces of respective plate members at said proximal ends thereof;

at least one resilient pad having opposed work surfaces and opposed support surfaces that are substantially transverse to said work surfaces said at least one resilient pad coupled for support from the distal ends of said plate members; and means integral with and extending from said resilient pad, forming with said resilient pad a unitary pad assembly;

said means integral connected for releasable engagement with said metal weldment;

whereby said resilient pad is moved between said opposed working surfaces and to be re-engagable between said plate members so as to permit selective positioning of either of said opposed working surfaces for use as a surface for ground engagement.

17. A stabilizer pad assembly for use with a stabilizer arm, the stabilizer pad assembly comprising:

a pair of laterally spaced apart plate members each having proximal and distal ends, the pair of plate members forming a metal weldment and being pivotally attached to a stabilizer arm by a pin extending laterally between facing surfaces of respective plate members at said proximal ends thereof;

at least one resilient pad having opposed work surfaces and opposed support surfaces that are substantially transverse to said work surfaces said at least one resilient pad adapted for support from the distal ends of said plate members; and means integral with and extending from said resilient pad, forming with said resilient pad a unitary pad assembly;

said means integral adapted for releasable engagement with said metal weldment;

whereby said resilient pad is adapted to be moved between said opposed working surfaces and to be re-engagable between said plate members so as to permit selective positioning of either of said opposed working surfaces for use as a surface for ground engagement;

wherein said plate members have, at said distal ends thereof, at least one receiving slot and a retaining member that is releasably connectable between said resilient pad and said metal weldment for holding said resilient pad to said metal weldment.

18. A stabilizer pad assembly as set forth in claim 17 wherein said means integral with said resilient pad includes support posts that extend from said opposed support surfaces of said at least one resilient pad for releasable engagement with slots in respective plate members that comprise said metal weldment.

19. A stabilizer pad assembly adapted for mounting from a metal weldment attached to a stabilizer arm of earthmoving equipment, said pad assembly comprising:

a resilient pad having opposite ground engageable surfaces, one at a time of which is in a downwardly facing orientation for ground engagement;

a plurality of passages extending through said resilient pad; and a plurality of rod members extending respectively through said plurality of passage in said resilient pad, extending beyond opposite sides thereof, forming with said resilient pad a unitary pad assembly, and disposed for releasable engagement with said metal weldment;

whereby said resilient pad is moveable between said opposite ground engageable surfaces by releaseable engagement with said weldment so as to permit selective positioning of either of said opposite ground engageable surfaces for use as a surface for ground engagement.

20. A stabilizer pad assembly as set forth in claim 19 wherein said rod members are releasably engageable with respective open slots of said weldment.

21. A stabilizer pad assembly as set forth in claim 20 wherein said weldment comprises spaced plate members each having a plurality of open slots disposed along a bottom edge thereof.

22. A stabilizer pad assembly as set forth in claim 19 including at least one retaining member that is releasably connectable between said resilient pad and weldment.

23. A stabilizer pad assembly as set forth in claim 19 wherein the resilient pad also has at least one hole therethrough between said opposite sides for receiving means to retain the resilient pad to the weldment.

* * * * *